United States Patent
Boodhoo et al.

(10) Patent No.: US 10,740,424 B2
(45) Date of Patent: Aug. 11, 2020

(54) SMOOTH NAVIGATION BETWEEN RESOURCES IN A DIGITAL RESOURCE MANAGEMENT SYSTEM

(71) Applicant: Knowlio, Inc., Austin, TX (US)

(72) Inventors: Jean-Paul Sylvain Boodhoo, Cypress County (CA); Will McGarrett Harper, Austin, TX (US)

(73) Assignee: Knowlio, Inc., Austin, TX (US)

( * ) Notice: Subject to any disclaimer, the term of this patent is extended or adjusted under 35 U.S.C. 154(b) by 457 days.

(21) Appl. No.: 15/485,162

(22) Filed: Apr. 11, 2017

(65) Prior Publication Data

US 2017/0293404 A1    Oct. 12, 2017

Related U.S. Application Data

(60) Provisional application No. 62/393,594, filed on Sep. 12, 2016, provisional application No. 62/340,940, (Continued)

(51) Int. Cl.
*G06F 3/048* (2013.01)
*G06F 16/954* (2019.01)
(Continued)

(52) U.S. Cl.
CPC .............. *G06F 16/954* (2019.01); *G06F 8/34* (2013.01); *G06F 8/38* (2013.01); *G06F 9/44505* (2013.01);
(Continued)

(58) Field of Classification Search
CPC ........................ G06F 16/958; G06F 17/2288
(Continued)

(56) References Cited

U.S. PATENT DOCUMENTS 5,715,445 A    2/1998  Wolfe
5,802,292 A    9/1998  Mogul
(Continued)

FOREIGN PATENT DOCUMENTS

DE         10332492 B4    2/2005

OTHER PUBLICATIONS

PCT International Search Report and Written Opinion, PCT Application No. PCT/US17/27066, dated Jun. 29, 2017, 20 pages.

(Continued)

*Primary Examiner* — Alex Olshannikov
(74) *Attorney, Agent, or Firm* — Fenwick & West LLP

(57) ABSTRACT

A process controls navigation and presentation of digital resources on a computer device. Identifying parameters for digital resources are stored as a set of digital resources, including an ordered set of digital resources. When receiving an instruction to navigate between resources, it is determined whether the first and second resources meet criteria that will enable a visually smooth navigation between the resources by transitioning from a first digital resource to a second digital resource without clearing all of the displayed elements of the first digital resource. The smooth navigation is performed by sending an identifier of the second digital resource to a history of a resource viewing component (e.g., a browser) and triggering a pop-state event in the resource viewing component that causes the resource viewing component to complete the desired smooth navigation.

21 Claims, 53 Drawing Sheets

Related U.S. Application Data filed on May 24, 2016, provisional application No. 62/321,706, filed on Apr. 12, 2016.

(51) Int. Cl.

| | | |
|---|---|---|
| *G06F 8/34* | (2018.01) | |
| *G06F 8/38* | (2018.01) | |
| *G06F 9/445* | (2018.01) | |
| G06F 3/0483 | (2013.01) | |
| H04L 29/08 | (2006.01) | |
| G06F 3/0481 | (2013.01) | |
| G06F 9/451 | (2018.01) | |

(52) U.S. Cl.
CPC .......... *G06F 3/0481* (2013.01); *G06F 3/0483* (2013.01); *G06F 9/451* (2018.02); *H04L 67/02* (2013.01)

(58) Field of Classification Search
USPC ........................................................ 715/739
See application file for complete search history.

(56) References Cited

U.S. PATENT DOCUMENTS

| | | | |
|---|---|---|---|
| 5,809,247 | A | 9/1998 | Richardson et al. |
| 5,946,682 | A | 8/1999 | Wolfe |
| 6,006,252 | A | 12/1999 | Wolfe |
| 6,151,603 | A | 11/2000 | Wolfe |
| 6,297,819 | B1 | 10/2001 | Furst |
| 6,516,340 | B2 | 2/2003 | Boys |
| 6,572,662 | B2 | 6/2003 | Manohar et al. |
| 6,792,430 | B1 | 9/2004 | Kenyon et al. |
| 6,934,737 | B1 | 8/2005 | Tang et al. |
| 7,165,070 | B2 | 1/2007 | Page et al. |
| 7,209,928 | B2 | 4/2007 | Kenyon |
| 7,302,638 | B1 | 11/2007 | Wolfe |
| 7,346,848 | B1 | 3/2008 | Ruthfield et al. |
| 7,389,241 | B1 | 6/2008 | Bascom |
| 7,627,826 | B2 | 12/2009 | Pry |
| 7,996,494 | B2 | 8/2011 | Allamaraju et al. |
| 8,078,972 | B2 | 12/2011 | Sullivan et al. |
| 8,510,682 | B2 | 8/2013 | Kusterer et al. |
| 8,635,021 | B2 | 1/2014 | Heng et al. |
| 8,661,361 | B2 | 2/2014 | Morris |
| 8,780,130 | B2 | 7/2014 | Morris |
| 8,856,675 | B1 | 10/2014 | Agarawala et al. |
| 8,966,373 | B2 | 2/2015 | Wan |
| 9,279,685 | B1 | 3/2016 | Heng et al. |
| 9,727,301 | B2 | 8/2017 | Sweet |
| 9,846,535 | B2 | 12/2017 | Paine et al. |
| 2002/0054114 | A1 | 5/2002 | Shuping et al. |
| 2003/0071849 | A1 | 4/2003 | Ferri |
| 2004/0049541 | A1 | 3/2004 | Swahn |
| 2004/0066411 | A1 | 4/2004 | Fung et al. |
| 2005/0202385 | A1 | 9/2005 | Coward et al. |
| 2005/0203882 | A1* | 9/2005 | Godley ............... G06F 16/9566 |
| 2006/0085741 | A1 | 4/2006 | Weiner et al. |
| 2006/0112130 | A1 | 5/2006 | Lowson |
| 2007/0136313 | A1 | 6/2007 | Dutta |
| 2008/0005752 | A1 | 1/2008 | Morris |
| 2009/0006981 | A1 | 1/2009 | Pagan |
| 2009/0044142 | A1 | 2/2009 | Faris et al. |
| 2009/0125819 | A1 | 5/2009 | Hamilton, II et al. |
| 2009/0204900 | A1 | 8/2009 | Champion et al. |
| 2010/0079392 | A1 | 4/2010 | Chiang et al. |
| 2010/0138767 | A1 | 6/2010 | Wang et al. |
| 2012/0030664 | A1 | 2/2012 | Demant et al. |
| 2012/0042251 | A1 | 2/2012 | Rodriguez |
| 2013/0173291 | A1 | 7/2013 | Kelly et al. |
| 2013/0297206 | A1 | 11/2013 | Heng et al. |
| 2013/0305184 | A1 | 11/2013 | Kim et al. |
| 2014/0317556 | A1 | 10/2014 | Ellenich et al. |
| 2014/0325400 | A1 | 10/2014 | Zhao et al. |
| 2015/0006535 | A1* | 1/2015 | Hayden ............... G06F 17/2288 707/737 |
| 2015/0026548 | A1 | 1/2015 | Morris |
| 2015/0067605 | A1 | 3/2015 | Zambetti et al. |
| 2015/0186245 | A1 | 7/2015 | Hoen, IV et al. |
| 2015/0256652 | A1 | 9/2015 | Santoro et al. |
| 2016/0147400 | A1 | 5/2016 | Patten |
| 2016/0357388 | A1 | 12/2016 | Paine et al. |
| 2016/0378272 | A1 | 12/2016 | Whitlark et al. |

OTHER PUBLICATIONS

PCT International Search Report and Written Opinion, PCT Application No. PCT/US16/58720, dated Jan. 19, 2017, 14 pages.

United States Office Action, U.S. Appl. No. 15/334,244, dated Feb. 6, 2019, ten pages.

* cited by examiner

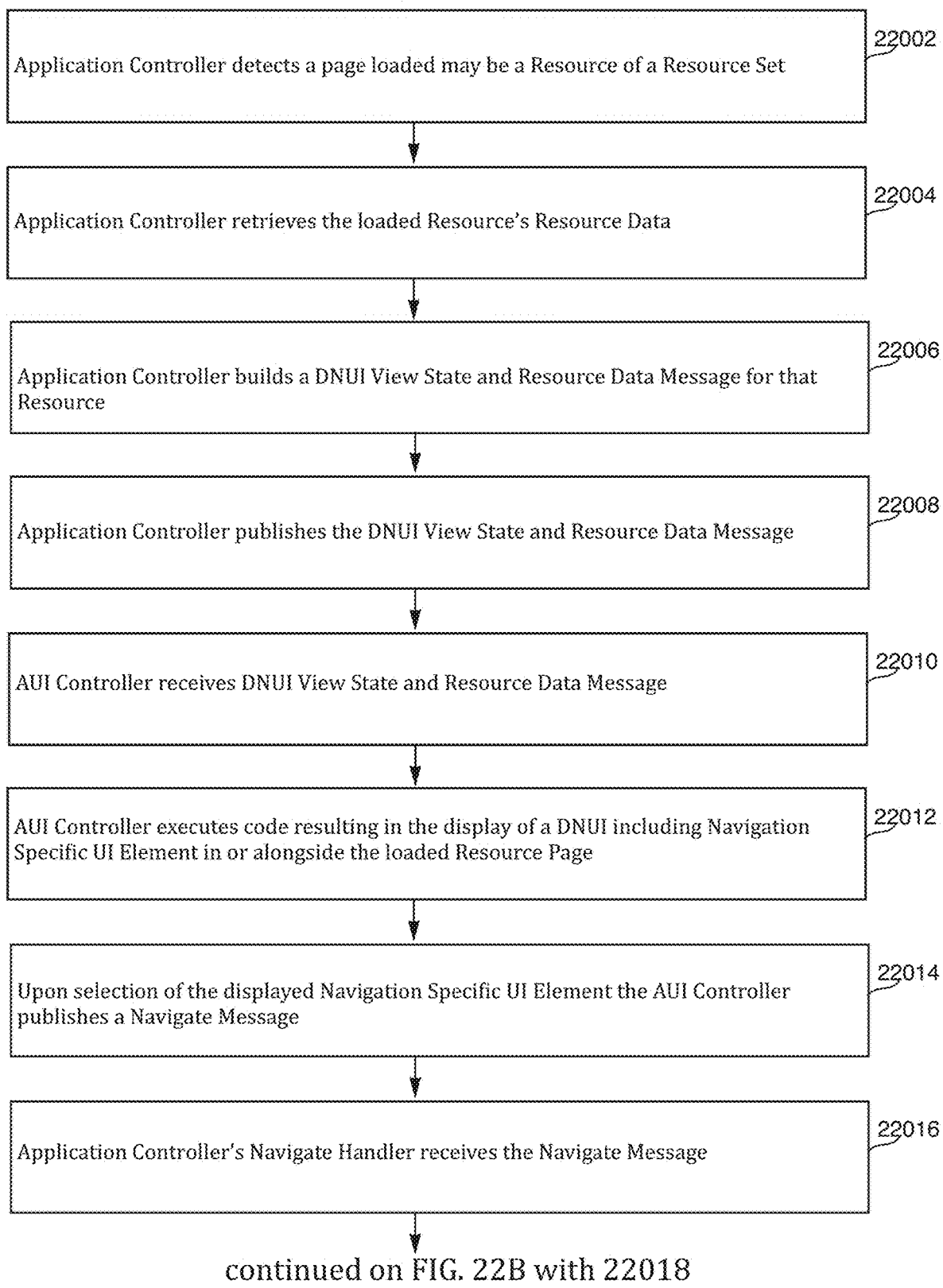

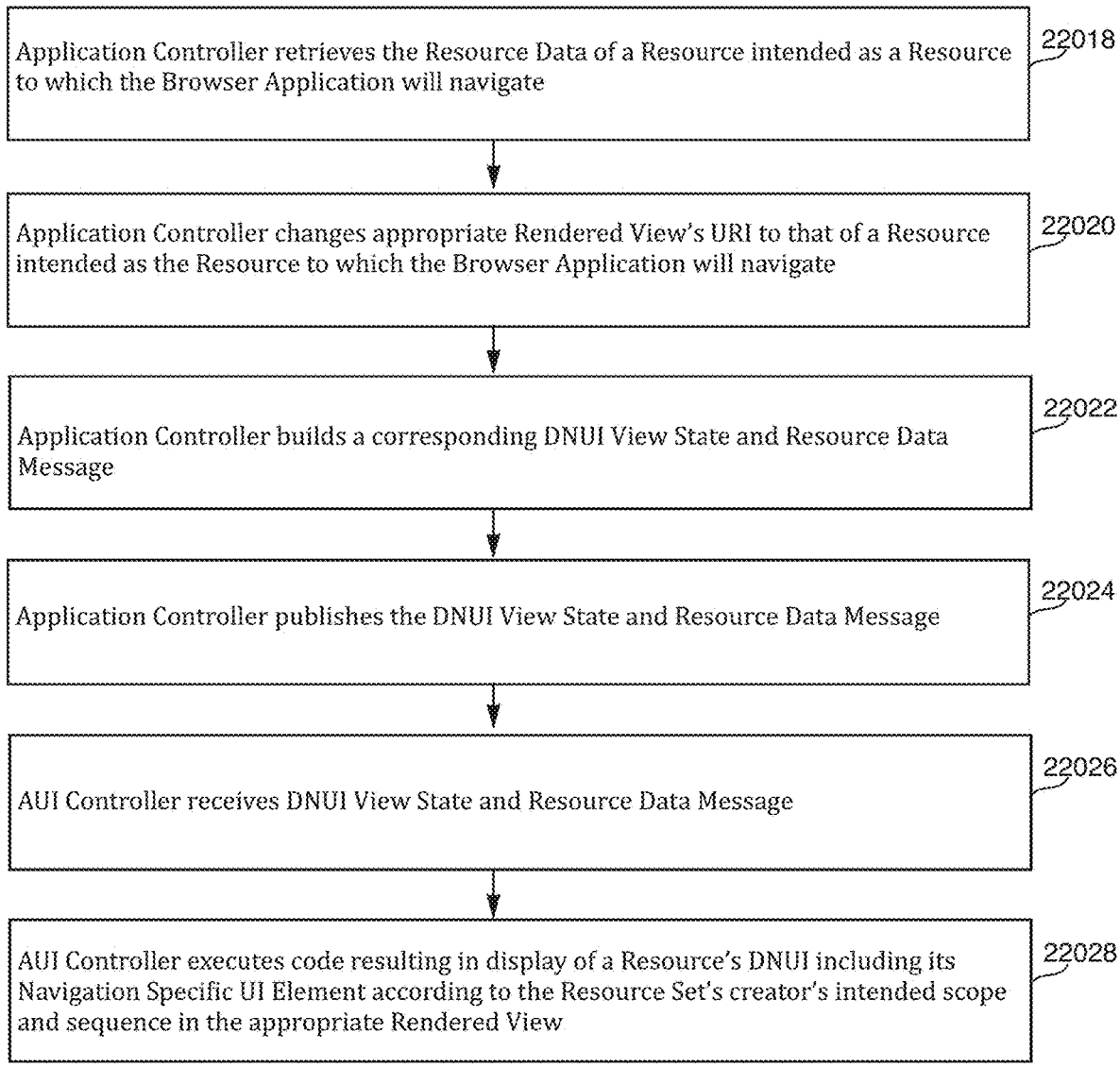

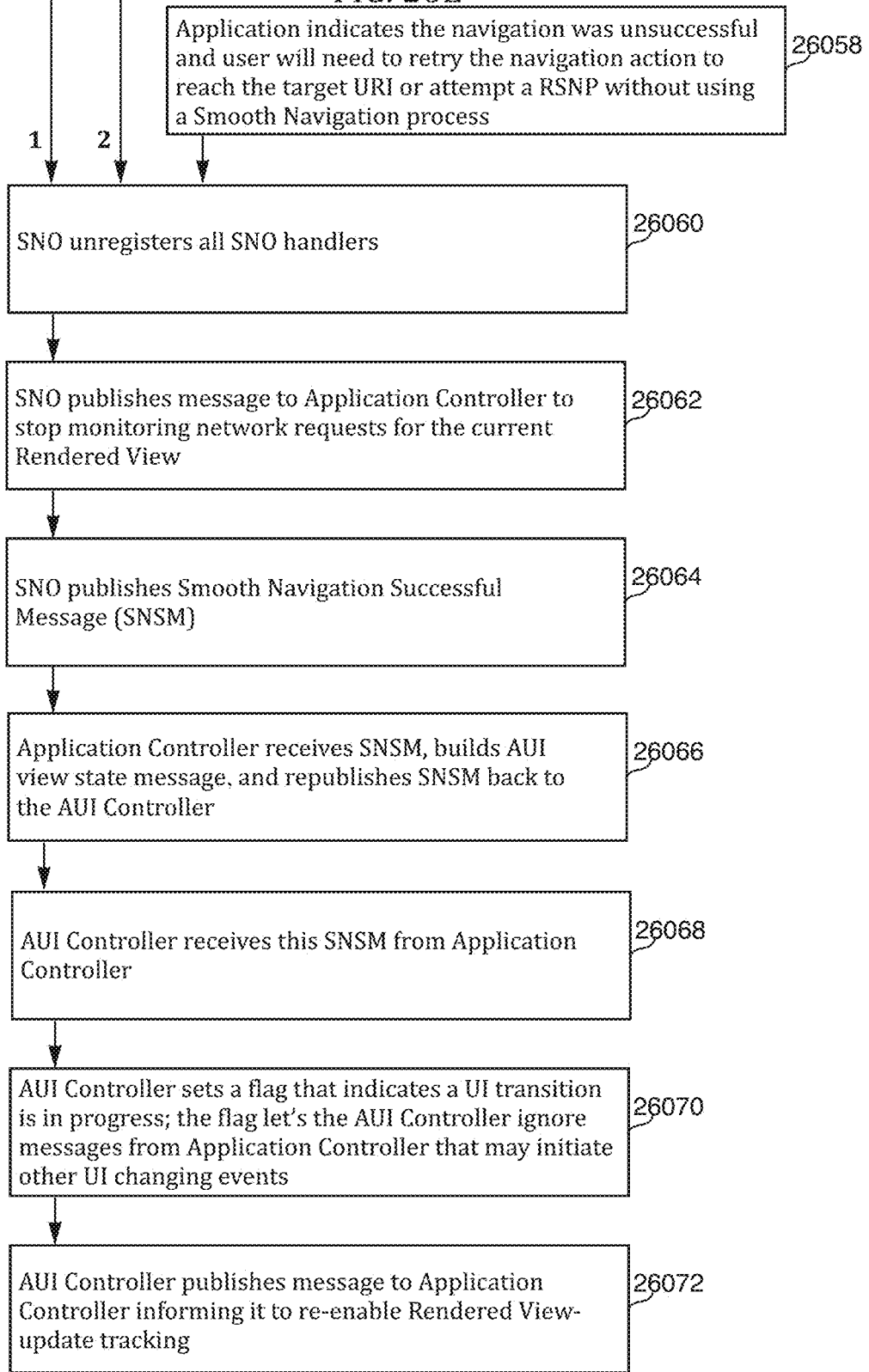

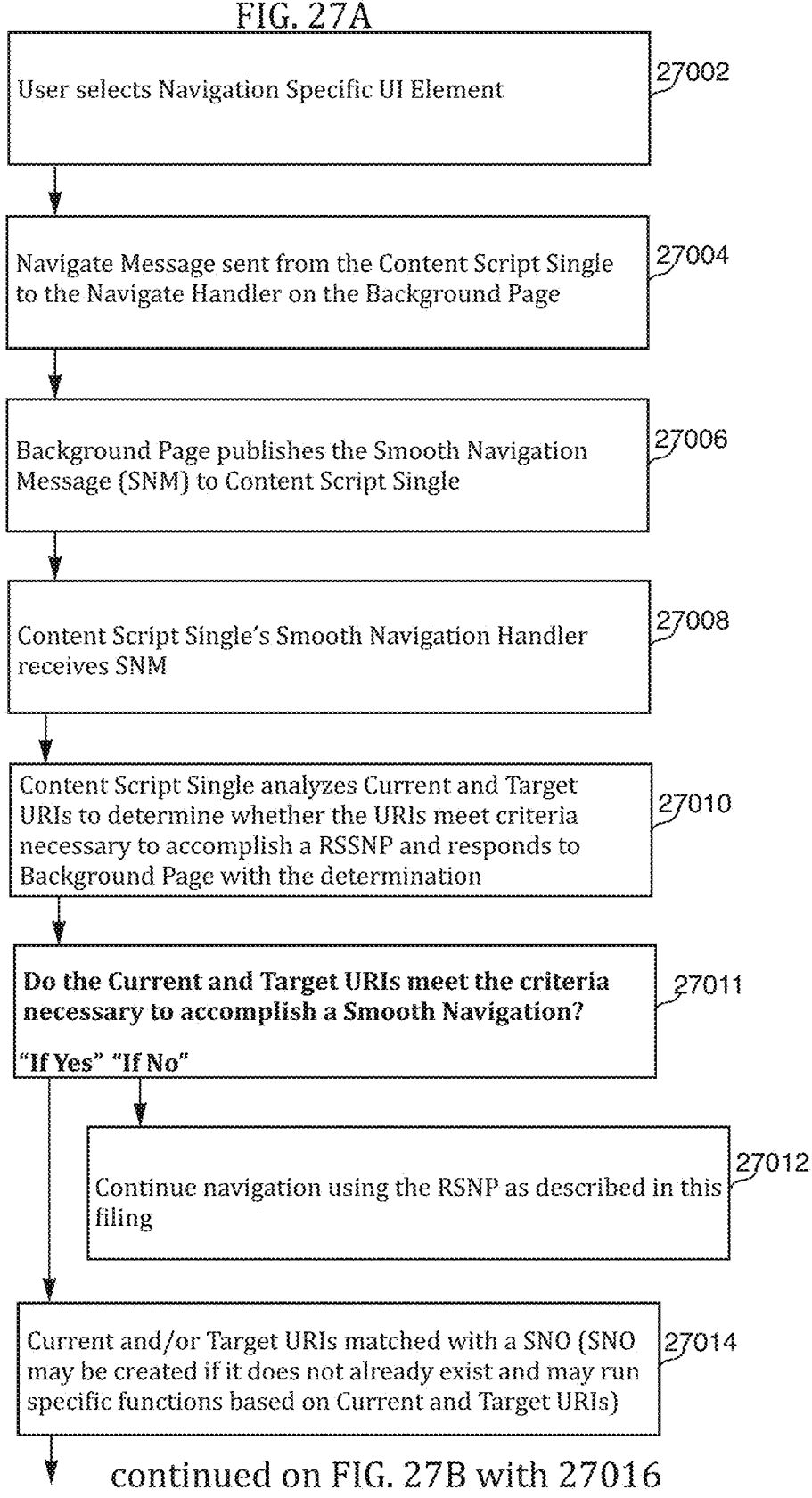

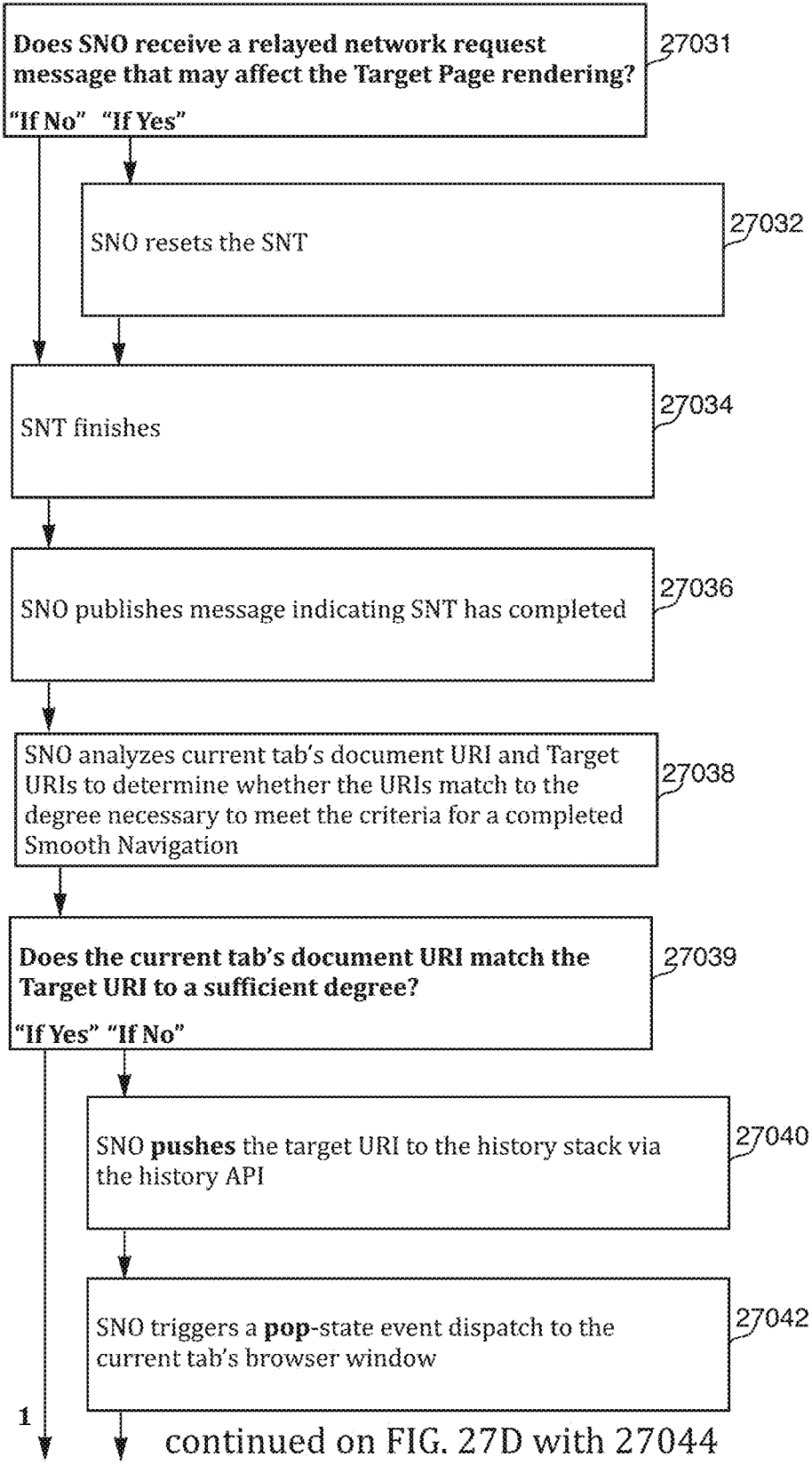

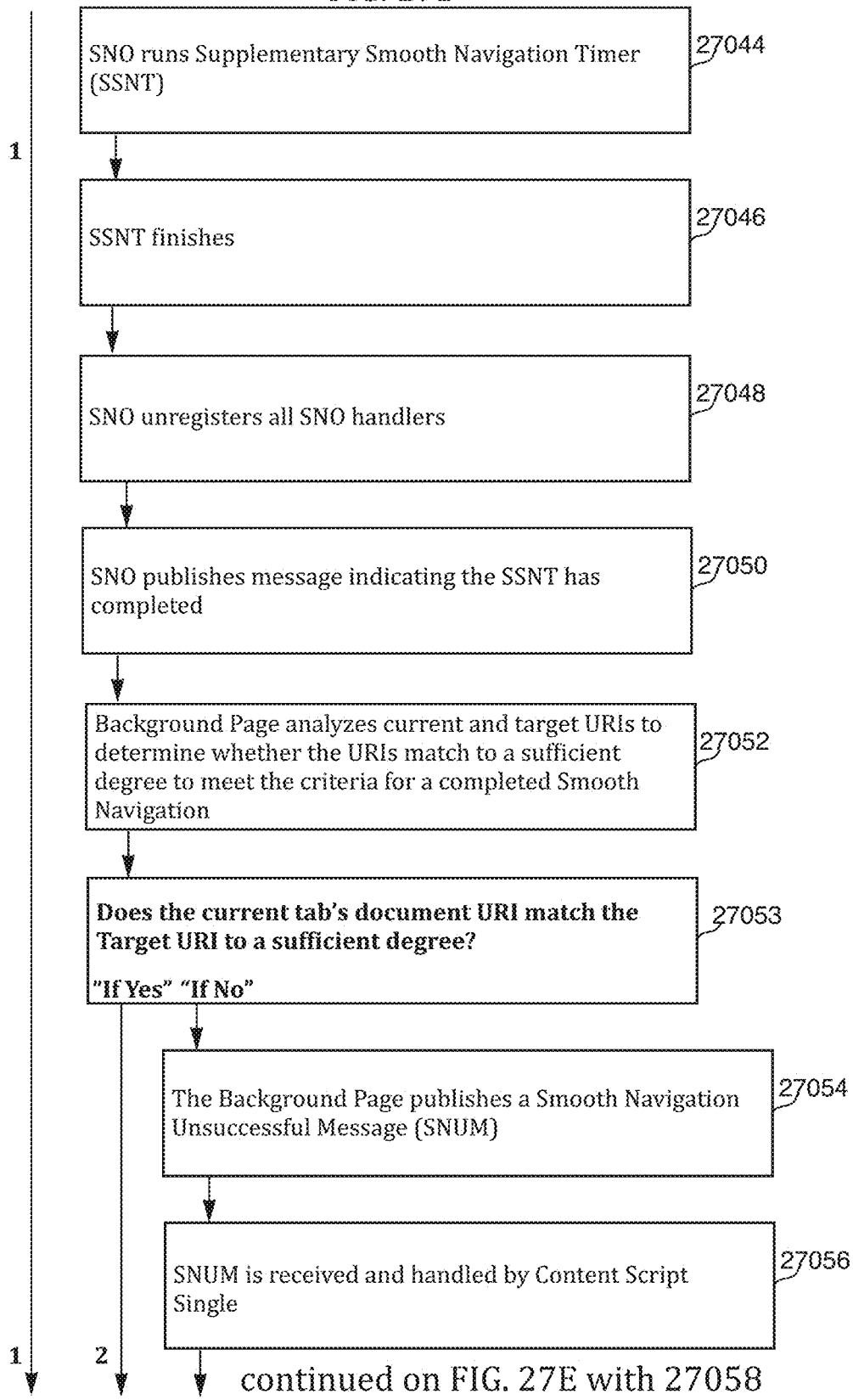

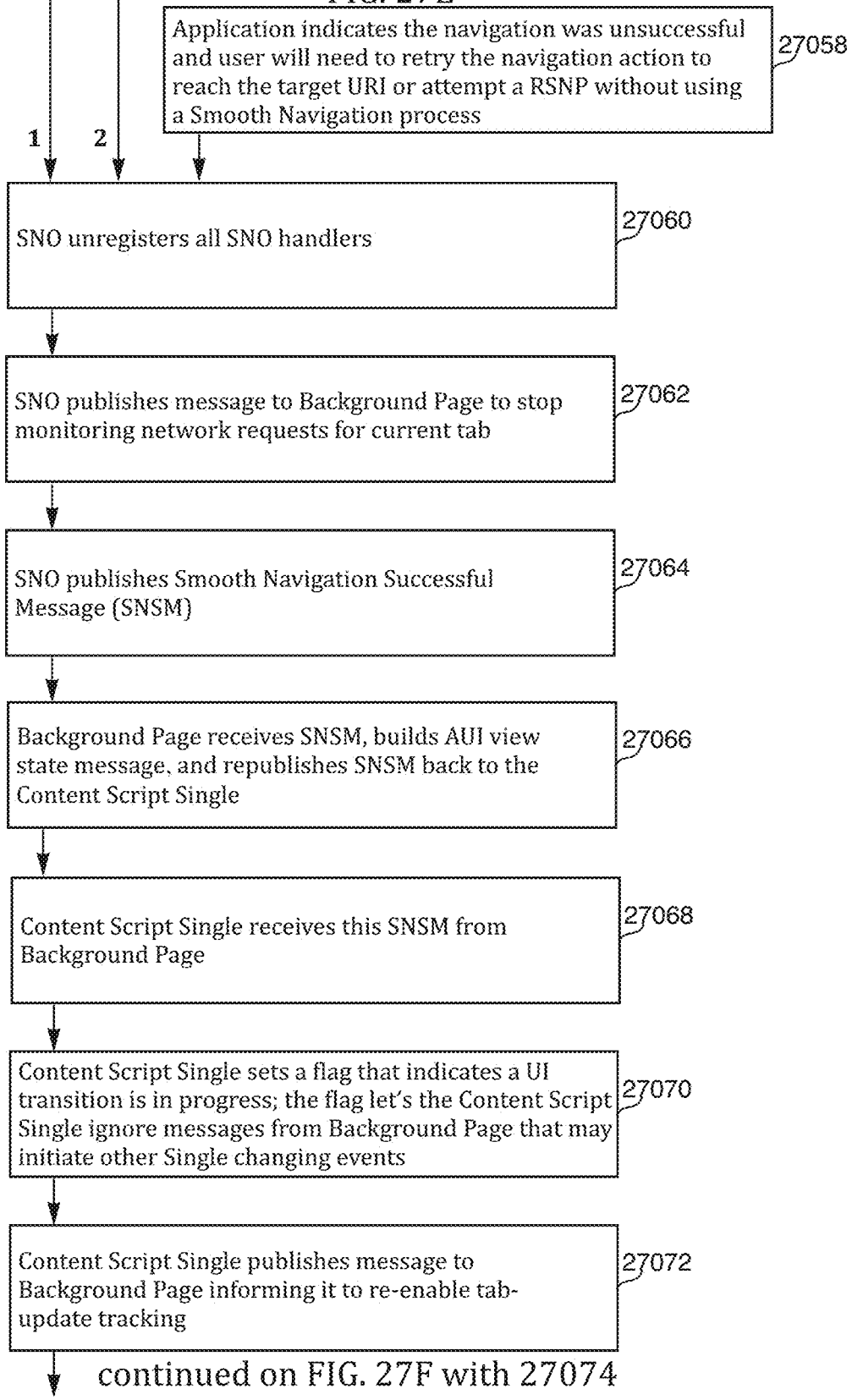

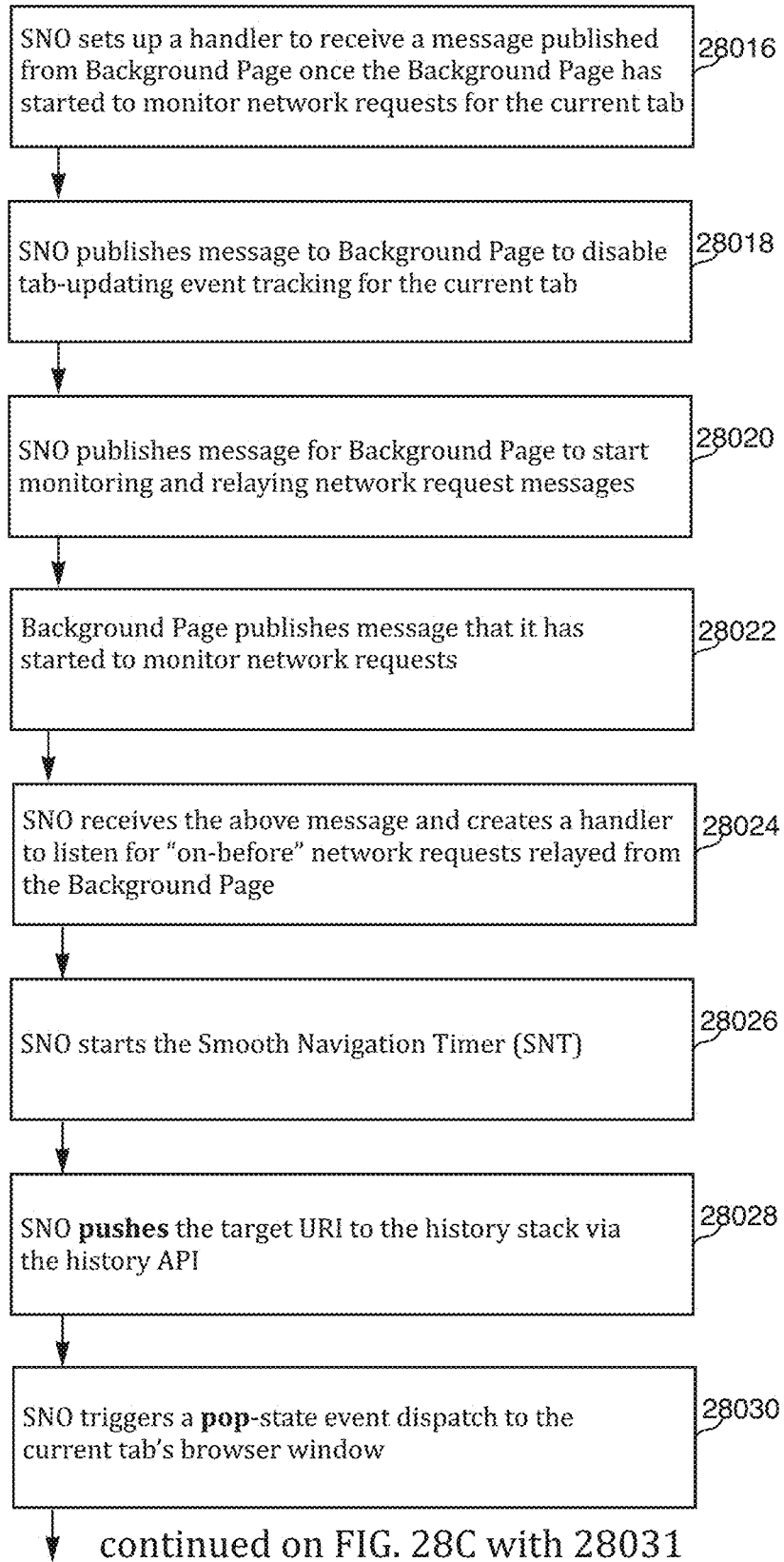

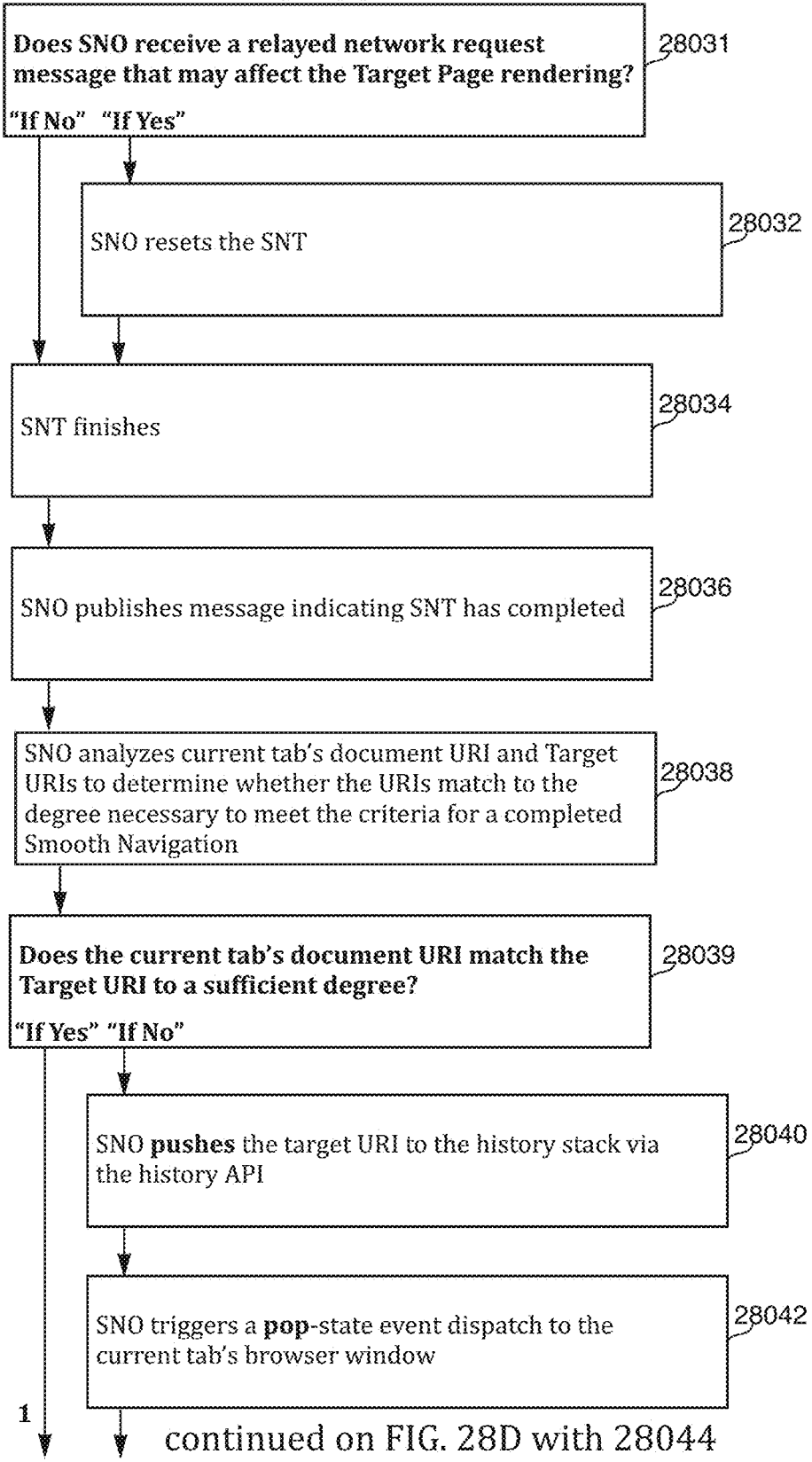

SMOOTH NAVIGATION BETWEEN RESOURCES IN A DIGITAL RESOURCE MANAGEMENT SYSTEM

RELATED APPLICATIONS

This application claims the benefit of U.S. Provisional Application No. 62/321,706 filed on Apr. 12, 2016, U.S. Provisional Application No. 62/340,940 filed May 24, 2016, and U.S. Provisional Application No. 62/393,594 filed Sep. 12, 2016, the contents of which are each incorporated by reference herein.

BACKGROUND

Technical Field

The present disclosure relates to generally to digital resource management and more specifically to navigating digital resources in a web browser.

Description of Related Art

There are billions of digital information resources available on computing devices, including those on computer networks such as the World Wide Web. A digital information resource can be hosted independently of other digital information resources on a computer network by being stored at a unique location defined by a unique Uniform Resource Identifier (URI). Each of these independently hosted digital information resources may provide unique and valuable content and/or functions.

Frequently, users may want to group and display one or more digital information resources as a defined, cohesive, and, at times, explicitly sequential hosted resource set. A user can present these digital information resource sets either to an external audience or to him/herself; the latter act often constituting study or review.

SUMMARY

In an embodiment, a method controls navigation of digital resources in a web browser application executing on a client device in a networked computer environment. A memory of the client device stores identifying parameters for digital resources to be displayed as part of a set of digital resources, including an ordered set of digital resources. A first digital resource in the set of digital resources is displayed in a digital resource viewing component. An indication is received to cause a navigation from the first digital resource to a second digital resource in the digital resource set. A processor determines that the stored identifying parameters indicate that the first and second digital resources match at least one predefined criteria. For example, determining that the resources match the predefined criteria may include determining that the resources are each provided by a same application services provider, including a map services provider. Responsive to determining that the first and second digital resource match the at least one criteria, the processor sends an identifier of the second digital resource to a history of the digital resource viewing component and triggers a pop-state event in the digital resource viewing component to cause the digital resource viewing component to display the second digital resource without completely clearing elements loaded in the digital resource viewing component to display the first digital resource.

In an embodiment, a timer is furthermore initiated that expires after a set duration. The client device monitors for a network request message and resets the timer upon detection of the network request message. Responsive to the timer expiring, an identifier of a displayed digital resource loaded by the resource viewing component is compared with the identifying parameters of the second digital resource. Responsive to determining that the identifier of the displayed digital resource and the identifying parameters of the second digital resource do not meet a predefined matching criteria, the processor, re-sends the identifier or sends an alternative identifier of the second digital resource to the history of the digital resource viewing component and re-triggers the pop state event. Responsive to determining that the identifier of the displayed digital resource and the identifying parameters of the second digital resource meet a predefined matching criteria, an indication is stored that navigation to the second digital resource is complete.

In another embodiment, a non-transitory computer-readable storage medium stores instructions that when executed by a processor causes the processor to perform the process steps described above.

In yet another embodiment, a computer device comprises a processor and a non-transitory computer-readable storage medium stores instructions that when executed by a processor causes the processor to perform the process steps described above.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIGS. 22A-22B are flowcharts illustrating an embodiment of a second process for navigating between digital resources using a dynamic navigation user interface using a browser-bound configuration.

FIGS. 26A-26F is a flowchart illustrating an embodiment of a second process for smoothly navigating between digital resources using a dynamic navigation user interface using a browser-bound configuration.

FIGS. 27A-27F is a flowchart illustrating an embodiment of a first process for smoothly navigating between digital resources using a dynamic navigation user interface using a page-bound configuration.

FIGS. 28A-28F is a flowchart illustrating an embodiment of a second process for smoothly navigating between digital resources using a dynamic navigation user interface using a page-bound configuration.

DETAILED DESCRIPTION

Figure 1:
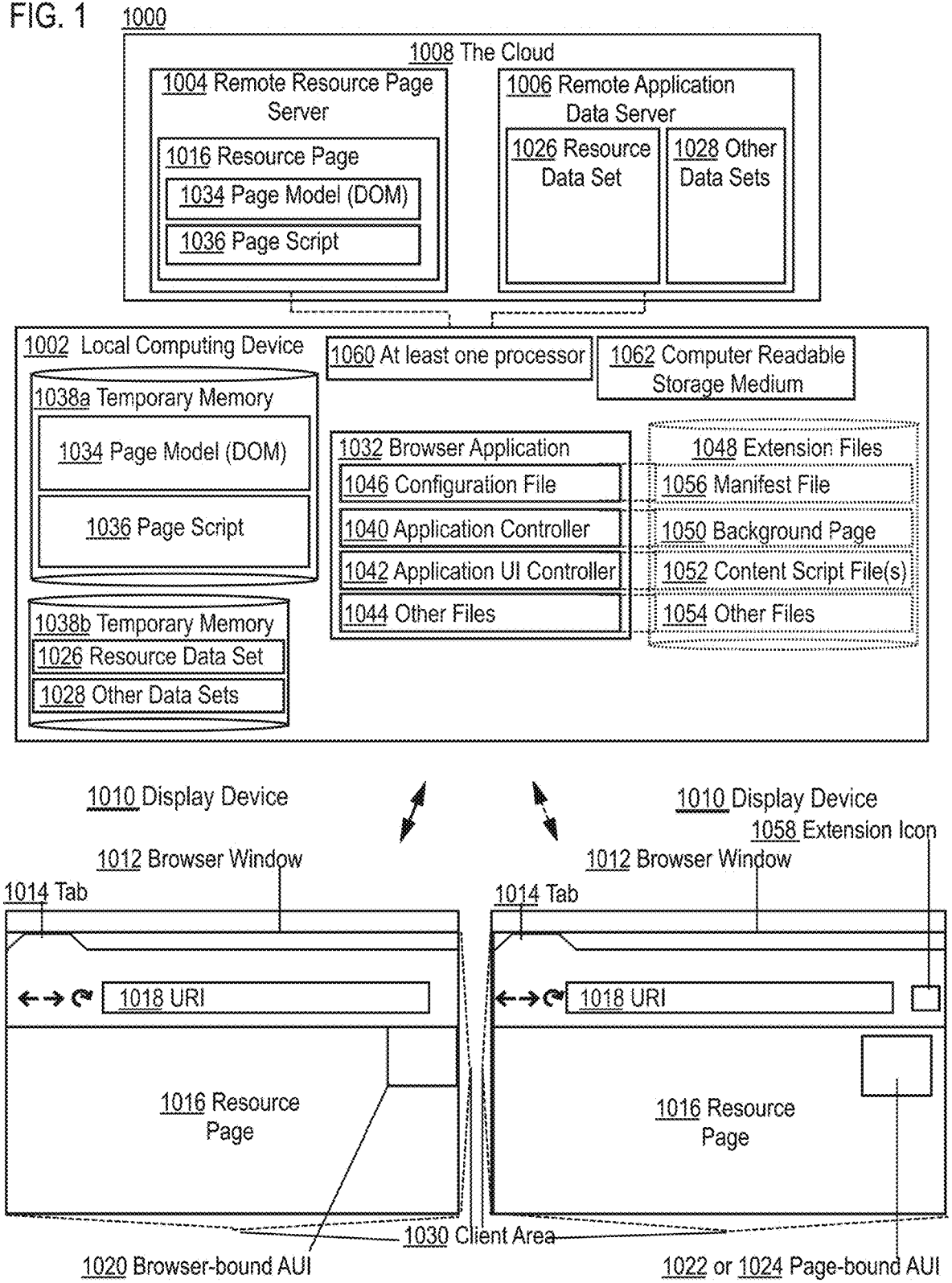
FIG. 1 is a block diagram illustrating a first example embodiment of a system for enabling navigation processes between digital resources in a networked computer environment.

The Figures (FIGS.) and the following description relate to various embodiments by way of illustration only. From the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

In a Resource Set Presentation Process (RSPP), a computer device enables a user to construct presentations from stored digital information resources, including ones hosted on a computer network. To do so, the RSPP spans the breadth of the information cycle, including information collection, organization, enrichment, and presentation, including sharing to one or more users. The RSPP is composed of other processes including but not limited to the Resource Set Navigation Process (Navigation Process) and the Resource Set Smooth Navigation Process (Smooth Navigation Process). A description of the Navigation Process and Smooth Navigation Process follows below.

Using the RSPP, a user can interact with the computer device to construct a presentation, including one composed of hosted digital information resources, useful for a number of pursuits including education, business, travel, and other fields. Using the example of a presentation composed of hosted digital information resources, a professor can quickly construct a presentation composed of a chapter from an eTextbook, a scholarly article, Google Map views centered on the place of study, a worksheet from ExcelOnline, and other resources available to the professor and her students; a financial analyst can quickly construct a presentation composed of a Google Doc containing an investment thesis, bank reports, Google Map views displaying areas relevant to an investment, a workbook from ExcelOnline, a stock chart from Yahoo Finance, and other resources available to the analyst and her associates; a travel agent or independent traveler can quickly construct a presentation composed of the traveler's daily itineraries, Google Map views showing tour routes, background information on tourist destinations, emergency contact information, and any other resources available to the travel agent, her clients, and/or the independent traveler. As implied above, each presentation may be composed of hosted digital information resources of unique origin.

An aspect of the RSPP is that each presentation constructed using the RSPP may convey the presentation's creator's intended scope and sequence of the constituent independent hosted digital information resources.

To provide this function, the RSPP may include a Resource Set Navigation Process (Navigation Process) in which a computer device enables a user to navigate between resources.

The RSPP may utilize a Resource Set composed of a discrete set of one or more Resources, each of which may be composed of one or more Resource Pages and/or Resource Page Selections and/or the one or more Resource Pages' and/or Resource Page Selections' associated Resource Data. A Resource Page may be a webpage or other displayed digital information resource. A Resource's Resource Pages may be each defined by a single identifier such as a URI or collectively defined by other identifying criteria such as partial matching of one or more URIs. A Resource Page Selection may be a specific view, state or collection of one or more elements of a Resource Page; a Resource Page Selection may be a Resource Page in its entirety. For the sake of clarity and readability a Resource Page may refer to both a Resource Page or Resource Page Selection in multiple instances throughout this disclosure. Resource Data is data that may include a Resource's organizational, informational, and/or locational attributes that is accessible, readable, and retrievable for use in the RSPP. Resource Data may include one or more of the following: each Resource's title; each Resource's Resource Page's network location (URI), Resource Pages' network locations (URIs), or Resource Pages' range of possible network locations (URIs); one or more attributes defining a Resource Page Selection; one or more Resource Sets, Groups, or Sub-Groups with which each Resource is associated; each Resource's display order within one or more Resource Sets; each Resource's displays of one or more of the Resource's URIs including displays of one or more URIs within DOM element pop-ups; each Resource's other informational context that includes tags, text files, audio files, instructions indicating which sections of a Resource Page to emphasize, and links to other Resources.

Resources may be organized in one or more Groups within and generated from one or more Group Sets, regardless of each Resource's underlying format, application, origin, source, or other objective attribute. A Group Set may contain and from it users may generate Groups. Groups may be defined by attributes different than and independent of those used to define those Groups contained in and/or that have been generated within other Group Sets. For example, a user may utilize both a Group Set named Queue and a Group Set named Subjects. Queue may be the Group Set with which a user may associate Resources that the user will organize in additional ways at a later time. Subjects may be the Group Set from which a user generates more specific Groups. One or more Resources may be associated with each Group in multiple ways including by associating the unifying attribute defining the Group with each Resource intended for organization as part the Group. For example, each Group, and thus its unifying attribute, may correspond with a specific pursuit such as education, business, and travel. In such a case, a user might choose to create Groups from the Subject Group Set such as Education, News, Finance, or Travel.

In addition, Sub-Groups may be created within each Group. Sub-Groups include both a Sub-Group derived from a Group as well as a Sub-Group derived from another Sub-Group. The latter is for the sake of clarity and readability. In many instances, Sub-Group may refer to a Sub-Group derived from a Sub-Group derived from another Sub-Group, and so on. The number of possible divisions is limited only by the number of Resources in the Group or Sub-Group from which additional Sub-Groups can be derived. A Sub-Group may be created and defined in multiple ways including by associating one or more Resources with an attribute other than the unifying attribute or attributes defining the Sub-Group's parent Group or Sub-Group. Using an "Education" use case in which a presentation is composed of hosted digital information resources as an example, a user may want to associate one or more Resources associated with the Education Group with an additional attribute such as Ancient Rome. A user may want to associate one or more of the same or other Resources associated with the Education Group with an additional attribute such as Chemistry. By associating one or more Resources within the Education Group with the Ancient Rome and Chemistry attributes the user can create the Sub-Groups of Ancient Rome and Chemistry, respectively. As shown throughout this disclosure, a Group may be refined to its constituent Sub-Groups by applying one or more attributes as tags, each associated with the Sub-Group and serving as its unifying attribute, to the parent Group. Similarly, for the Finance Group a user might create Sub-Groups such as Forecasts, Valuations, Research, etc. For the Travel Group a user might create Sub-Groups based on a destination attribute such as World Cup 2016, National Park Tour, Caribbean Cruise, etc.

To enable navigation from one presentation resource to a next presentation resource the RSPP may utilize the Navigation Process. The Navigation Process enables the repetitive selection of the same Navigation Specific UI Element in the Dynamic Navigation User Interface (DNUI) to result in the display of Resources in a Resource Set according to the Resource Set's creator's intended scope and sequence. A Navigation Specific UI Element refers to a UI element that may include directional arrows or buttons indicating concepts of sequence that are displayed in order to provide the means with which a next (next or previous of an ordered set) Resource in the Resource Set can be accessed according to the Resource Set's creator's intended scope and sequence. The DNUI is a user interface that makes certain functions, including some or all of the following, available to the user: 1) repetitive selection of the same Navigation Specific UI Element in the DNUI to result in the display of one or more Resources in a Resource Set according to the Resource Set's creator's intended scope and sequence; 2) the display of Resource Data specific to each Resource in a Resource Set;

3) the means to access any Resource Data within any Resource Data Set; 4) the means to edit any Resource Data within any Resource Data Set; and 5) the means to share any Resource Data Set with any number of computing devices and servers on a computer network. The Resource Set Navigation Process and variations thereof are described in detail below.

Figure 18:
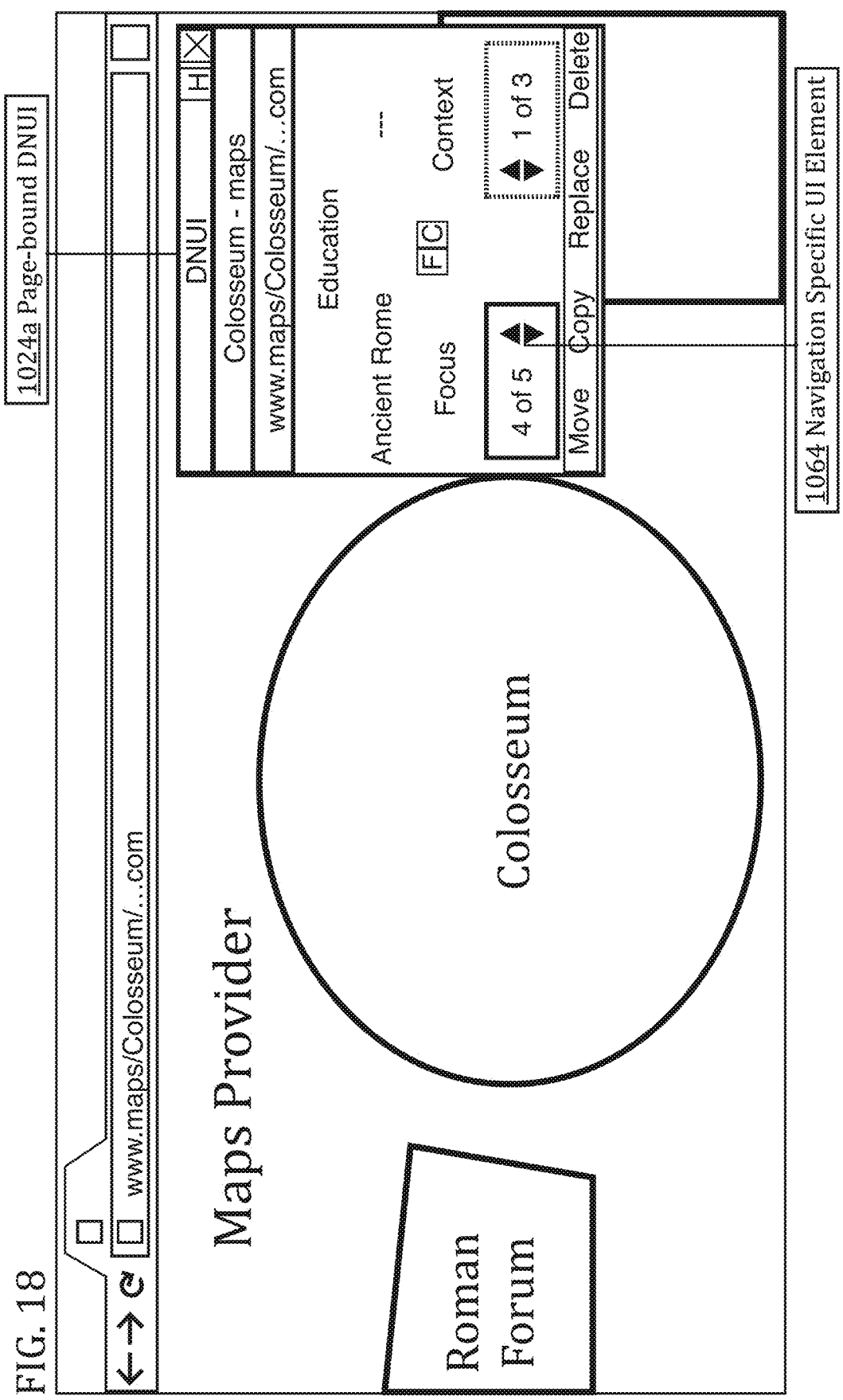
FIG. 18 is a block diagram illustrating a first example embodiment of user interface components and functional modules for implementing a smooth navigation process between digital resources using a page-bound dynamic navigation user interface according to an education example.
Figure 19:
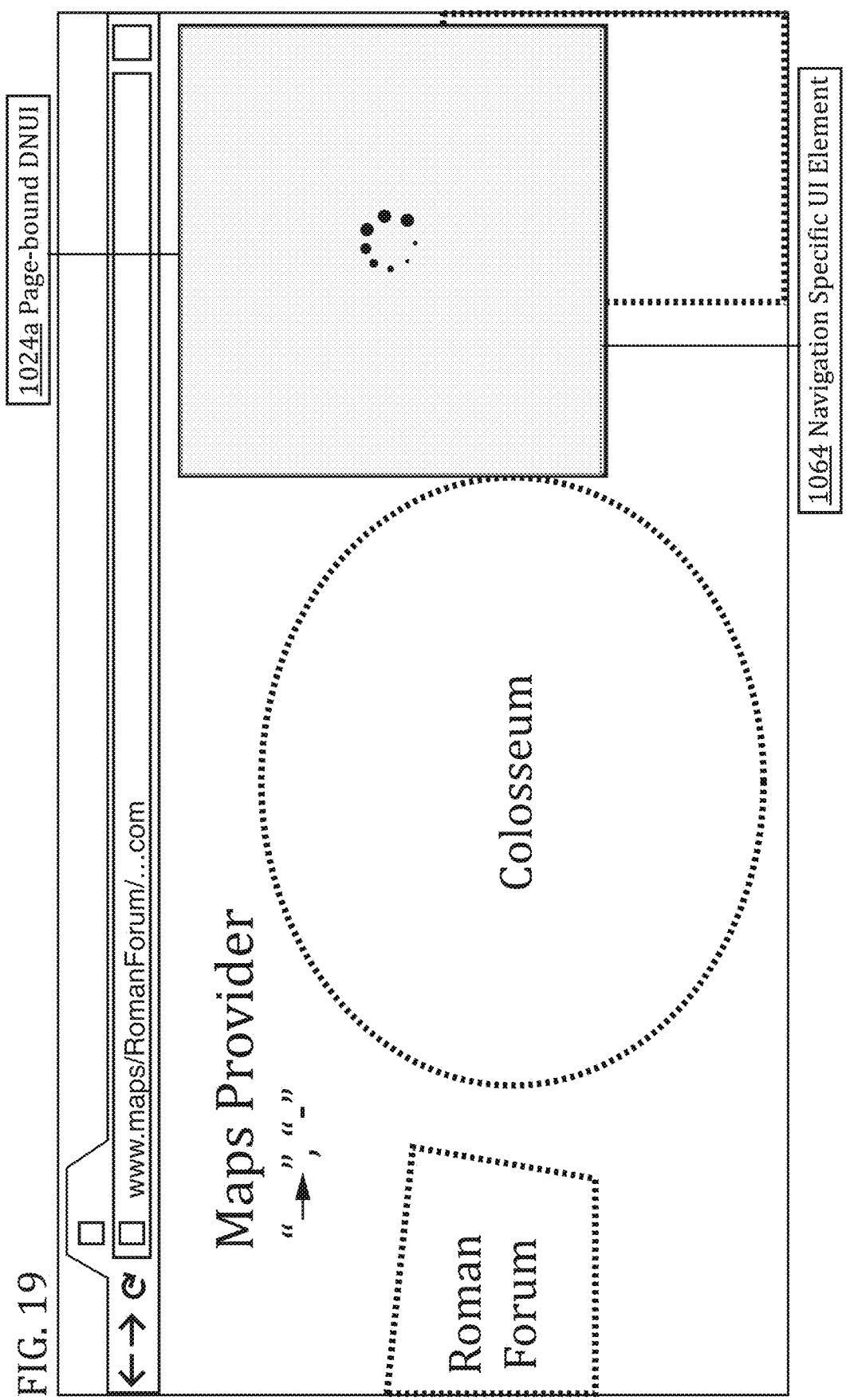
FIG. 19 is a block diagram illustrating a second example embodiment of user interface components and functional modules for implementing a smooth navigation process between digital resources using a page-bound dynamic navigation user interface according to an education example.
Figure 20:
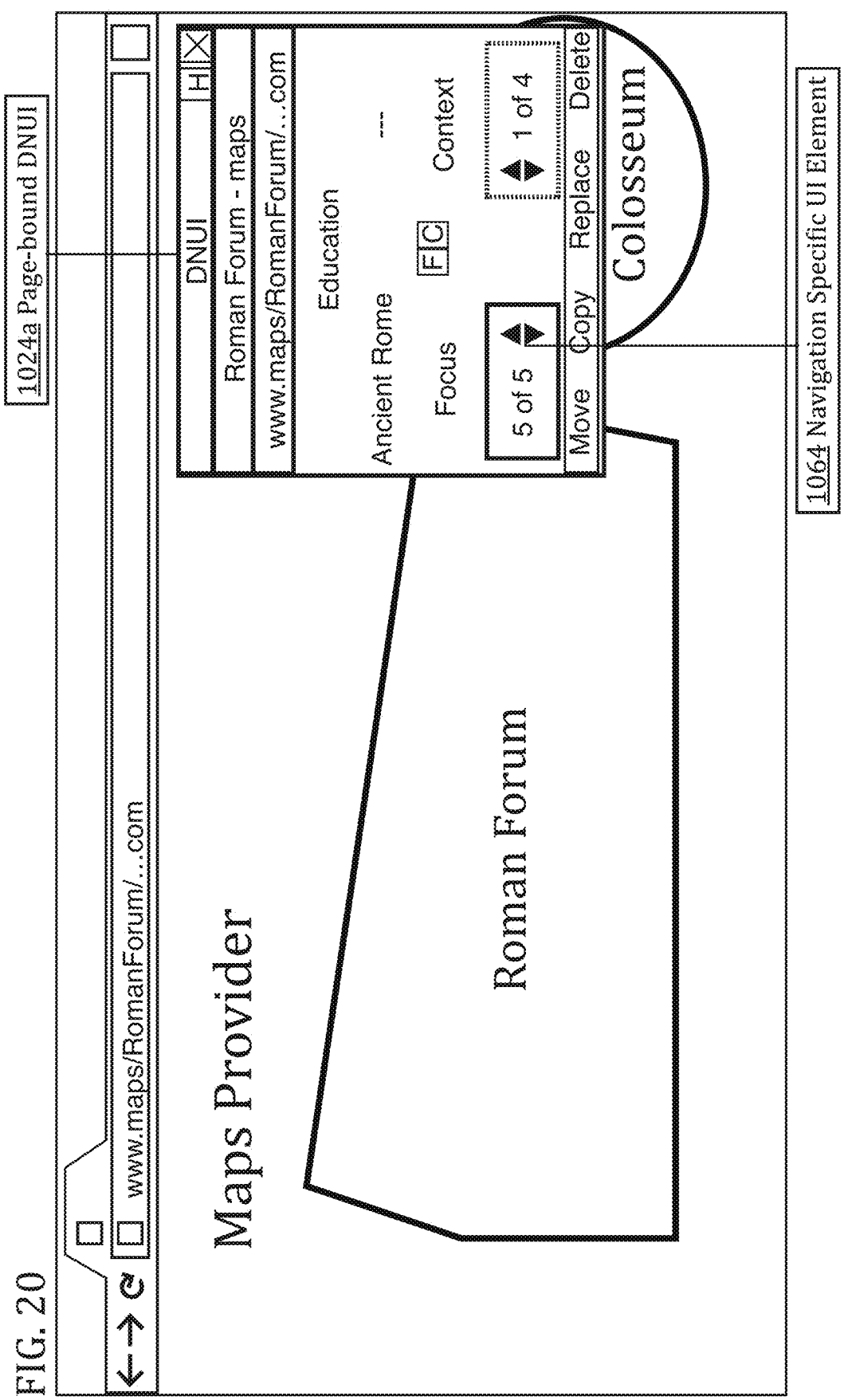
FIG. 20 is a block diagram illustrating a third example embodiment of user interface components and functional modules for implementing a smooth navigation process between digital resources using a page-bound dynamic navigation user interface according to a education example.

In some cases, an additional process, the Smooth Navigation Process may be used in place of or in addition to the Navigation Process. The Smooth Navigation Process may facilitate navigation between an initial URI and Target URI (generally, a Target URI may be a URI of the Resource to which the navigation proceeds) by using the browser's history API and pop-state functionality. The Smooth Navigation Process allows a navigation to complete without clearing all elements loaded to display a first Resource before displaying a second Resource, thus providing improved visual continuity and, in many cases, faster view loading times. The Smooth Navigation Process may take place between Resources of a Resource Set, including an ordered Resource Set. FIGS. 18-20 provide a graphic overview of how Smooth Navigation may be used following the "Education" example noted above. These figures provide examples of how Resources may be displayed at different stages during execution of a Smooth Navigation Process.

The description below provides additional details of the Navigation Process and Smooth Navigation Process and the relation of each to the other.

FIG. 1 is a block diagram of a system 1000 for performing several of the Resource Set Presentation Processes including the Navigation Process and Smooth Navigation Process. In the example of FIG. 1, a Local Computing Device 1002 is illustrated as communicating with multiple remote servers, one or more Remote Resource Page Servers 1004 and a Remote Application Data Server 1006, in The Cloud 1008 in order to provide, using a Display Device 1010, one or more Browser Windows 1012 with Tabs 1014 each of which may display 1) a Resource Page 1016 at a URI 1018, the Resource Page 1016 being stored at a Remote Resource Page Server 1004 (each independently hosted Resource Page 1016 may have its own Remote Resource Page Server 1004); and/or 2) an Application User Interface (AUI) (e.g., a Browser-bound AUI 1020, a Page-bound AUI 1022, or a Page-bound AUI 1024) that may include Resource Data of a Resource Data Set 1026 and Other Data of Other Data Sets 1028 that may be stored at the Remote Application Data Server 1006 and other elements which are stored in various system components at different times in the Resource Set Presentation Process (RSPP). FIG. 1 shows two examples of how an AUI could be rendered in a Tab 1014 of a Browser Window 1012 and displayed in the Client Area 1030 of the Display Device 1010. An AUI also may be rendered in a separate pop-up window not specifically illustrated in the example of system 1000.

Figure 2:
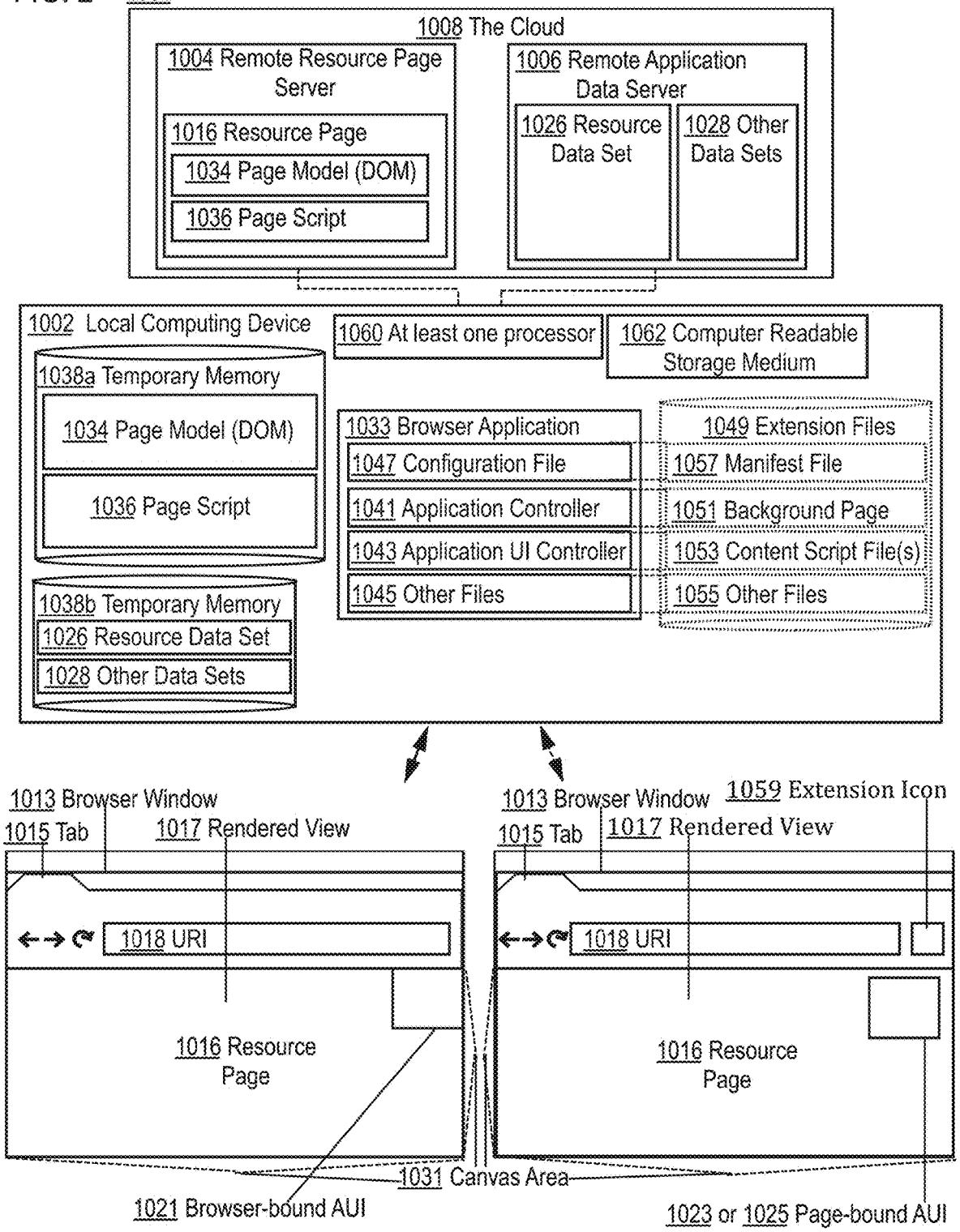
FIG. 2 is a block diagram illustrating a second example embodiment of a system for enabling navigation processes between digital resources in a networked computer environment.

System 1001 of FIG. 2 shows an alternative configuration to system 1000 of FIG. 1. In the example of FIG. 2, a Local Computing Device 1002 is illustrated as communicating with a Remote Resource Page Server 1004 and a Remote Application Data Server 1006, in The Cloud 1008 in order to provide, using a Display Device 1010, a Browser Window 1013 with a Tab 1015 and Rendered View 1017 (generally, a Rendered View represents an object representing the contents of a webpage displayed in a pop-up window or tab of a browser window; a tab and/or browser window may display the contents of one or more Rendered Views simultaneously) which may display 1) a Resource Page 1016 of the URI 1018, the Resource Pages 1016 being stored at Remote Resource Page Servers 1004 (each independently hosted Resource Page 1016 may have its own Remote Resource Page Server 1004); and/or 2) an Application UI (AUI) (e.g., a Browser-bound AUI 1021, a Page-bound AUI 1023, or a Page-bound AUI 1025) that may include Resource Data of a Resource Data Set 1026 and Other Data of Other Data Sets 1028 that may be stored at the Remote Application Data Server 1006 and other elements which are stored in various system components at different times in the Resource Set Presentation Process (RSPP). FIG. 2 shows two examples of how an AUI could be rendered in a Rendered View 1017 of Tab 1015 of a Browser Window 1013 and displayed in the Canvas Area 1031 (generally, the Canvas Area may be the portion of a Browser Window that may be used to display one or more Resources, Resource Pages, and/or webpages) of the Display Device 1010. An AUI also may be rendered in a separate pop-up window not specifically illustrated in the example of system 1001.

In the description of FIGS. 1 and 2 that follows many components are numbered using numerical references to both FIGS. 1 and 2. In each case, the dual numerical reference is used to consolidate descriptive language that may apply to the component configured for both system 1000 and 1001. For example, "Browser Window" may be followed by the numerical reference 1012/1013 to indicate that the associated descriptive language applies to both the Browser Window of system 1000 and 1001, respectively.

Continuing on, the components desirable for an example implementation of the Browser-bound AUI 1020/1021 shown in FIGS. 1 and 2 are illustrated and discussed in detail in FIGS. 3, 4, 7, and 8. The components desirable for example implementations of the Page-bound AUI 1022 shown in FIG. 1 are illustrated and discussed in detail in FIGS. 5, and 9. The components desirable for example implementations of the Page-bound AUI 1024 shown in FIG. 1 are illustrated and discussed in detail in FIGS. 6, and 10. FIGS. 3, 4, 5, 6, 7, 8, 9, and 10 are provided for the sake of clarity and serve only as examples of the components desirable to render the Browser-bound AUI and Page-bound AUI and how each may be utilized in the Navigation Process and Smooth Navigation Process.

With slight modification, those components represented in FIGS. 3, 4, 7, and 8 could render a Page-bound AUI instead of a Browser-bound AUI for use in the Navigation Process and Smooth Navigation Process. Also with slight modification, those components represented in FIGS. 5, 6, 9, and 10 could render a Browser-bound AUI instead of a Page-bound AUI for use in the Navigation Process and Smooth Navigation Process.

A Local Computing Device 1002 may generally represent a computing device that may be configured to execute an otherwise conventional Browser Application 1032, and to communicate over a network with the Remote Resource Page Server 1004 and the Remote Application Data Server 1006. For example, the Local Computing Device 1002 may represent any standard desktop or personal computing device, such as any laptop, notebook, netbook computer, any tablet computer, any smartphone or other mobile computing device, or any virtual reality headset. Such computing devices, and other computing devices, may be configured to access each Remote Resource Page Server 1004 and Remote Application Data Server 1006 over one or more computer networks, in any conventional manner. For example, many Local Computing Devices may include various types of network-related hardware/software which enable the Local Computing Device 1002 to communicate over the public internet, private intranet, or other network, with each Remote Resource Page Server 1004 and Remote Application Data Server 1006. The Display Device 1010 may represent one or more of a conventional type of display such as a monitor, touch-screen, virtual reality, or other type of visual or auditory display. In many cases, a single Local Computing Device 1002 may be associated with multiple displays. For the sake of readability, Display Device 1010 may refer to either a single display device and/or multiple display devices. The Client Area 1030 represents the portion of the Display Device 1010 that may be used to display one or more Browser Windows or other windows displaying digital resources.

In the description below, it is generally assumed that the Local Computing Device 1002 and the Browser Application 1032/1033 communicate with each Remote Resource Page Server 1004 and Remote Application Data Server 1006 over the public internet, and therefore use standard and conventional protocols for identifying, retrieving, and rendering each Resource Page 1016 and Data, including Resource Data of the Resource Data Set 1026, e.g., from a web server represented by Remote Resource Page Server 1004 and from a Remote Application Data Server 1006. However, it will be appreciated that such examples are provided merely for the sake of clarity and conciseness, and are not intended to be limiting of the different ways in which the Local Computing Device 1002 may identify, retrieve, render, or display Resource Pages and Data, including Resource Data, in association with the Browser Application 1032/1033, Browser Window 1012/1013, Tab 1014/1015, and Rendered View 1017.

In this description, it may generally be assumed that each Resource Page 1016 represents any of the many types of hosted information resources in the form of webpages that are available over the public internet. For example, a Resource Page 1016 may represent a substantially static page that includes text, sound, images, or other content which may be displayed within a Browser Window 1012/1013. In other examples, a Resource Page 1016 may include different types of dynamic or interactive content that can be engaged and manipulated by the user within the context of a Browser Window 1012/1013. In many instances, Resource Page 1016 and/or associated executable code may represent an application which may execute partially or completely at a Remote Resource Page Server 1004 (e.g., may utilize the processor, memory, and other hardware/software resources of the Remote Resource Page Server 1004), while providing associated functionality and features to the user via Browser Window 1012 (and perhaps executing at least partially locally at the Local Computing Device 1002). As just referenced, such hosted information resources in the form of webpages and associated functionalities and applications are well-known to be implementable using various, conventional programming languages and techniques including hypertext markup language (HTML), Asynchronous JavaScript (AJAX), Extensible Markup Language (XML), JavaScript, JavaScript Object Notation (JSON), and many other types of code which may be executed.

In FIGS. 1 and 2, a Resource Page 1016 at a Remote Resource Page Server 1004 is illustrated as including, or being associated with, a Page Model 1034 and a Page Script 1036. The use of such a Page Model 1034 and Page Script 1036 is known to and would be readily apparent to one of skill in the art and as such is not described in detail herein.

During a conventional rendering of a Resource Page 1016 by the Browser Application 1032/1033, a Temporary Memory 1038*a*, (e.g., a cache memory) at the Local Computing Device 1002 may be used to store temporarily the Page Model 1034 and the Page Script 1036. This, however, is meant to provide an example, and it may be appreciated that the Browser Application 1032/1033 may partially or completely access the Page Model 1034 and/or the Page Script 1036 remotely at the Remote Resource Page Server 1004. In this way, the Browser Application 1032/1033 may utilize the Page Model 1034 and the Page Script 1036, e.g., in a conventional manner, so as to thereby render a Resource Page 1016 within the Browser Window 1012/1013 provided by the Browser Application 1032/1033.

Similarly, and as implied by system 1000/1001, Application Data, including a Resource Data Set, may be downloaded from its Remote Application Data Server 1006 to the Local Computing Device 1002 and stored in Temporary Memory 1038*b* for use by the Application Controller 1040/1041 (generally, an application controller may represent a set of handlers (message or event handlers) and/or the application's associated business logic and other data elements). However, it may be appreciated that there are other possible ways with which Application Data, including Resource Data, can be made accessible to the Application Controller 1040/1041. For example, Resource Data can be created and stored locally and then shifted to temporary memory for use by the Application Controller 1040/1041. Also, locally stored Resource Data can be combined with the Resource Data Set 1026 initially stored at Remote Application Data Server 1006; this combination can then be stored in temporary memory as a larger Resource Data Set for use by the Application Controller 1040/1041.

The Application Controller 1040/1041, in coordination with the Application UI Controller 1042/1043 (described in detail below) and Other Files 1044/1045, provides that each Resource Page and/or Resource Page Selection may be rendered according to and, at times, alongside its specific Resource Data as a Resource displayed in a Browser Window 1012/1013; thus, the Application Controller 1040/1041 may be thought of as what links the files on each Remote Resource Page Server 1004 with the Resource Data files on Remote Application Data Server 1006. The Application Controller 1040/1041 in coordination with the Application UI Controller 1042/1043 and Other Files 1044/1045 may provide the basis for combining the traditional functions of a Browser Application and Display Device to create visual and functional relationships between Resources; thus, the Application Controller 1040/1041 also may be thought of as what links one independent Resource to another.

As implied above, an AUI Controller's 1042/1043 functions often fall between an AUI and the Application Controller 1040/1041. These functions may include the following: 1) convey AUI inputs to Application Controller 1040/1041 which the Application Controller can interpret to build the Application UI View State and Resource Data Message corresponding to the inputs to the AUI; 2) inform the Application Controller 1040/1041 it is ready to receive the Application UI View State and Resource Data Message; 3) receive the Application UI View State and Resource Data Message; and 4) interpret and execute the tasks of the Application UI View State and Resource Data Message, ultimately resulting in the display of one or more AUIs in one or more Browser Windows 1012/1013. An Application UI View State and Resource Data Message may be one or more messages containing an Application UI View State (generally, an Application UI View State is executable code defining and containing the elements useful for the display and function of an AUI), Resource Data, and/or instructions useful for execution and display of a specific AUI by the AUI Controller. The Application UI View State and Resource Data Message may come in several forms including the Dynamic Navigation UI View State and Resource Data Message. A Dynamic Navigation UI View State and Resource Data Message may be one or more messages containing the Dynamic Navigation UI View State (generally, executable code defining and containing the elements useful for the display and function of a DNUI), Resource Data, and/or instructions useful for execution and display of a Resource specific DNUI by the AUI Controller. The Dynamic Navigation UI View State and Resource Data Message is an example of an Application UI View State and Resource Data Message. How it can be used is described in detail below. The Dynamic Navigation UI View State and Resource Data Message may be used in multiple implementations of the Navigation Process and Smooth Navigation Process. How it can be used is described in detail below.

The AUI Controller 1042/1043 may represent more than one AUI Controller. For example, for the descriptions and figures of system 1000 AUI Controller 1042 may represent multiple AUI Controllers including an AUI Controller for one or more tabs. Likewise, for the descriptions and figures of system 1001 AUI Controller 1043 may represent multiple AUI Controllers including an AUI Controller for each Rendered View of a Browser Window.

A shared Configuration File 1046/1047 and Other Files 1044/1045 are useful to support many implementations of the Navigation Process and Smooth Navigation Process. Other Files 1044/1045 may include the following file types: HTML files, JSON files, cascading style sheets (CSS) files, JavaScript files, image files, audio files, and text files.

As implied by system 1000/1001, the Application Controller 1040/1041, the AUI Controller 1042/1043, and Other Files 1044/1045 provide functionality to the Browser Application 1032/1033. The Application Controller 1040/1041, AUI Controller 1042/1043, and Other Files 1044/1045 can do so either by being directly incorporated into the Browser Application 1032/1033 or by being made available for use by the Browser Application as a set of files that provide additional features or functionalities in association with the Browser Application. In system 1000/1001, these files are shown as the Extension Files 1048/1049 but may, as may be understood from the more detailed description below, generally refer to browser extensions, add-ons, active X controls, web applications (web apps, apps) or any other program code which is designed to augment an appearance or functionality of the Browser Application 1032/1033 in providing the Browser Window 1012/1013 and page and elements rendered within it. The Background Page 1050/1051, Content Script File(s) 1052/1053, and Other Files 1054/1055 are outlined with a dotted line and connected with dashed lines to the Application Controller 1040/1041, AUI Controller 1042/1043, and Other Files 1044/1045 respectively, to indicate that the Background Page 1050/1051, Content Script File(s) 1052/1053, and Other Files 1054/1055 provide functions similar to the functional components with which each is connected by the dashed lines in an alternative implementation of system 1000/1001. That is, in the latter alternative arrangement and implementation, the Background Page 1050/1051 may fulfill one or more functions of the Application Controller 1040/1041; Content Script File(s) 1052/1053 may fulfill one or more functions of the AUI Controller 1042/1043; and the Other Files 1054/1055 may fulfill one or more functions of the Other Files 1044/1045. The Manifest File 1056/1057 is outlined with a dotted line and connected with dashed lines to the Configuration File 1046/1047, to indicate that the Manifest File 1056/1057 may provide an alternative arrangement to and implementation of part or all of Configuration File 1046/1047. That is, in the latter alternative arrangement and implementation, some or all functions of the Configuration File 1046/1047 may be embodied in the Manifest File 1056/1057.

As described herein, the Extension Files 1048/1049 may be utilized in the system 1000/1001 to provide additional features or functionalities in association with the Browser Application 1032/1033, and thus with respect to the Browser Window 1012/1013. In the example of system 1000/1001, an Extension Icon 1058/1059 represents an icon that is provided in conjunction with the Browser Application 1032/1033. The Extension Icon 1058/1059 may be produced by or in conjunction with the various Extension Files 1048/1049.

A browser extension generated by the Extension Files 1048/1049 may generally refer to a browser extension, add-on, active X control, web applications (web app, app) or any other program code which is designed to augment an appearance or functionality of the Browser Application 1032/1033 in providing the Browser Window 1012/1013 and page and elements rendered within it. As such, the Extension Files 1048/1049 may include one or more of various types of files, such as, for example, HTML files, JSON files, CSS files, JavaScript files, image files, audio files, text files, or other type of code or content that may be used to extend the features and functionalities provided by the Browser Application 1032/1033.

Some or all of the Extension Files 1048/1049 may be understood to be virtually indistinguishable in appearance, structure, and function with respect to otherwise conventional webpages which might be rendered by the Browser Application 1032/1033. Such files can use all the functionality of the Browser Application 1032/1033 with respect to the rendering of webpages. For example, those Extension Files 1048/1049 virtually indistinguishable in appearance, structure, and function with respect to otherwise conventional webpages may use the various application program interfaces (APIs) that the Browser Application 1032/1033 provides to external webpages such as Resource Page 1016.

In additional examples of the Extension Files 1048/1049, an associated extension may provide functionality to the Browser Application 1032/1033, such as a browser action to be implemented by the Browser Application 1032/1033 when the extension in question is relevant to most or all pages to be rendered by the Browser Application 1032/1033 within the Browser Window 1012/1013.

Thus, with respect to the simplified example of the system 1000/1001, a browser action of the Extension Files 1048/1049 may cause the Extension Icon 1058/1059 to appear within the Browser Window 1012/1013 essentially independently of the Resource Page 1016. Further, as is known, other extension functions may be implemented automatically in conjunction with an operation of the Browser Application 1032/1033, e.g., in conjunction with the loading and rendering of the Resource Page 1016. Further, as is known, other extension functions may be implemented programmatically. That is, for example, an extension may be configured to execute in a manner that is dependent upon a user's selection of a feature of the Browser Application 1032/1033. An extension also may be configured so that can it can add multiple functions to the Browser Application 1032/1033 by utilizing one or more of the implementations described above. For example, an extension may be configured so that it executes one or more of these functions automatically and one or more of these functions programmatically. Such an example is described in the figures and text below.

In the simplified example of the system 1000/1001, the Extension Files 1048/1049 are illustrated as being stored locally to the Local Computing Device 1002. For example, a user of the Local Computing Device 1002 may program and store the Extension Files 1048/1049 for use by the Browser Application 1032/1033. In additional or alternative examples, however, it may be appreciated that some or all of the Extension Files 1048/1049 may be accessed remotely. For example, a particular extension may be packaged within a single folder or archive that may then be accessed by the Browser Application 1032/1033. For example, a provider and/or distributor of the Extension Files 1048/1049 (not specifically illustrated in the example of system 1000/1001) may construct and package the Extension Files 1048/1049, and a user of the system 1000/1001 may thereby download and install a desired extension, including accessing, downloading, and installing the Extension Files 1048/1049 at the Local Computing Device 1002, as shown.

As mentioned, the Extension Files 1048/1049 include various different types of files. For example, the Extension Files 1048/1049 may include a Manifest file 1056/1057 which contains information about the extension, such as, its most important files and capabilities and provides configuration information to the Browser Application 1032/1033 that will affect the behavior of the extension at runtime. In another example, as illustrated in the example system 1000/1001, the Extension Files 1048/1049 may include a background file or background page, commonly an HTML page, which is generally known to represent an invisible page which holds the main logic of the extension, and which may thus run in the background so as to be always-available in case of some initiation of a relevant extension action. In system 1000/1001, the Background Page 1050/1051 fulfills this function (and other functions) and by doing so, may fulfill the role of Application Controller 1040/1041 when provided. For example, for an extension installed on the Local Computing Device 1002 that includes the Extension Files 1048/1049, a browser action may be defined to have some effect on the rendering of the Resource Page 1016 via the Browser Window 1012/1013. Thus, the Extension Icon 1058/1059 may represent or be associated with such a browser action, and the associated Background Page 1050/1051 may be defined by an HTML file which has JavaScript code that controls a behavior of the browser action associated with the Extension Icon 1058/1059.

It may be appreciated that the Extension Files 1048/1049 may include various other types of files as well. For example, the Extension Files 1048/1049 may include other types of HTML pages, such as, for example, an HTML page associated with the browser action providing a pop-up window in association with the Browser Window 1012/1013. These may work in coordination with an AUI to provide some of the functions of the Extension Files 1048/1049. Thus, as described, HTML pages and associated code within the Extension Files 1048/1049 may include a background page associated with the Background Page 1050/1051, as well as a pop-up page associated with a corresponding pop-up file (not specifically illustrated in the example of system 1000/1001).

As illustrated in the example of system 1000/1001, and as referenced above, the Extension Files 1048/1049 may include, or be associated with Content Script File(s) 1052/1053 which would provide functions of the AUI Controllers 1042/1043. As is known, the Content Script File(s) 1052/1053 may represent, or include, one or more content scripts that enable an associated extension to interact with webpages, e.g., the Resource Page 1016. For example, the content script or content scripts of the Content Script File(s) 1052/1053 may be implemented as JavaScript that executes in the context of a Resource Page 1016 as loaded into the Browser Application 1032/1033. Therefore, the content script or content scripts of the Content Script File(s) 1052/1053 may be considered effectually part of a loaded page, instead of being considered part of an extension with which the content script or content scripts of the Content Script File(s) 1052/1053 was packaged.

Content scripts, generally speaking, may be configured to read details of webpages visited by the Browser Application 1032/1033, and may be further configured to make changes to such pages. For example, a content script may be configured to read and/or modify the Page Model (e.g., DOM) 1034 of a Resource Page 1036. The specific process for this is known.

As described in detail herein, the content script or content scripts of the Content Script File(s) 1052/1053 may be enabled to communicate with the Background Page 1050 of the relevant Extension Files 1048/1049 or with other files/pages associated with the Extension Files 1048/1049. For example, as described in detail or implied below with respect to FIGS. 5, 6, 9, and 10 the content script or content scripts of the Content Script File(s) 1052 may be enabled to exchange messages with an associated Background Page 1050. For example, the content script or content scripts of the Content Script File(s) 1052/1053 might send such messages to the associated Background Page 1050/1051 in response to some detected event. Additionally, the associated Background Page 1050/1051 may be enabled to send a message to the content script or content scripts of the Content Script File(s) 1052/1053 to request the content script or content scripts to change the appearance of the relevant browser page, (e.g., the Resource Page 1016) in a desired manner. FIGS. 5, 6, 9, and 10 describe in detail the message exchange between the content script or content scripts of the Content Script File(s) 1052 and the associated Background Page 1050 and how it is used to result in the display of an AUI, including a Dynamic Navigation UI.

In more specific examples, the content script or content scripts of the Content Script File(s) 1052/1053 may include JavaScript files running in a context of a Resource Page 1016 being rendered. In some example implementations, such as those in FIGS. 5, 6, 9, and 10 the content script or content scripts of the Content Script File(s) 1052 should always, or by default, be injected into a Resource Page 1016 to be loaded. For example, such content script or content scripts of the Content Script File(s) 1052/1053 may be registered in the Manifest File 1056/1057 of Extension Files 1048/1049 with the corresponding extension. Further, it may be appreciated that a given extension may be configured to insert multiple content scripts into a Resource Page 1016 during the rendering thereof, where each such content script may have multiple JavaScripts, or other types of content script content.

In the example of system 1000/1001, the Local Computer Device 1002 is illustrated as including at least one processor 1060, as well as a non-transitory Computer Readable Storage Medium 1062. That is, for example, the Local Computing Device 1002 may rely on two or more processors executing in parallel to achieve a desired result. Meanwhile, the non-transitory Computer Readable Storage Medium 1062 may represent any conventional type of computer memory which may be used, for example, to store instructions which, when executed by the at least one processor 1060, cause the Browser Application 1032/1033 and/or other components of the Local Computing Device 1002 and the Display Device 1010 to perform various functions, including other relevant functions described herein and the processes described below.

The Servers 1004, 1006 may similarly comprise at least one processor and a non-transitory computer readable storage medium that stores instructions that when executed by the at least one processor causes the at least one processor to perform the functions attributed to the respective Servers 1004, 1006 described herein.

In the example of FIGS. 1-10 elements and components are illustrated including discrete functional modules. However, it may be appreciated that such illustration is merely for the sake of example, and that other implementations are possible. Also the figures do not imply that the functional components and their respective functions must exist as a single logical structure or in the locations and components shown in these diagrams. For example, a single element or component of the Browser Application 1032/1033 may be implemented by two or more elements or and components. Conversely, two or more components of the Browser Application 1032/1033 may be executed using a single component. The Application Controller 1040/1041 and its embodiment in a Background Page may access these components and may contain or directly access several sub-components, functions, and data structures not explicitly shown in system 1000/1001.

Figure 3:
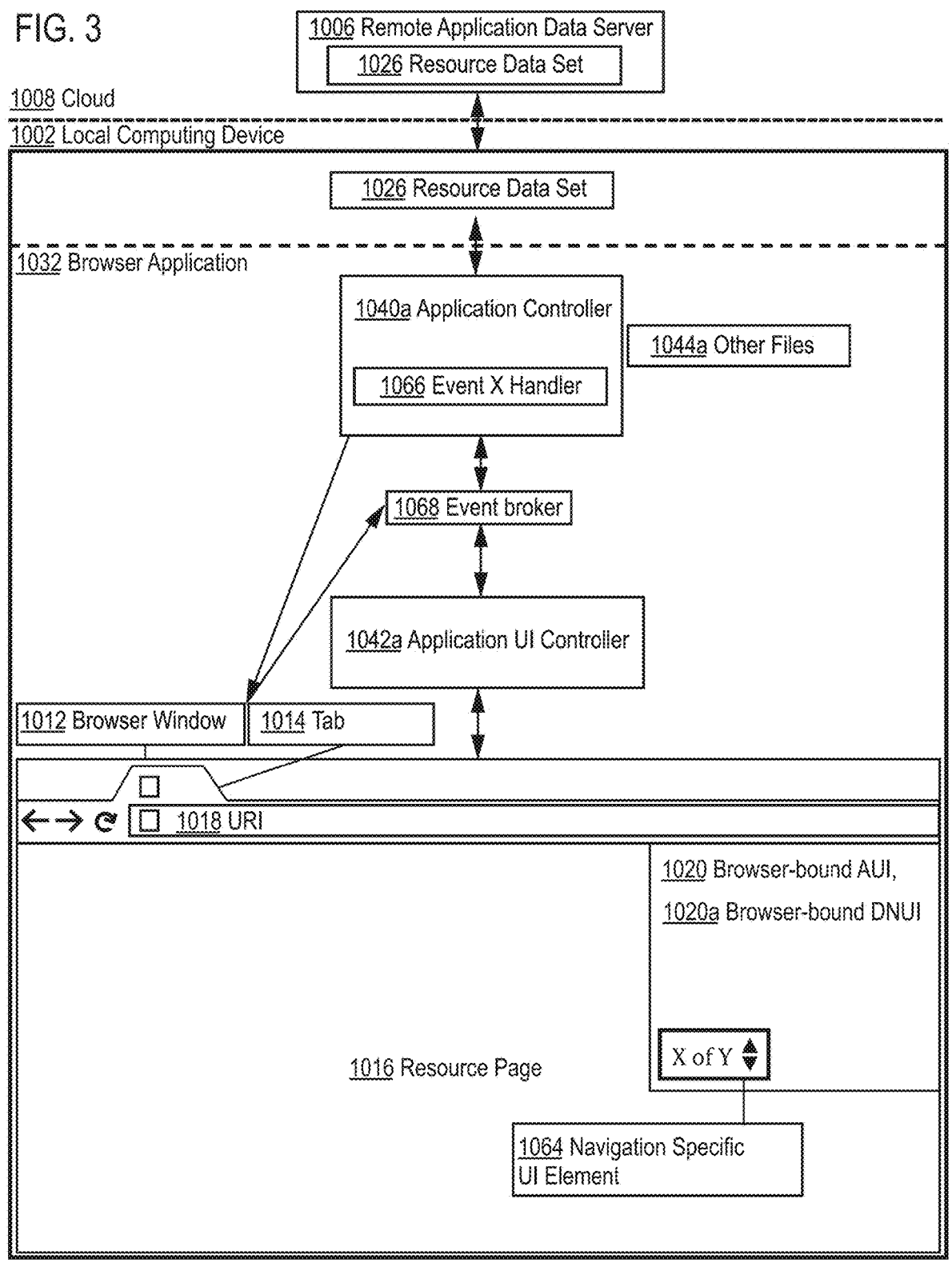
FIG. 3 is a block diagram illustrating a first example embodiment of user interface components and functional modules for implementing a navigation process and a browser-bound dynamic navigation user interface.

FIG. 3 is a diagram illustrating a non-limiting example of the components and messaging processes for an implementation of the Navigation Process using a Browser-bound DNUI 1020*a*. In this example, the Browser-bound DNUI 1020*a* is shown directly incorporated into the Browser Window 1012 of Display Device 1010 rather than in the Resource Page 1016 displayed in Browser Window 1012. The positioning of the Browser-bound DNUI 1020 in the top-right corner of the Browser Window 1012, thus overlapping what would otherwise be the top-right corner of Resource Page 1016 area, is merely for the sake of example and other implementations, positioning, sizing, configurations, etc. are possible. For a non-limiting example, with slight modification of system 1000 components, the AUI represented in these figures as a Browser-bound DNUI 1020*a* could be made to display and behave as a Page-bound DNUI 1022 or 1024.

Once a Resource Page 1016 has been recognized as part of a Resource Set, the Browser-bound AUI 1020, in the form of the Browser-bound DNUI 1020*a*, may serve as both the starting and ending point of the Navigation Process. The start of the process may begin with the explicit representation on the Browser-bound DNUI 1020*a* of the current Resource Page's 1016 place within the scope and sequence of the Resource Set of which the Resource Page is a part. Navigation Specific UI Elements 1064 on the Browser-bound DNUI 1020*a*, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1064 is shown. In this example the "X" represents the displayed Resource's order within the numbered scope of the Resource Set of which the Resource is a part. For example, if the displayed Resource is the third resource within a Resource Set of five Resources, the "X" will be "3" and the "Y" will be "5". The arrows to the right of "X" and "Y" allow the user to access a next Resource with the Resource Set in a single click; this element can be displayed in the same place for each Resource and thus serve as a single point of selection to navigate sequentially, forwards and backwards, through the entire scope of the Resource Set. Upon selection of the Navigation Specific UI Element 1064 the AUI Controller 1042*a* receives an indication of the event. The AUI Controller 1042*a* then messages the Application Controller's 1040*a* Event X Handler 1066 (Navigate Handler) through the Event Broker 1068 indicating a target Resource that the Browser should display based on the selection of the Navigation Specific UI Element 1064. A Navigate Handler is a kind of Event X Handler that may comprise one or more handlers that receives the Navigate Message to continue the Navigation Process. There may be more specific kinds of Navigate Handlers that may affect a specific kind of navigation. For example, to affect a navigation from a single Resource to another within the same Resource Set, a Navigate to Resource Message may be published for receipt by a Navigate to Resource Handler; to affect a navigation from a Resource Set to a different Resource Set, a Navigate to Resource Set Message may be published for receipt by a Navigate to Resource Set Handler. The Event Broker 1068 can represent the Browser Application 1032 messaging API. Upon receiving an indication of the message (Navigate Message), the Application Controller 1040*a* changes document URI to that of the target Resource's Resource Page 1016 intended for display in the target tab. A Navigate Message may be one or more messages 1) published upon selection of a Navigation Specific UI Element and/or initiating the Navigation Process; and 2) containing the information indicating the Resource and/or Resource Set to which the Browser Application should navigate and, if needed, the Rendered View or Rendered Views and/or tab or tabs in which to affect the navigation. There may be more specific kinds of Navigate Messages that may affect a specific kind of navigation. For example, to affect a navigation from a single Resource to another within the same Resource Set, a Navigate to Resource Message may used; to affect a navigation from a Resource Set to a different Resource Set, a Navigate to Resource Set Message may used. The Application Controller 1040*a* retrieves from the Resource Data Set 1026 the Resource Data sufficient to display the intended Resource. The Application Controller 1040*a* sends the Dynamic Navigation UI View State and Resource Data Message to the AUI Controller 1042*a* through the Event Broker ultimately resulting in the display of the target Resource's Resource Page 1016 alongside its Browser-bound DNUI 1020*a*. The process can begin again with the selection of the Navigation Specific UI Element 1064. The process discussed above is shown in detail in a flowchart in FIG. 21.

Figure 4:
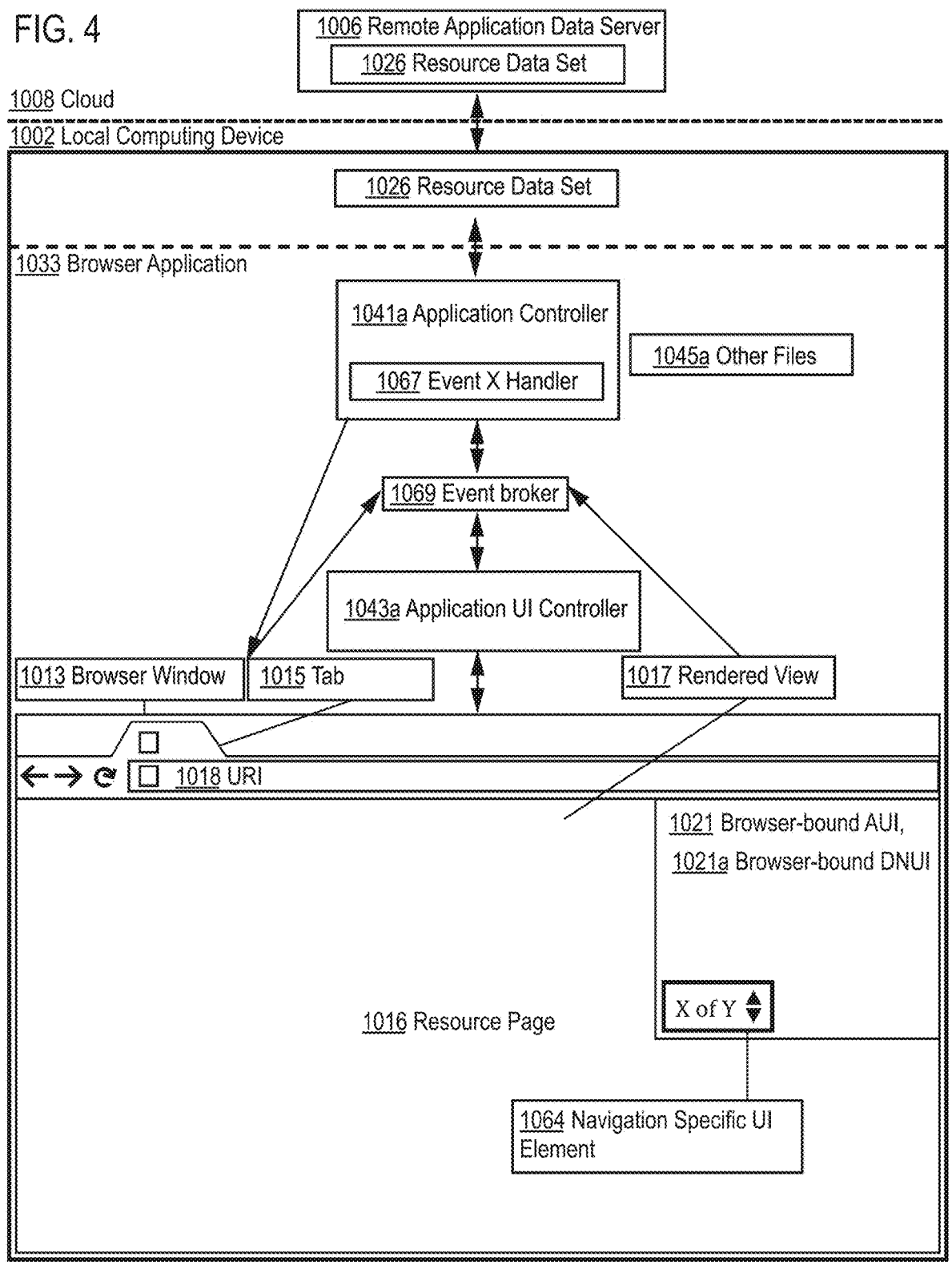
FIG. 4 is a block diagram illustrating a second example embodiment of user interface components and functional modules for implementing a navigation process and a browser-bound dynamic navigation user interface.

FIG. 4 shows a non-limiting example of how, with slight modification, the configuration, components, and messaging system of system 1000 in FIG. 3 may conform to those of system 1001. The primary difference between the two configurations, components, and messaging systems is the layer necessary to manage one or more Rendered Views 1017 simultaneously displayed within a single Browser Window as shown in FIG. 4. As represented by the single directional arrow from Rendered View 1017 to the Event Broker 1069 the Rendered View 1017 may pass Rendered View Events through Event Broker 1069 to the Application Controller 1041*a*. However, the Rendered View Event messages may also be passed from the Rendered View 1017 to the Application Controller 1041*a* through the Application UI Controller 1043*a* before the Event Broker 1069. Other communication between each Rendered View 1017, its associated Resource Page 1016, and Resource Page 1016's associated AUI with the Application Controller 1041*a* may go through the Application UI Controller 1043*a*.

Figure 5:
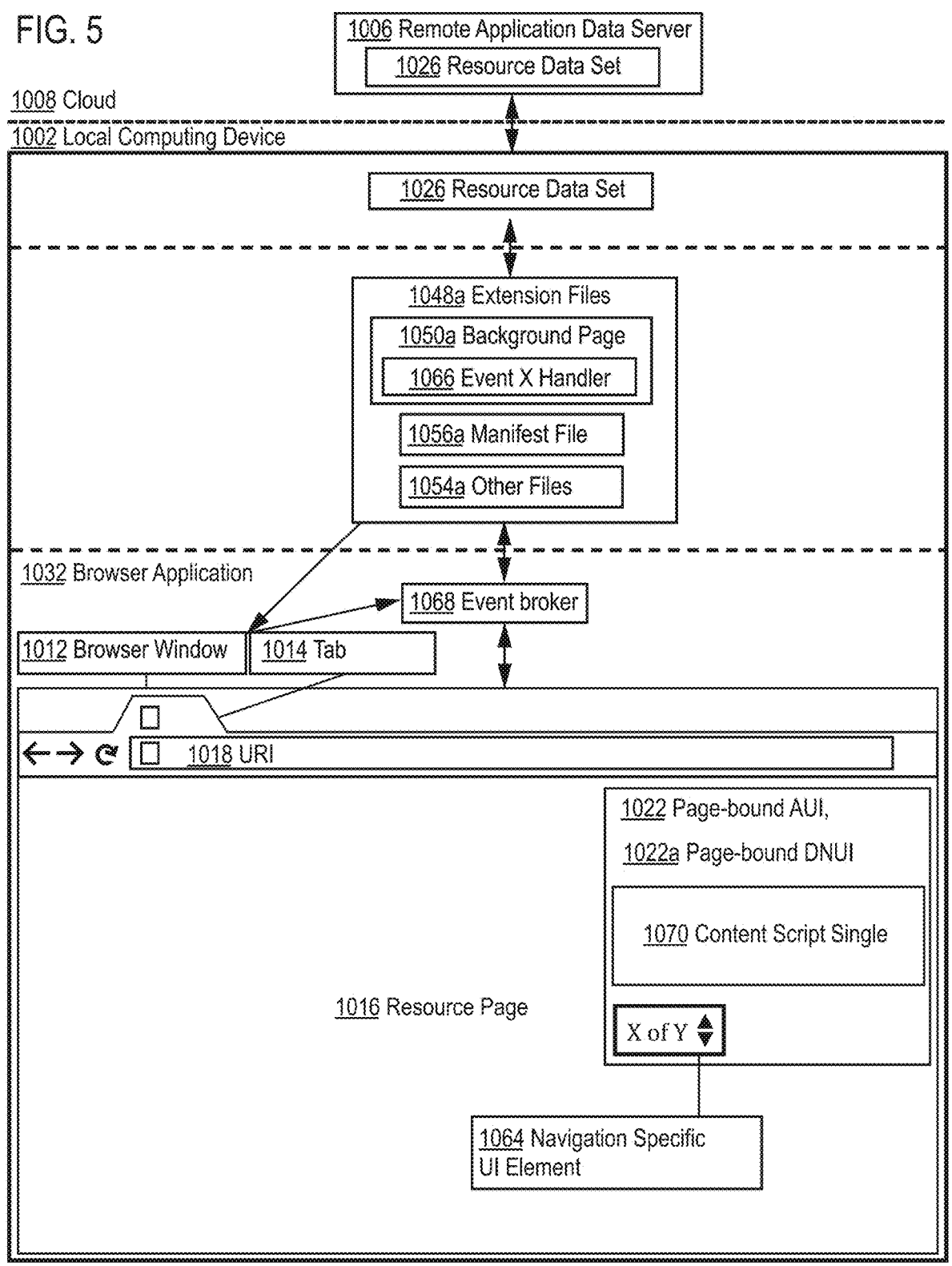
FIG. 5 is a block diagram illustrating a first example embodiment of user interface components and functional modules for implementing a navigation process and a page-bound dynamic navigation user interface utilizing extension files.

FIG. 5 is a diagram illustrating a non-limiting example of the components and messaging processes for an implementation of the Navigation Process using a Page-bound DNUI 1022*a*. In this example, the Page-Bound AUI 1022 is shown directly incorporated into the Resource Page 1016 displayed in Browser Window 1012 of Display Device 1010. The positioning of the Page-Bound AUI 1022 in the top-right corner of the Resource Page 1016 is merely for the sake of example and other implementations, positioning, sizing, configurations, etc. are possible. For example, the Page-Bound AUI 1022 can be made movable, so that it can be moved to any location on the Resource Page 1016. The process and arrangement of functional components desirable to use the Page-Bound AUI 1022 in the Navigation Process are much the same as those desirable to use the Browser-bound AUI 1020 in the Navigation Process. However, as shown in the diagram, functions of the AUI Controller are embodied by and inserted directly into the Resource Page 1016 as Content Script Single 1070. As a result, the Content Script Single 1070 may be inserted into each Resource Page of a Resource Set.

Once a Resource Page 1016 has been recognized as part of a Resource Set, the Page-Bound AUI 1022, in the form of the Page-bound DNUI 1022*a*, may serve as both the starting and ending point of the Navigation Process. The start of the process may begin with the explicit representation on the Page-Bound DNUI 1022*a* of the current Resource Page's 1016 place within the scope and sequence of the Resource Set of which the Resource Page is a part. Navigation Specific UI Elements on the Page-Bound DNUI 1022*a*, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1064 is shown in FIG. 5. In this example the "X" represents the displayed Resource's order within the numbered scope of the Resource Set of which the Resource Set is a part. For example, if the displayed Resource is the third resource within a Resource Set of five Resources, the "X" will be "3" and the "Y" will be "5". The arrows to the right of "X" and "Y" allow the user to access a next Resource with the Resource Set in a single click; this element can be displayed in the same place for each Resource and thus serve as a single point of selection to navigate sequentially, forwards and backwards, through the entire scope of the Resource Set. Upon selection of the Navigation Specific UI Element 1064 the Content Script Single 1070 receives an indication of the event. The Content Script Single 1070 then messages the Background Page's 1050*a* Event X Handler (Navigate Handler) 1066 through the Event Broker 1068 indicating a target Resource to which the Browser should navigate based on the selection of the Navigation Specific UI Element 1064. The Event Broker 1068 represents the Browser Application 1032 messaging API. Upon receiving an indication of the message (Navigate Message), the Background Page 1050*a* changes the document URI to that of the target Resource's Resource Page 1016 intended for display in the target tab. The Background Page 1050*a* retrieves from the Resource Data Set 1026 the Resource Data to display the intended Resource. The Browser Application 1032 injects a Content Script Single 1070 into the Resource Page 1016. The Background Page 1050*a* also sends the Dynamic Navigation UI View State and Resource Data Message to the Content Script Single 1070 through the Event Broker ultimately resulting in the display of the target Resource's Resource Page 1016 with its Page-Bound DNUI 1022*a*. The process can begin again with the selection of the Navigation Specific UI Element 1064.

Figure 6:
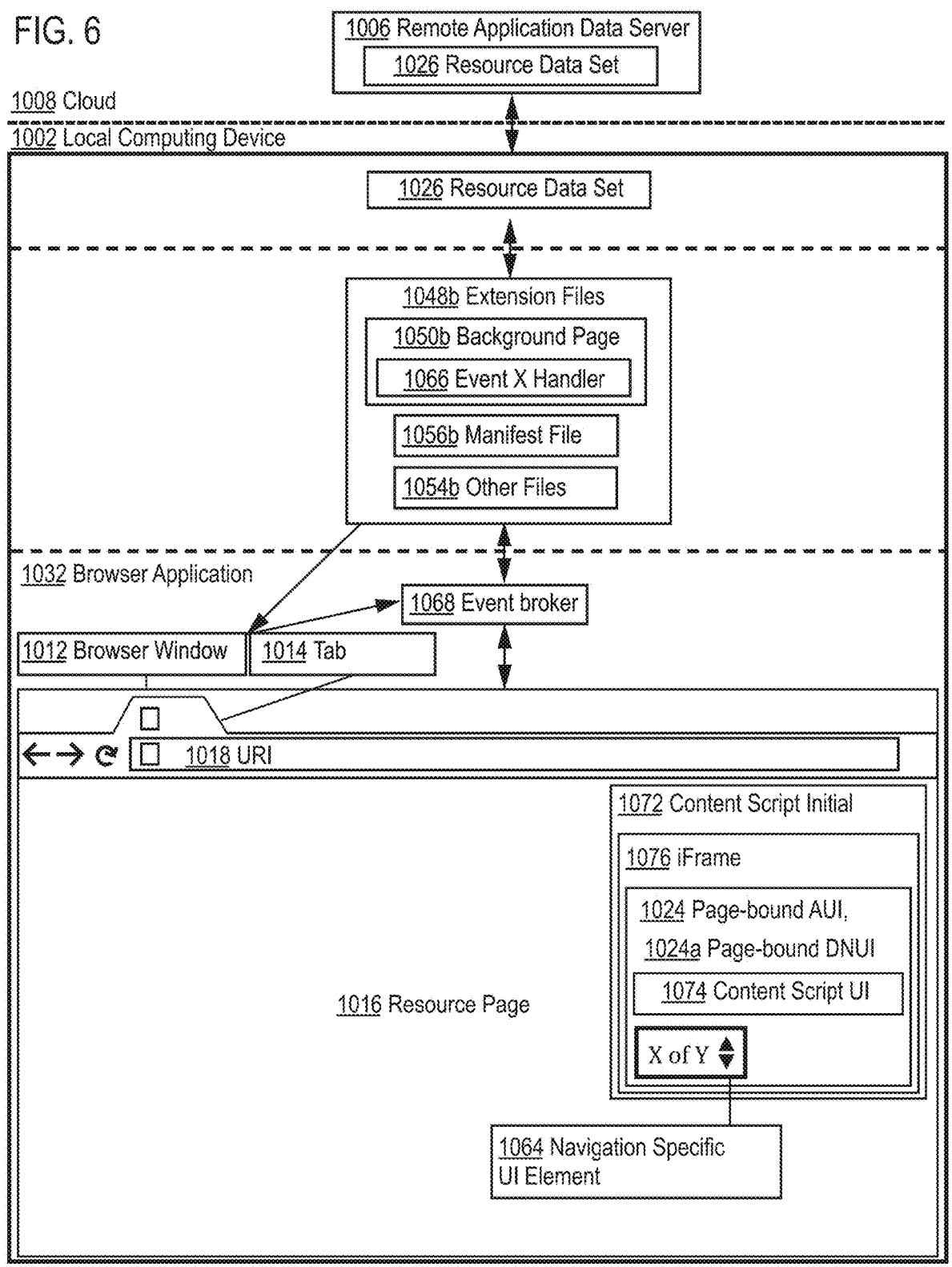
FIG. 6 is a block diagram illustrating a second example embodiment of user interface components and functional modules for implementing a navigation process and a page-bound dynamic navigation user interface utilizing extension files.

FIG. 6 is a diagram illustrating a non-limiting example of the components and messaging processes for an implementation of the Navigation Process using a Page-bound DNUI 1024*a*. In this example, the Page-bound AUI 1024 is shown directly incorporated into the Resource Page 1016 displayed in Browser Window 1012 of Display Device 1010. The positioning of the Page-bound AUI 1024 in the top-right corner of the Resource Page 1016 is merely for the sake of example and other implementations, positioning, sizing, configurations, etc. are possible. For example, the Page-bound AUI 1024 can be made movable, so that it can be moved to any location on the Resource Page 1016. The process and arrangement of functional components desirable to use the Page-bound AUI 1024 in the Navigation Process are much the same as those desirable to use the Browser-bound AUI 1020 in the Navigation Process. However, as shown in the diagram, the AUI Controller functions are carried out by Content Script Initial 1072, a content script that has been inserted into Resource Page 1016 and Content Script UI 1074, a content script that has been encapsulated in an IFrame 1076 that has been inserted into Resource Page 1016. As a result, the Content Script UI 1074 and Content Script Initial 1072 may be inserted into each Resource Page of a Resource Set when the Resource Page is initially rendered.

Once a Resource Page 1016 has been recognized as part of a Resource Set, the Page-bound AUI 1024, in the form of the Page-bound DNUI 1024*a*, may serve as both the starting and ending point of the Resource Set Navigation Process. The steps between Resource Page rendering and recognition as part of a Resource set are described in detail in the flowchart of FIGS. 23A-D. The start of the process may begin with the explicit representation on the Page-bound DNUI of the current Resource Page's 1016 place within the scope and sequence of the Resource Set of which the Resource Page is a part. Navigation Specific UI Elements on the Page-bound DNUI, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1064 is shown in FIG. 6. In this example the "X" represents the displayed Resource's order within the numbered scope of the Resource Set of which the Resource Set is a part. For example, if the displayed Resource is the third resource within a Resource Set of five Resources, the "X" will be "3" and the "Y" will be "5". The arrows to the right of "X" and "Y" allow the user to access a next Resource with the Resource Set in a single click; this element can be displayed in the same place for each Resource and thus serve as a single point of selection to navigate sequentially, forwards and backwards, through the entire scope of the Resource Set. Upon selection of the Navigation Specific UI Element 1064 the Content Script UI 1074 receives an indication of the event. The Content Script UI 1074 then messages the Background Page's 1050*b* Event X Handler (Navigate Handler) 1066 through the Event Broker 1068 indicating a target Resource to which the Browser should navigate based on the selection of the Navigation Specific UI Element 1064. The Event Broker 1068 represents the Browser Application 1032 messaging API. Upon receiving the indication of the message (Navigate Message), the Background Page 1050*b* changes the document URI to that of the target Resource's Resource Page intended for display in the target tab. The Background Page 1050*b* retrieves from the Resource Data Set 1026 the Resource Data sufficient to display the intended Resource. The Browser Application 1032 injects a Content Script Initial 1072 into the Resource Page 1016. This action results in the addition of a Content Script UI 1074 encapsulated in an IFrame 1076 in the Resource Page 1016. The Background Page 1050*b* publishes the Dynamic Navigation UI View State and Resource Data Message. The Content Script Initial 1072 and Content Script UI 1074 receive the message, ultimately resulting in the display of the target Resource's Resource Page 1016 with its Page-bound DNUI 1024*a*. The process can begin again with the selection of the Navigation Specific UI Element 1064. The entirety of the process discussed above is shown in detail in a flowchart in FIGS. 23A-D.

Figure 7:
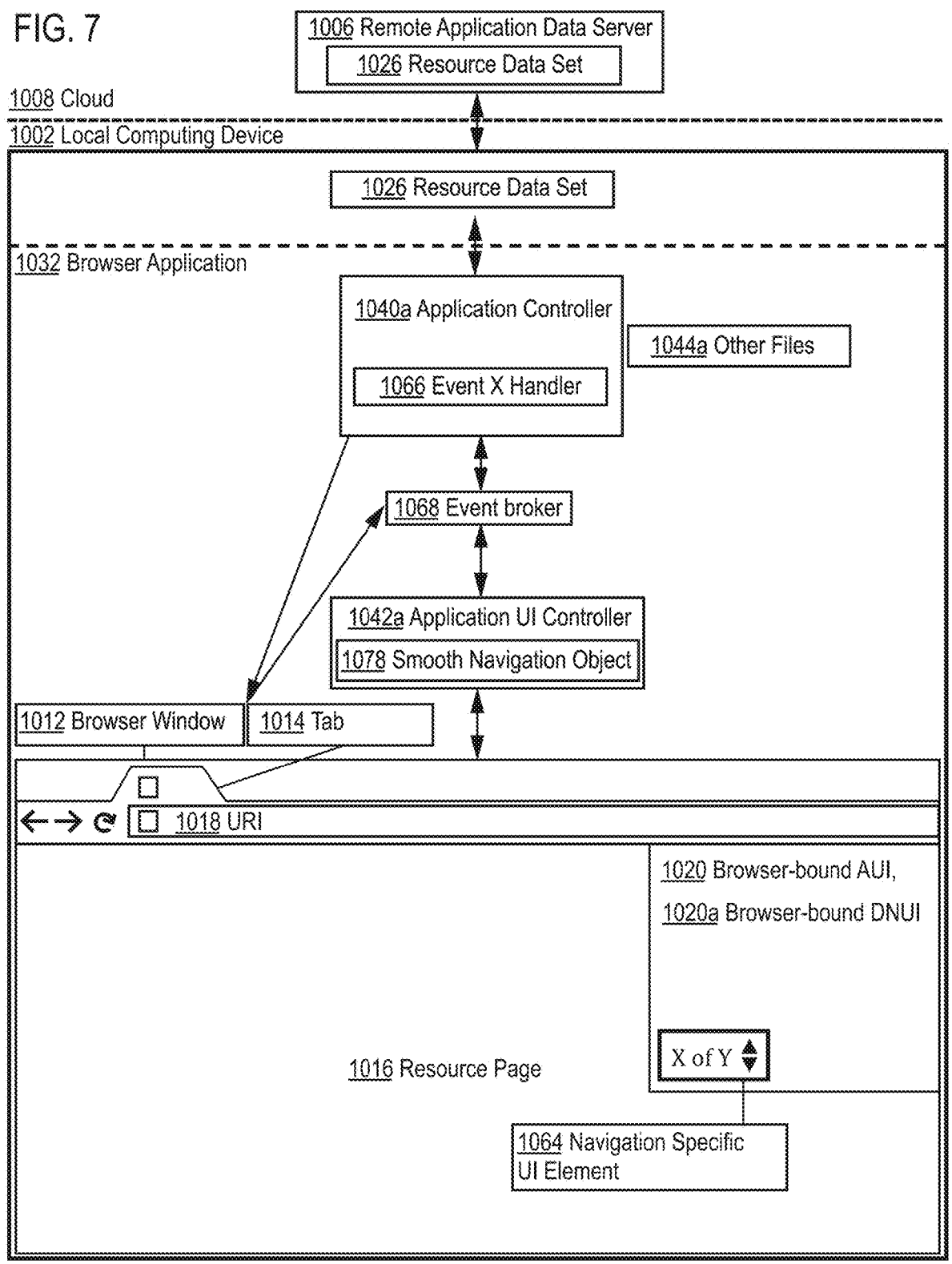
FIG. 7 is a block diagram illustrating a first example embodiment of user interface components and functional modules for implementing a smooth navigation process and a browser-bound dynamic navigation user interface.

FIG. 7 illustrates a non-limiting example of the messaging processes for the Smooth Navigation Process that includes the use of the Browser-bound AUI 1020. The Browser-bound AUI 1020 may take several forms, including the Dynamic Navigation UI. In this example, the Navigation Specific UI Element 1064 is shown in the Browser-bound AUI 1020 and its communication with other components of system 1000 is described in detail. As noted earlier in this description, with slight modification the components in this figure may display a Page-bound DNUI or other DNUI instead of the Browser-bound DNUI.

Once a Resource Page 1016 has been recognized as part of a Resource Set, the Browser-bound AUI 1020, in the form of the Browser-bound DNUI 1020*a*, may serve as both the starting and ending point of a Smooth Navigation Process. The start of the Smooth Navigation Process may begin with the explicit representation on the Browser-bound DNUI 1020*a* of the current Resource Page's 1016 place within the scope and sequence of the Resource Set of which the Resource Page is a part. Navigation Specific UI Elements 1064 on the Browser-bound DNUI 1020*a*, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1064 is shown FIG. 7. In this example the "X" represents the displayed Resource's order within the numbered scope of the Resource Set of which the Resource is a part. For example, if the displayed Resource is the third resource within a Resource Set of five Resources, the "X" will be "3" and the "Y" will be "5". The arrows to the right of "X" and "Y" allow the user to access the next or previous Resource with the Resource Set in a single click; this element can be displayed in the same place for each Resource and thus serve as a single point of selection to navigate sequentially through the entire scope of the Resource Set. Upon selection of the Navigation Specific UI Element 1064 the AUI Controller 1042*a* receives an indication of the event. The AUI Controller 1042*a* then messages the Application Controller's 1040*a* Event X Handler 1066 (Navigate Handler) through the Event Broker 1068 indicating a target Resource that the Browser should display based on the selection of the Navigation Specific UI Element 1064. The Event Broker 1068 represents the Browser Application 1032 messaging API. Upon receiving an indication of the message (Navigate Message), the Application Controller 1040*a* publishes a Smooth Navigation Message (SNM) which contains at least the Current URI and the Target URI (generally, a Current URI may be the URI of the Resource displayed at the beginning of a Navigation Process and/or Smooth Navigation Process). The AUI Controller 1042*a* receives the SNM. The AUI Controller 1042*a* analyzes the Current and Target URIs to determine whether the URIs meet the criteria (the latter criteria may include the domain and similarities of the URIs) to accomplish a Smooth Navigation Process. The AUI Controller 1042*a* responds to the Application Controller 1040*a* with the determination of whether the criteria have been met. If the criteria are not met and a Smooth Navigation Process is not possible, the application may continue the navigation from the Current URI to the Target URI using the Navigation Process as described in this disclosure. If the criteria are met, the Current and Target URIs are matched with a Smooth Navigation Object (SNO) 1078 that will run functions specific to the Current and Target URIs (generally, a Smooth Navigation Object may be a set of one or more handlers and/or other logical components, including timers, central to the governing of a Smooth Navigation; a SNO may contain and run specific functions based on the Current and Target URIs). For example, if the Current and Target URIs are Google Map views the SNO 1078 will run different functions than if the Current and Target URIs are Khan Academy videos. The Application Controller 1040*a* may begin to monitor and relay network requests (between the Browser Application 1032 and Remote Resource Page Server 1004) to the SNO 1078 related to the Smooth Navigation being attempted (for some URIs this is desirable to complete a usable Smooth Navigation). The SNO 1078 then initiates the Smooth Navigation Timer (SNT) (the SNT, not shown in the diagram, can be part of the SNO), pushes the Target URI to the history via the history API, and triggers a pop-state event dispatch to the current tab's browser window (generally, the Smooth Navigation Timer is a timer used to stagger application behavior relative to relevant events affecting page rendering). While the SNT is running, the SNO 1078 may receive a relayed network request message that could affect the target page's rendering. If this occurs, the SNO 1078 may reset and re-run the SNT. When the SNT has finished, the SNO 1078 analyzes the current tab's document URI and Target URI to determine whether the URIs match to the degree sufficient to meet the criteria for a completed Smooth Navigation (the criteria in this case might be the similarity between the current tab's URI and the Target URI). If the URIs do not match to a sufficient degree the SNO 1078 may push the Target URI to the history via the history API, trigger a pop-state event dispatch to the current tab's browser window, and run a Supplementary Smooth Navigation Timer (SSNT) (the SSNT, not shown in the diagram, can be part of the SNO and may be the same as the SNT). When this SSNT finishes, the Application Controller analyzes the current tab's document URI and Target URI to determine whether the URIs match to the degree sufficient to meet the criteria for a completed Smooth Navigation. If the URIs do not match to a sufficient degree the Application Controller 1040*a* may publish a Smooth Navigation Unsuccessful Message (SNUM). The AUI Controller 1042*a* receives the SNUM and may display an indication indicating the Smooth Navigation Process was unsuccessful and an option to attempt the navigation again or proceed to another resource. If the URIs do match to a sufficient degree the SNO 1078 may publish a Smooth Navigation Successful Message (SNSM). The Application Controller receives the SNSM and sends the view state and Target Resource Data to the AUI Controller 1042*a*. The AUI Controller 1042*a* receives the message resulting in the display of the AUI for the Target Resource of the Smooth Navigation Process (generally, a Target Resource may be the Resource to which the navigation is intended and proceeds). The entirety of the process discussed above is shown in detail in a flowchart in FIGS. 25A, 25B, 25C, 25D, 25E, and 25F. This figure is provided for the sake of clarity and does not imply that the functional components and their respective functions must exist as a single logical structure or in the locations and components shown in this diagram. For example, the SNO 1078 may exist in multiple logical structures outside of and not including the AUI Controller 1040*a*. In another example, each instance of URI analysis may take place in a different logical structure then referenced above.

Figure 8:
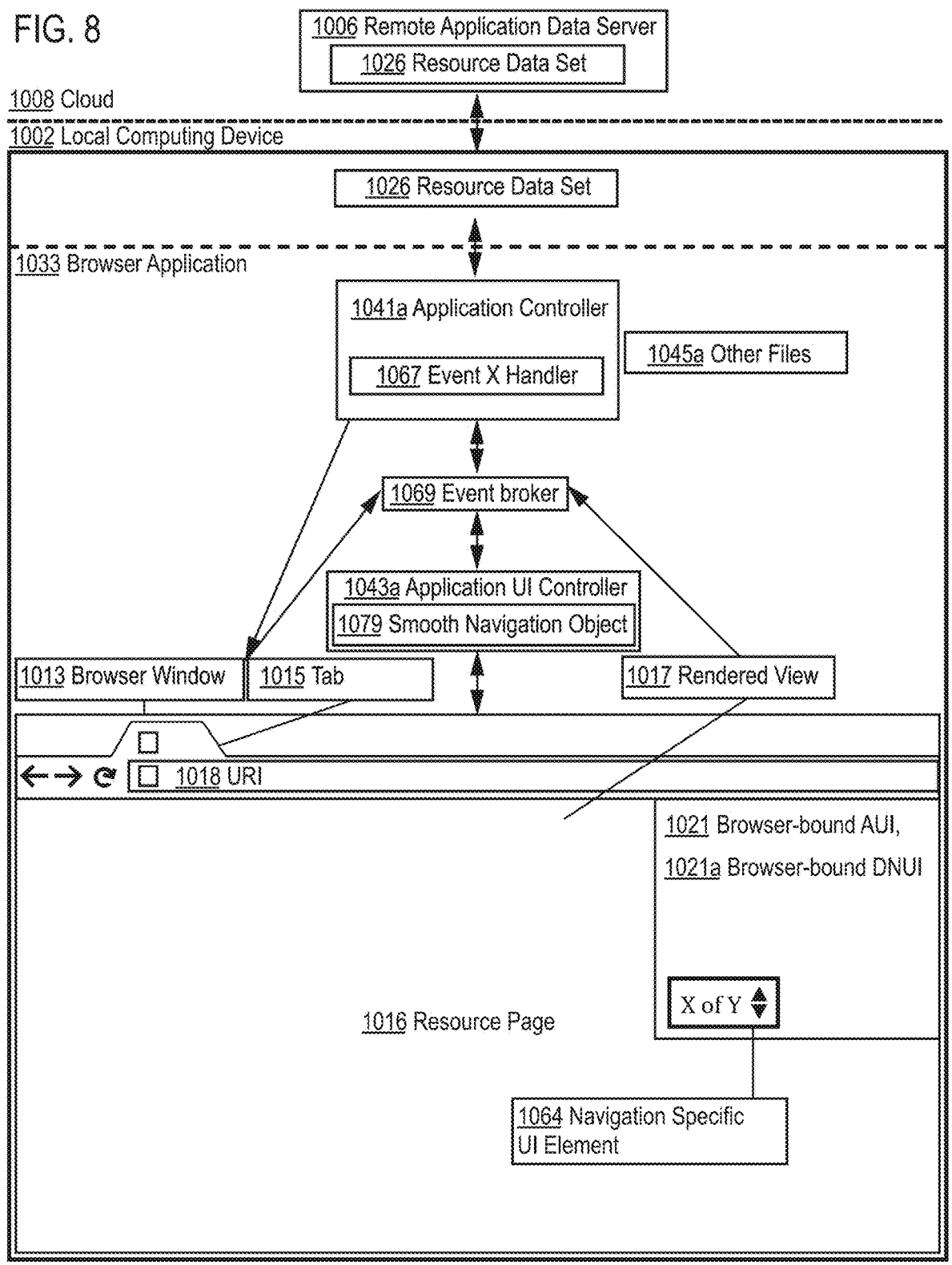
FIG. 8 is a block diagram illustrating a second example embodiment of user interface components and functional modules for implementing a smooth navigation process and a browser-bound dynamic navigation user interface.

FIG. 8 shows a non-limiting example of how, with slight modification, the configuration, components, and messaging system shown following the non-limiting example of system 1000 in FIG. 7 may conform to those of system 1001. Differences between the two configurations, components, and messaging systems include the modifications to the components of system 1000 necessary to enable them to manage one or more Rendered Views 1017 simultaneously displaying Resources and/or webpages within a single Browser Window. The messaging processes for the Smooth Navigation Process that include the use of the Browser-bound AUI 1021 using the components of system 1001 are similar to those for the Smooth Navigation Process that include the use of the Browser-bound AUI 1020 using the components of system 1000. As noted earlier in this description, with slight modification the components in this figure may display a Page-bound DNUI or other DNUI instead of the Browser-bound DNUI.

Once a Resource Page 1016 has been recognized as part of a Resource Set, the Browser-bound AUI 1021, in the form of the Browser-bound DNUI 1021*a*, may serve as both the starting and ending point of a Smooth Navigation Process. The start of the Smooth Navigation Process may begin with the explicit representation on the Browser-bound DNUI 1021*a* of the current Resource Page's 1016 place within the scope and sequence of the Resource Set of which the Resource Page is a part. Navigation Specific UI Elements 1064 on the Browser-bound DNUI 1021*a*, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1064 is shown FIG. 8. In this example the "X" represents the displayed Resource's order within the numbered scope of the Resource Set of which the Resource is a part. For example, if the displayed Resource is the third resource within a Resource Set of five Resources, the "X" will be "3" and the "Y" will be "5". The arrows to the right of "X" and "Y" allow the user to access the next or previous Resource with the Resource Set in a single click; this element can be displayed in the same place for each Resource and thus serve as a single point of selection to navigate sequentially through the entire scope of the Resource Set. Upon selection of the Navigation Specific UI Element 1064 the AUI Controller 1043*a* receives an indication of the event. The AUI Controller 1043*a* then messages the Application Controller's 1041*a* Event X Handler 1067 (Navigate Handler) through the Event Broker 1069 indicating a target Resource that the Browser should display based on the selection of the Navigation Specific UI Element 1064. The Event Broker 1069 can represent the Browser Application 1033 messaging API. Upon receiving an indication of the message (Navigate Message), the Application Controller 1041*a* publishes a Smooth Navigation Message (SNM) which contains at least the Current URI and the Target URI. The AUI Controller 1043*a* receives the SNM. The AUI Controller 1043*a* analyzes the Current and Target URIs to determine whether the URIs meet the criteria (the latter criteria may include the domain and similarities of the URIs) to accomplish a Smooth Navigation Process. The AUI Controller 1043*a* responds to the Application Controller 1041*a* with the determination of whether the criteria have been met. If the criteria are not met and a Smooth Navigation Process is not possible, the application may continue the navigation from the Current URI to the Target URI using the Navigation Process as described in this disclosure. If the criteria are met, the Current and Target URIs are matched with a Smooth Navigation Object (SNO) 1079 that will run functions specific to the Current and Target URIs. For example, if the Current and Target URIs are Google Map views the SNO 1079 will run different functions than if the Current and Target URIs are Khan Academy videos. The Application Controller 1041*a* may begin to monitor and relay network requests (between the Browser Application 1033 and Remote Resource Page Server 1004) to the SNO 1079 related to the Smooth Navigation being attempted (for some URIs this is desirable to complete a usable Smooth Navigation). The SNO 1079 then initiates the Smooth Navigation Timer (SNT) (the SNT, not shown in the diagram, can be part of the SNO), pushes the Target URI to the history via the history API, and triggers a pop-state event dispatch to the current Render View's tab's browser window. While the SNT is running, the SNO 1079 may receive a relayed network request message that could affect the target page's rendering. If this occurs, the SNO 1079 may reset and re-run the SNT. When the SNT has finished, the SNO 1079 analyzes the current Rendered View's URI and Target URI to determine whether the URIs match to the degree sufficient to meet the criteria for a completed Smooth Navigation (the criteria in this case might be the similarity between the current Rendered View's URI and the Target URI). If the URIs do not match to a sufficient degree the SNO 1079 may push the Target URI to the history via the history API, trigger a pop-state event dispatch to the current Rendered View's tab's browser window, and run a Supplementary Smooth Navigation Timer (SSNT) (the SSNT, not shown in the diagram, can be part of the SNO). When the SSNT finishes, the Application Controller analyzes the current Rendered View's URI and Target URI to determine whether the URIs match to the degree sufficient to meet the criteria for a completed Smooth Navigation. If the URIs do not match to a sufficient degree the Application Controller 1041*a* may publish a Smooth Navigation Unsuccessful Message (SNUM). The AUI Controller 1043*a* receives the SNUM and may display an indication indicating the Smooth Navigation Process was unsuccessful and an option to attempt the navigation again or proceed to another resource. If the URIs do match to a sufficient degree the SNO 1079 may publish a Smooth Navigation Successful Message (SNSM). The Application Controller receives the SNSM and sends the view state and Target Resource Data to the AUI Controller 1043*a*. The AUI Controller 1043*a* receives the message resulting in the display of the AUI for the Target Resource of the Smooth Navigation Process. The entirety of as process similar to that discussed above is shown in detail in a flowchart in FIGS. 26A, 26B, 26C, 26D, 26E, and 26F.

Figure 9:
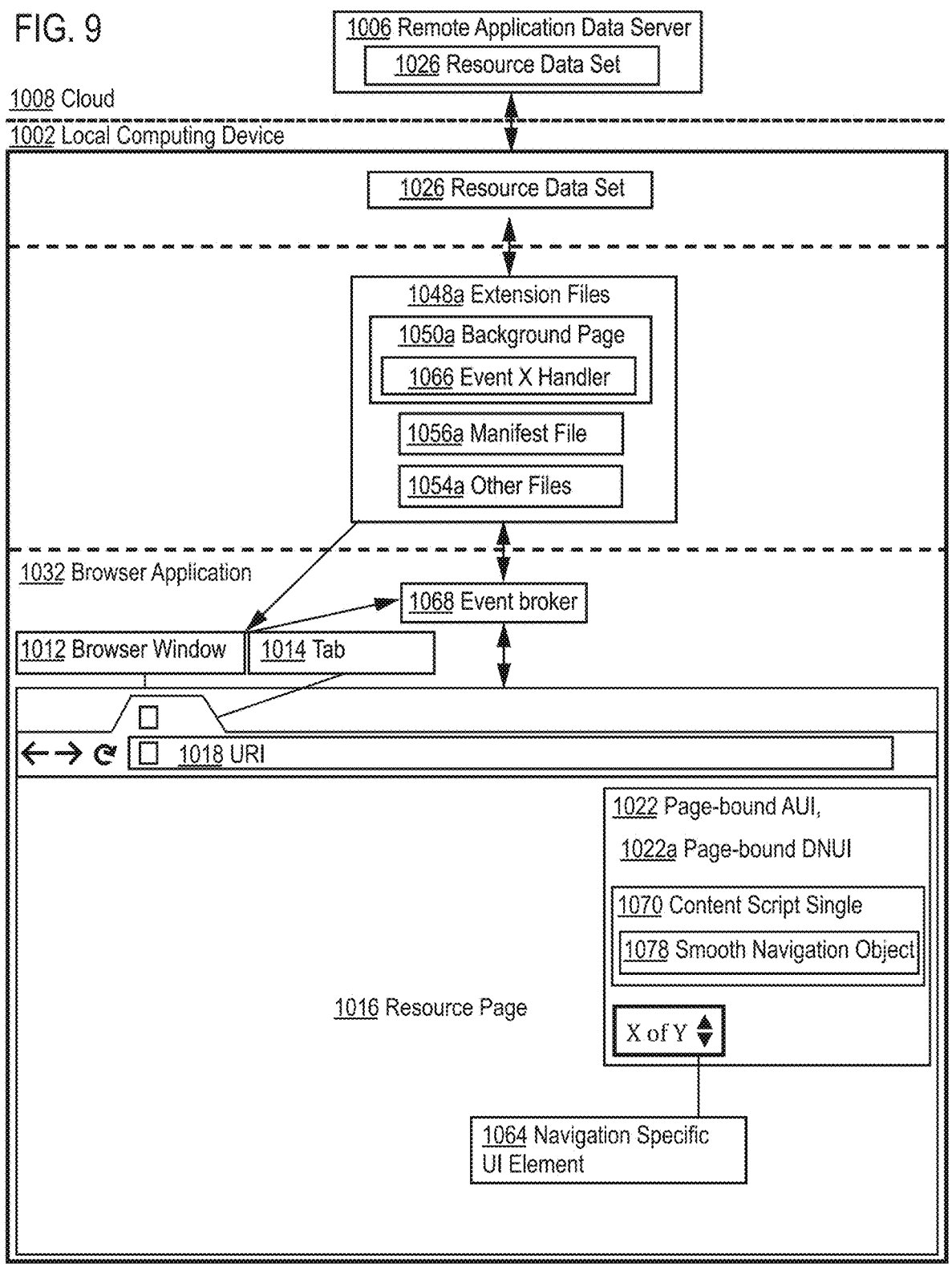
FIG. 9 is a block diagram illustrating a first example embodiment of user interface components and functional modules for implementing a smooth navigation process and a page-bound dynamic navigation user interface utilizing extension files.

FIG. 9 illustrates a non-limiting example of the messaging processes for the Smooth Navigation Process that includes the use of the Page-bound AUI 1022. In this example, the Page-bound AUI 1022 is shown directly incorporated into the Resource Page 1016 displayed in Browser Window 1012 of Display Device 1010. The process and arrangement of functional components to use the Page-bound AUI 1022 in the Navigation Process and Smooth Navigation Process are much the same as those to use the Browser-bound AUI 1020 in the Navigation Process and Smooth Navigation Process. However, as shown in the diagram, AUI Controller functions may be carried out by Content Script Single 1070.

The Page-bound AUI may take several forms, including the Dynamic Navigation UI. In this example, the Navigation Specific UI Element 1064 is shown in the Page-bound AUI 1022 and its communication with other components of system 1000 is described in detail.

Once a Resource Page 1016 has been recognized as part of a Resource Set, the Page-bound AUI 1022, in the form of the Page-bound DNUI 1022a, may serve as both the starting and ending point of a Resource Set Smooth Navigation Process. The start of the Smooth Navigation Process may begin with the explicit representation on the Page-bound DNUI 1022a of the current Resource Page's 1016 place within the scope and sequence of the Resource Set of which the Resource Page is a part. Navigation Specific UI Elements 1064 on the Page-bound DNUI, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1064 is shown in FIG. 9. In this example the "X" represents the displayed Resource's order within the numbered scope of the Resource Set of which the Resource is a part. For example, if the displayed Resource is the third resource within a Resource Set of five Resources, the "X" will be "3" and the "Y" will be "5". The arrows to the right of "X" and "Y" allow the user to access the next or previous Resource with the Resource Set in a single click; this element can be displayed in the same place for each Resource and thus serve as a single point of selection to navigate sequentially through the entire scope of the Resource Set. Upon selection of the Navigation Specific UI Element 1064 the Content Script Single 1070 receives an indication of the event. The Content Script Single 1070 then messages the Background Page's 1050a Event X Handler (Navigate Handler) 1066 through the Event Broker 1068 indicating a target Resource to which the Browser should navigate based on the selection of the Navigation Specific UI Element 1064. The Event Broker 1068 represents the Browser Application 1032 messaging API. Upon receiving the indication of the message (Navigate Message), the Background Page 1050a publishes a Smooth Navigation Message (SNM) which contains at least the Current URI and the Target URI. The Content Script Single 1070 receives the SNM. The Content Script Single 1070 analyzes the Current and Target URIs to determine whether the URIs meet the criteria (the latter criteria may include the domain and similarities of the URIs) to accomplish a Smooth Navigation Process. The Content Script Single 1070 responds to the Background Page 1050a with the determination of whether the criteria have been met. If the criteria are not met and a Smooth Navigation Process is not possible, the application may continue the navigation from the Current URI to the Target URI using the Navigation Process as described in this disclosure. If the criteria are met, the Current and Target URIs are matched with a Smooth Navigation Object (SNO) 1078 that will run functions specific to the Current and Target URIs. For example, if the Current and Target URIs are Google Map views the SNO 1078 will run different functions than if the Current and Target URIs are Khan Academy videos. The Background Page 1050a may begin to monitor and relay network requests (between the Browser Application 1032 and Remote Resource Page Server 1004) to the SNO 1078 related to the Smooth Navigation being attempted (for some URIs this is desirable to complete a usable Smooth Navigation). The SNO 1078 then initiates the Smooth Navigation Timer (SNT) (the SNT, not shown in the diagram, can be part of the SNO), pushes the Target URI to the history via the history API, and triggers a pop-state event dispatch to the current tab's browser window. While the SNT is running, the SNO 1078 may receive a relayed network request message that could affect the target page's rendering. If this occurs, the SNO 1078 resets and re-runs the SNT. When the SNT has finished, the SNO 1078 analyzes the current tab's document URI and Target URI to determine whether the URIs match to the degree sufficient to meet the criteria for a completed Smooth Navigation (the criteria in this case might be the similarity between the current tab's URI and the Target URI). If the URIs do not match to a sufficient degree the SNO 1078 may push the Target URI to the history via the history API, trigger a pop-state event dispatch to the current tab's window, and run a Supplementary Smooth Navigation Timer (SSNT) (the SSNT, not shown in the diagram, can be part of the SNO). When this SSNT finishes, the Background Page analyzes the current tab's document URI and Target URI to determine whether the URIs match to the degree sufficient to meet the criteria for a completed Smooth Navigation. If the URIs do not match to a sufficient degree the Background Page 1050a may publish a Smooth Navigation Unsuccessful Message (SNUM). The Content Script Single 1070 receives the SNUM and may display an indication indicating the Smooth Navigation Process was unsuccessful and an option to attempt the navigation again or proceed to another resource. If the URIs do match to a sufficient degree the SNO 1078 may publish a Smooth Navigation Successful Message (SNSM). The Background Page receives the SNSM and sends the view state and Target Resource Data to the Content Script Single 1070. The Content Script Single 1070 receives the message resulting in the display of the AUI for the Target Resource of the Smooth Navigation Process. The entirety of the process discussed above is shown in detail in a flowchart in FIGS. 27A, 27B, 27C, 27D, 27E, and 27F.

Figure 10:
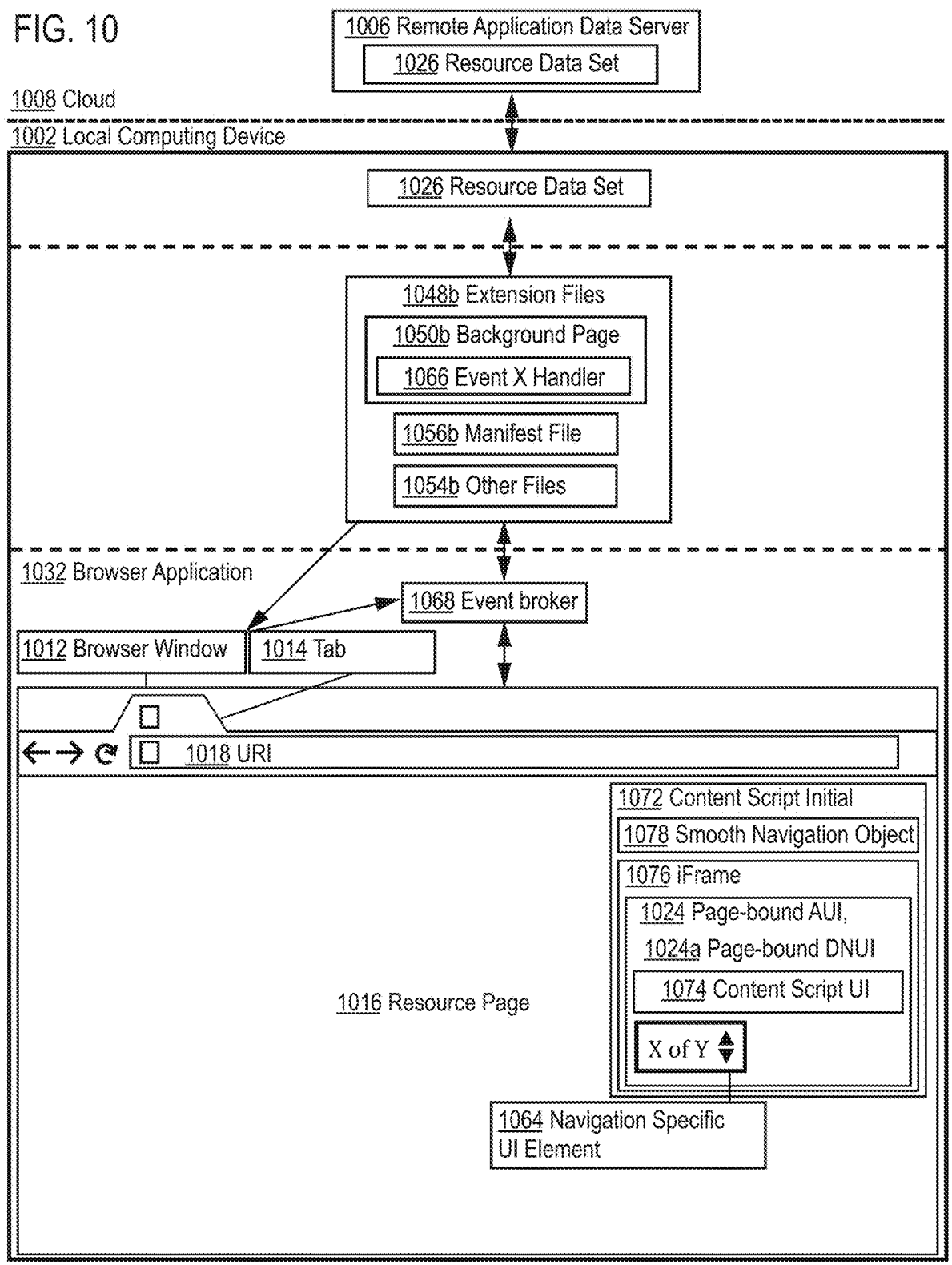
FIG. 10 is a block diagram illustrating a second example embodiment of user interface components and functional modules for implementing a smooth navigation process and a page-bound dynamic navigation user interface utilizing extension files.

FIG. 10 illustrates a non-limiting example of the messaging processes for the Smooth Navigation Process that includes the use of the Page-bound AUI 1024. In this example, the Page-bound AUI 1024 is shown directly incorporated into the Resource Page 1016 displayed in Browser Window 1012 of Display Device 1010. The process and arrangement of functional components to use the Page-bound AUI 1024 in the Navigation Process and Smooth Navigation Process are much the same as those to use the Browser-bound AUI 1020 in the Navigation Process and Smooth Navigation Process. However, as shown in the diagram, AUI Controller functions may be carried out by Content Script UI 1074, a content script that has been encapsulated in an IFrame 1076 that has been inserted into Resource Page 1016, and Content Script Initial 1072, a content script that has been inserted into Resource Page 1016 as well. As a result, the Content Script UI 1074 and Content Script Initial 1072 may be inserted into each Resource Page of a Resource Set when the Resource Page is initially rendered.

The Page-bound AUI may take several forms, including but not limited to the Dynamic Navigation UI. In this example, the Navigation Specific UI Element 1064 is shown in the Page-bound AUI 1024 and its communication with other components of system 1000 is described in detail.

Once a Resource Page 1016 has been recognized as part of a Resource Set, the Page-bound AUI 1024, in the form of the Page-bound DNUI 1024*a*, may serve as both the starting and ending point of the Smooth Navigation Process. The start of the Smooth Navigation Process may begin with the explicit representation on the Page-bound DNUI 1024*a* of the current Resource Page's 1016 place within the scope and sequence of the Resource Set of which the Resource Page is a part. Navigation Specific UI Elements 1064 on the Page-bound DNUI, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1064 is shown in FIG. 10. In this example the "X" represents the displayed Resource's order within the numbered scope of the Resource Set of which the Resource is a part. For example, if the displayed Resource is the third resource within a Resource Set of five Resources, the "X" will be "3" and the "Y" will be "5". The arrows to the right of "X" and "Y" allow the user to access the next or previous Resource with the Resource Set in a single click; this element can be displayed in the same place for each Resource and thus serve as a single point of selection to navigate sequentially through the entire scope of the Resource Set. Upon selection of the Navigation Specific UI Element 1064 the Content Script UI 1074 receives an indication of the event. The Content Script UI 1074 then messages the Background Page's 1050*b* Event X Handler (Navigate Handler) 1066 through the Event Broker 1068 indicating a target Resource to which the Browser should navigate based on the selection of the Navigation Specific UI Element 1064. The Event Broker 1068 represents the Browser Application 1032 messaging API. Upon receiving the indication of the message (Navigate Message), the Background Page 1050*b* publishes a Smooth Navigation Message (SNM) which contains at least the Current URI and the Target URI. The Content Script Initial 1072 receives the SNM. The Content Script Initial 1072 analyzes the Current and Target URIs to determine whether the URIs meet the criteria (the latter criteria may include the domain and similarities of the URIs) to accomplish a Smooth Navigation Process. The Content Script Initial 1072 responds to the Background Page 1050*b* with the determination of whether the criteria have been met. If the criteria are not met and a Smooth Navigation Process is not possible, the application may continue the navigation from the Current URI to the Target URI using the Navigation Process as described in this disclosure. If the criteria are met, the Current and Target URIs are matched with a Smooth Navigation Object (SNO) 1078 that will run functions specific to the Current and Target URIs. For example, if the Current and Target URIs are Google Map views the SNO 1078 will run different functions than if the Current and Target URIs are Khan Academy videos. The Background Page 1050*b* may begin to monitor and relay network requests (between the Browser Application 1032 and Remote Resource Page Server 1004) to the SNO 1078 related to the Smooth Navigation being attempted (for some URIs this is desirable to complete a usable Smooth Navigation). The SNO 1078 then initiates the Smooth Navigation Timer (SNT) (the SNT, not shown in the diagram, can be part of the SNO), pushes the Target URI to the history via the history API, and triggers a pop-state event dispatch to the current tab's browser window. While the SNT is running, the SNO 1078 may receive a relayed network request message that could affect the target page's rendering. If this occurs, the SNO 1078 resets and re-runs the SNT. When the SNT has finished, the SNO 1078 analyzes the current tab's document URI and Target URI to determine whether the URIs match to the degree sufficient to meet the criteria for a completed Smooth Navigation (the criteria in this case might be the similarity between the current tab's URI and the Target URI). If the URIs do not match to a sufficient degree the SNO 1078 may push the Target URI to the history via the history API, trigger a pop-state event dispatch to the current tab's window, and run a Supplementary Smooth Navigation Timer (SSNT) (the SSNT, not shown in the diagram, can be part of the SNO). When this SSNT finishes, the Background Page analyzes the current tab's document URI and Target URI to determine whether the URIs match to the degree sufficient to meet the criteria for a completed Smooth Navigation. If the URIs do not match to a sufficient degree the Background Page 1050*b* may publish a Smooth Navigation Unsuccessful Message (SNUM). The Content Script UI 1074 receives the SNUM and may display an indication indicating the Smooth Navigation Process was unsuccessful and an option to attempt the navigation again or proceed to another resource. If the URIs do match to a sufficient degree the SNO 1078 may publish a Smooth Navigation Successful Message (SNSM). The Background Page receives the SNSM and sends the view state and Target Resource Data to the Content Script UI 1074. The Content Script UI 1074 receives the message resulting in the display of the AUI for the Target Resource of the Smooth Navigation Process. The entirety of the process discussed above is shown in detail in a flowchart in FIGS. 28A, 28B, 28C, 28D, 28E, and 28F.

FIG. 11-17 are a series of diagrams illustrating a detailed example implementation of the Page-bound DNUI 1024*a* utilizing the system 1000 Extension Files 1048*b* to complete a Navigation Process and Smooth Navigation Process.

Figure 11:
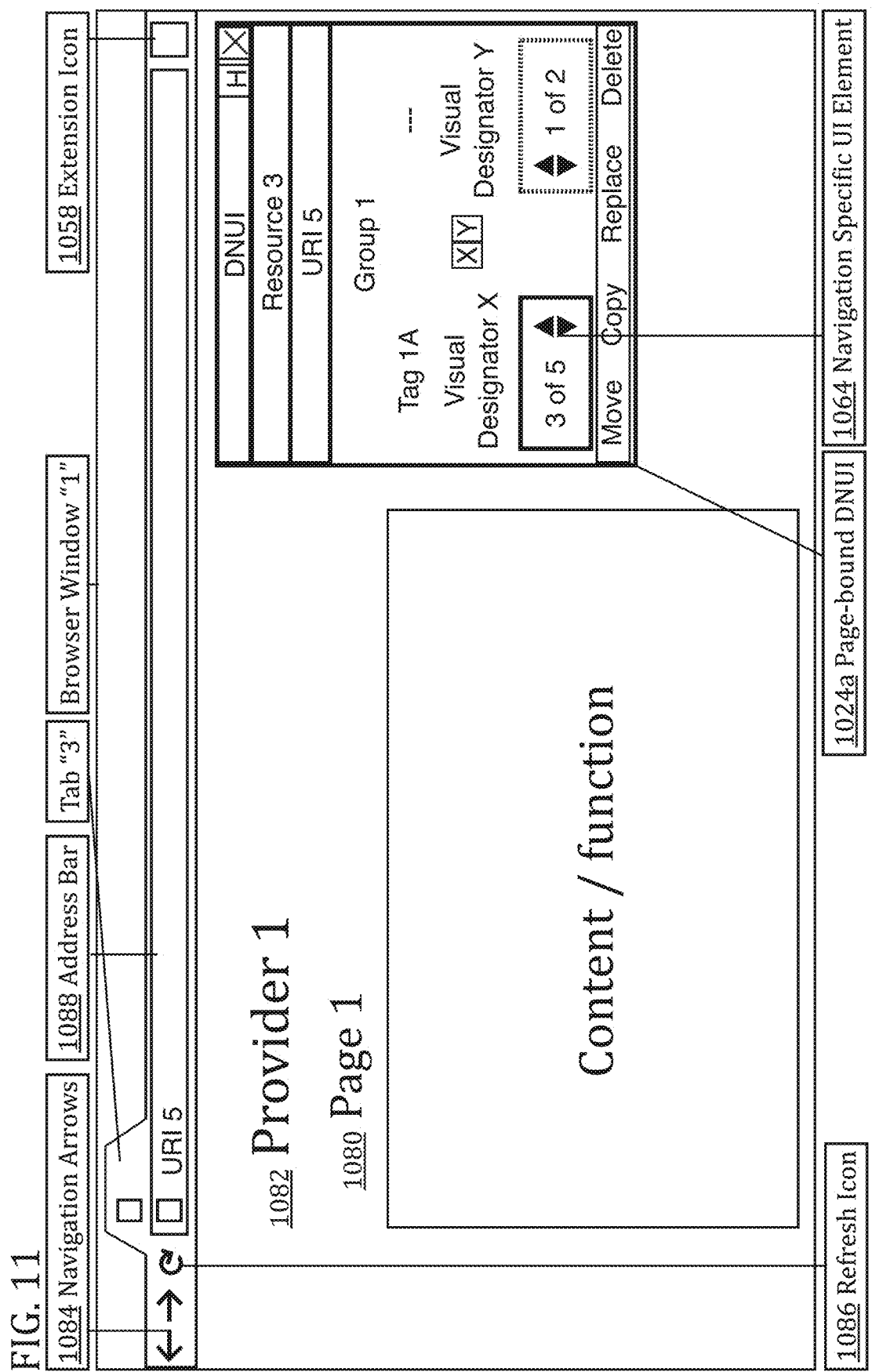
FIG. 11 is a block diagram illustrating a first example embodiment of user interface components and functional modules for implementing a navigation process between digital resources using a page-bound dynamic navigation user interface according to a general example.

FIG. 11 shows a Page-bound DNUI 1024*a* which may serve as both the starting and ending point of the Navigation Process. As shown in this example, the Page-bound DNUI 1024*b* displays some of the organizational and informational context of the Page 1 1080 with which it is displayed; this context is Resource Data. For example "Resource 3" is the Resource title; "URI 5" is the URI of the Resource Page in view; "Group 1" refers to the Group of which the Resource is a part; "Tag 1A" is one of one or more tags with which the Resource has been tagged and defines a Sub-Group of which the Resource is a part; the container with "3 of 5" and a set of "up" "down" arrows is the Navigation Specific UI Element 1064.

The Tab "3" and Browser Window "1" represent the tab and browser associated with Resource 3. The Navigation Arrows 1084 represent standard browser navigation arrows allowing the user to reload previously viewed webpages. The Refresh Icon 1086 allows the user to refresh a rendered webpage. The Address Bar 1088 allows the user to enter and view the URI of any webpage or Resource Page displayed. The Extension Icon 1058 represents the extension icon of the Extension Files 1048*b*.

The Page 1 1080 represents any webpage available on a computer network in its original browser rendering. Provider 1 1082 refers to the provider who has made the Page 1 1080 available on a computer network. The "Content/function" elements represent the fact that Page 1 1080 may contain content or functional elements of any size and located at any place within the Page 1 1080 as rendered in the Browser Window "1" 1012.

Figure 12:
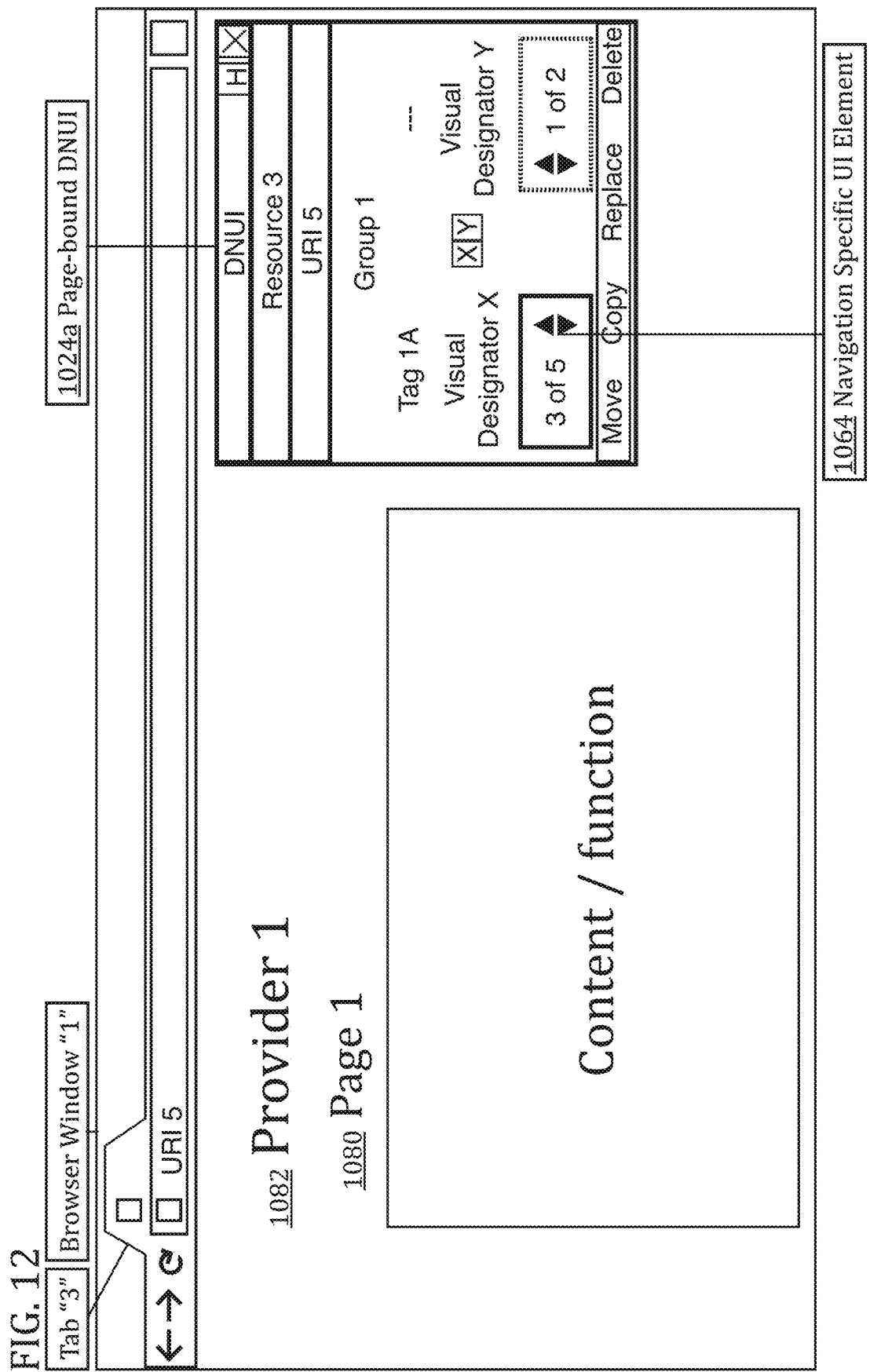
FIG. 12 is a block diagram illustrating a second example embodiment of user interface components and functional modules for implementing a navigation process between digital resources using a page-bound dynamic navigation user interface according to a general example.

FIG. 12 shows a state in which the "down" arrow of the Navigation Specific UI Element 1064 has been selected and an example of the Navigation Process, navigating from the third Resource to the fourth Resource within the Resource Set defined by the Group 1, and Sub-Group Tag-1A, has begun.

Figure 13:
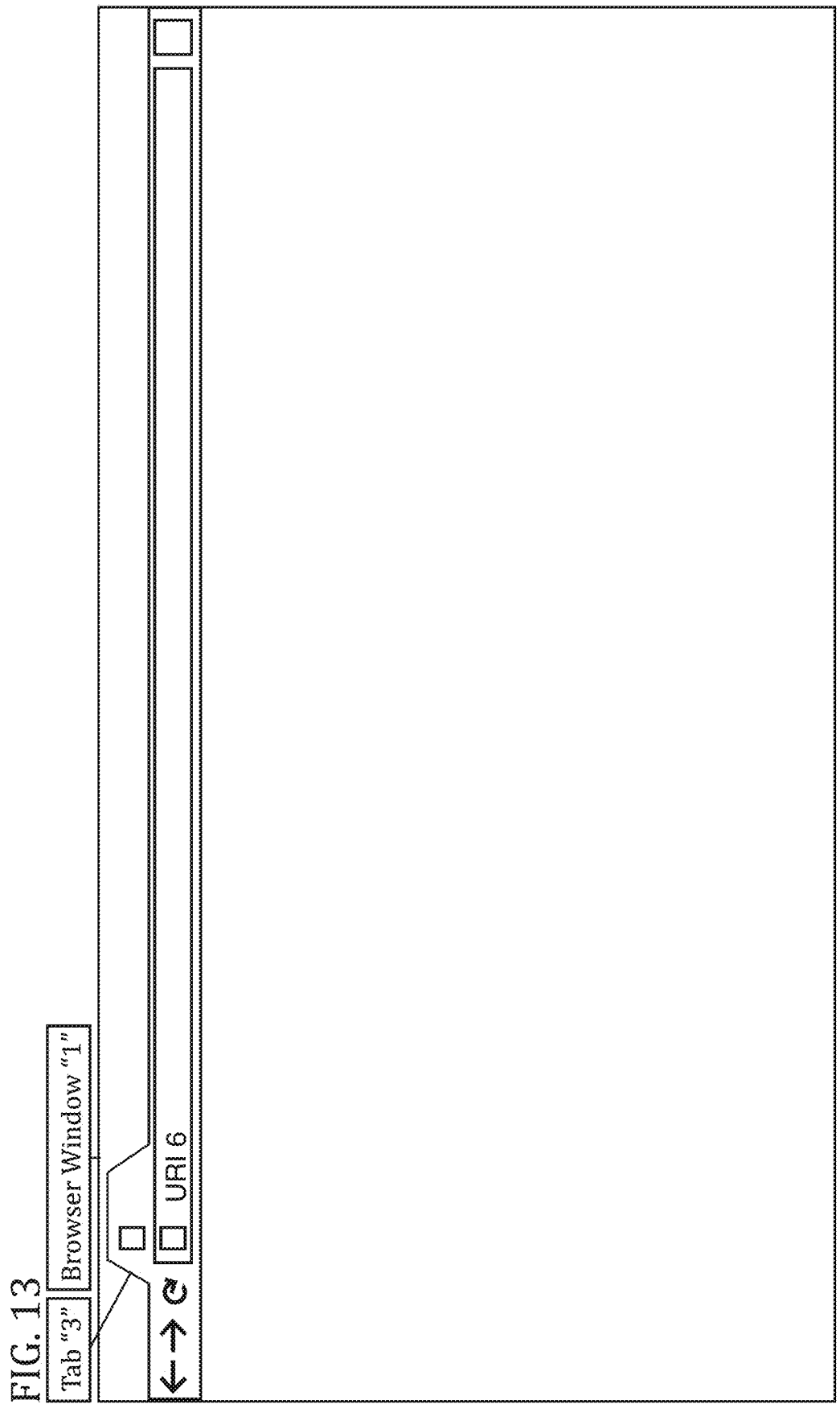
FIG. 13 is a block diagram illustrating a third example embodiment of user interface components and functional modules for implementing a navigation process between digital resources using a page-bound dynamic navigation user interface according to a general example.

FIG. 13 shows Page 1 1080 of Provider 1 1082 of the third Resource and the elements necessary to display it have been completely cleared and Page 2 1090 of Provider 2 1092 of the fourth Resource is about to load in Browser Window "1".

Figure 14:
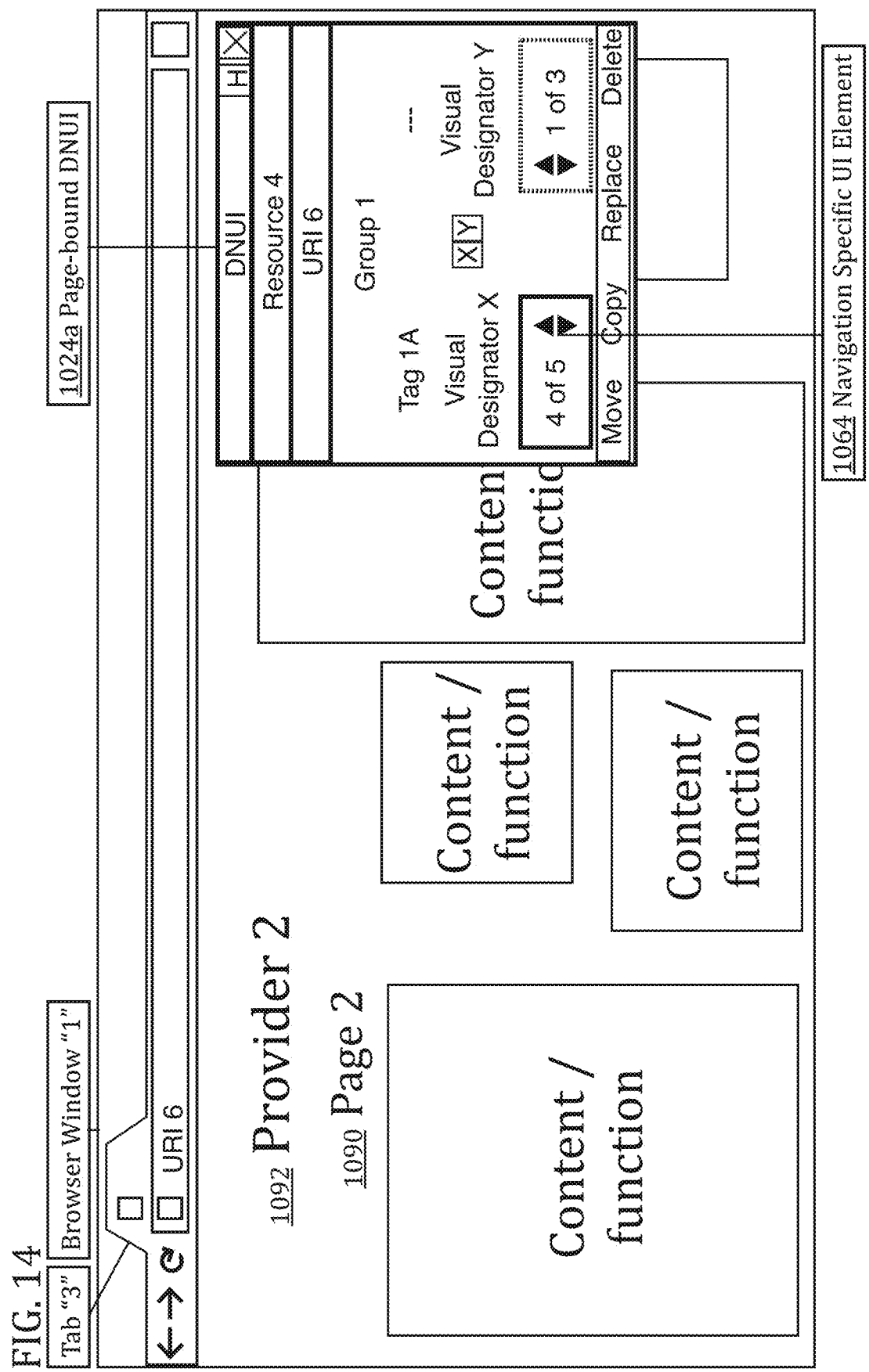
FIG. 14 is a block diagram illustrating a fourth example embodiment of user interface components and functional modules for implementing a navigation process between digital resources using a page-bound dynamic navigation user interface according to a general example.

FIG. 14 shows the example Navigation Process, navigating from the third Resource to the fourth Resource of the Resource Set defined by Group 1, and Sub-Group Tag-1A has completed.

As shown, Page-bound DNUI 1024a now displays the Resource Data of the new Resource Page 2 1090 with which it is displayed as Resource 4 of the Resource Set of "Group 1". As shown, "Resource 4" is the Resource title; "URI 6" is the URI of the Resource Page in view; "Group 1" refers to the Group of which the Resource is a part; "Tag 1A" is one of one or more tags with which the Resource has been tagged and defines a Sub-Group of which the Resource is a part; the container with "4 of 5" and a set of "up" "down" arrows is the Navigation Specific UI Element 1064;

The Resource Page 2 1090 represents any webpage available on a computer network in its original browser rendering. Provider 2 1092 refers to the provider who has made the Resource Page 2 1090 available on a computer network. The "Content/function" elements represent the fact that a Resource Page 2 1090 may contain content or functional elements of any size and located at any place within the Resource Page 2 1090 as rendered in the Browser Window "1" 1012.

Figure 15:
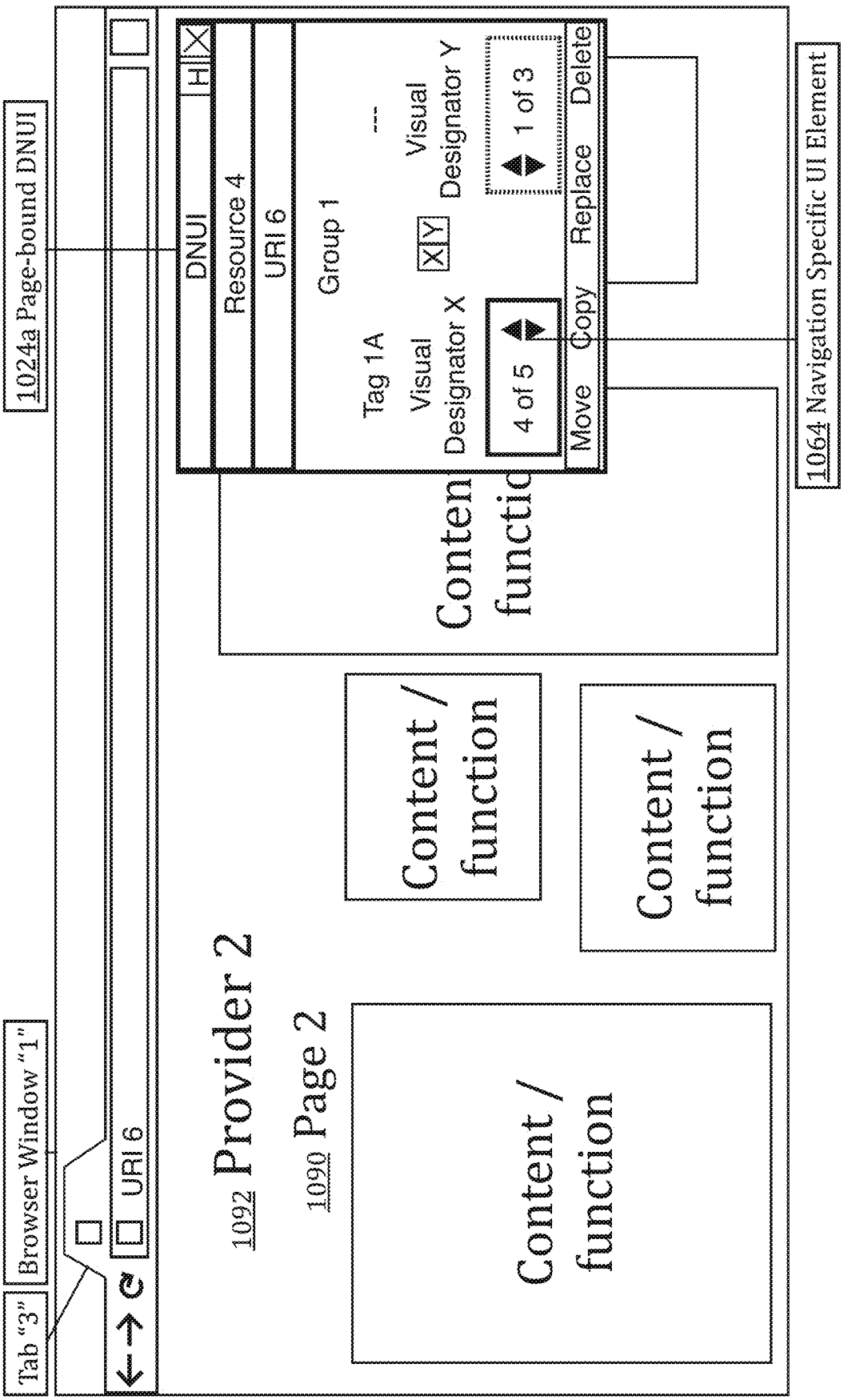
FIG. 15 is a block diagram illustrating a first example embodiment of user interface components and functional modules for implementing a smooth navigation process between digital resources using a page-bound dynamic navigation user interface according to a general example.

FIG. 15 shows a state in which a "down" arrow of a Navigation Specific UI Element 1064, has been selected, initiating a navigation process from the fourth Resource to the fifth Resource within the Resource Set defined by the Group 1, and Sub-Group Tag-1A, has begun. As a result, the Application UI Controller has published a Navigate Message, the Application Controller has published a Smooth Navigation Message which may contain the Current and Target URIs, and the Application UI Controller has begun to analyze the Current and Target URIs to determine whether the URIs meet the criteria sufficient to accomplish a Smooth Navigation.

Figure 16:
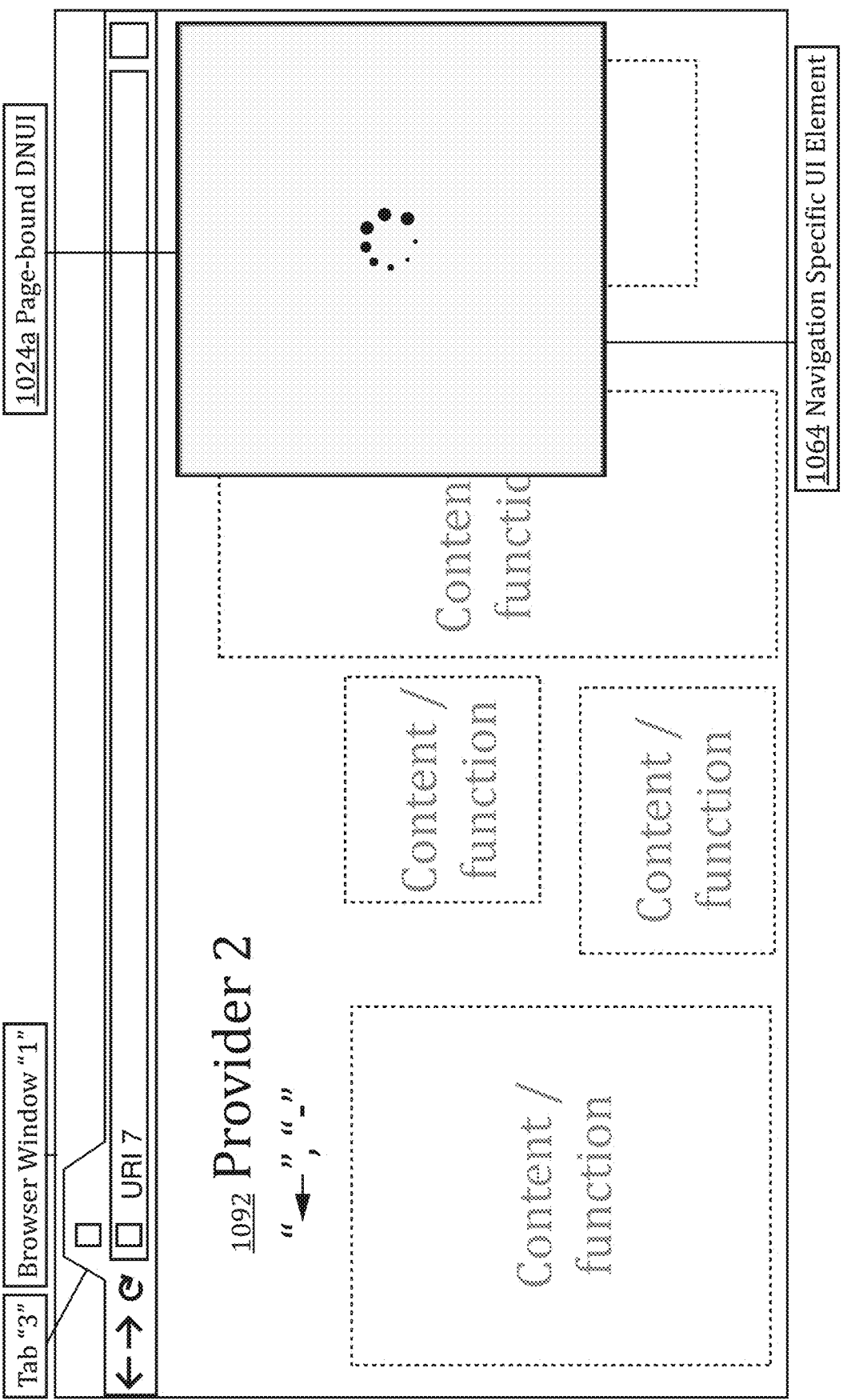
FIG. 16 is a block diagram illustrating a second example embodiment of user interface components and functional modules for implementing a smooth navigation process between digital resources using a page-bound dynamic navigation user interface according to a general example.

FIG. 16 shows a state in which the Application UI Controller has determined the Current and Target URIs have met the criteria sufficient to accomplish a Smooth Navigation. As a result, the Current and Target URIs have been matched with a Smooth Navigation Object (SNO), the Smooth Navigation Timer has begun, the Target URI has been pushed to the history via the history API, and a pop-state event has been dispatched to the current tab's browser window. Reflecting the above, the address bar displays the Target URI 7 for Page 3 1094 of Provider 2 1092 of the fifth Resource. An arrow and minus sign (shown as "→, –") are also shown to symbolize that Provider 2 1092 has begun to redraw the displayed "Content/functions" of Page 2 1090 to the left of and at higher zoom level than their initial representation producing the effect of the map panning right and zooming out. An in-process indication has also been displayed over the DNUI. It is important to note that all elements loaded to display the previous page have not been completely cleared and the browser has not been refreshed before loading elements for a second page.

Figure 17:
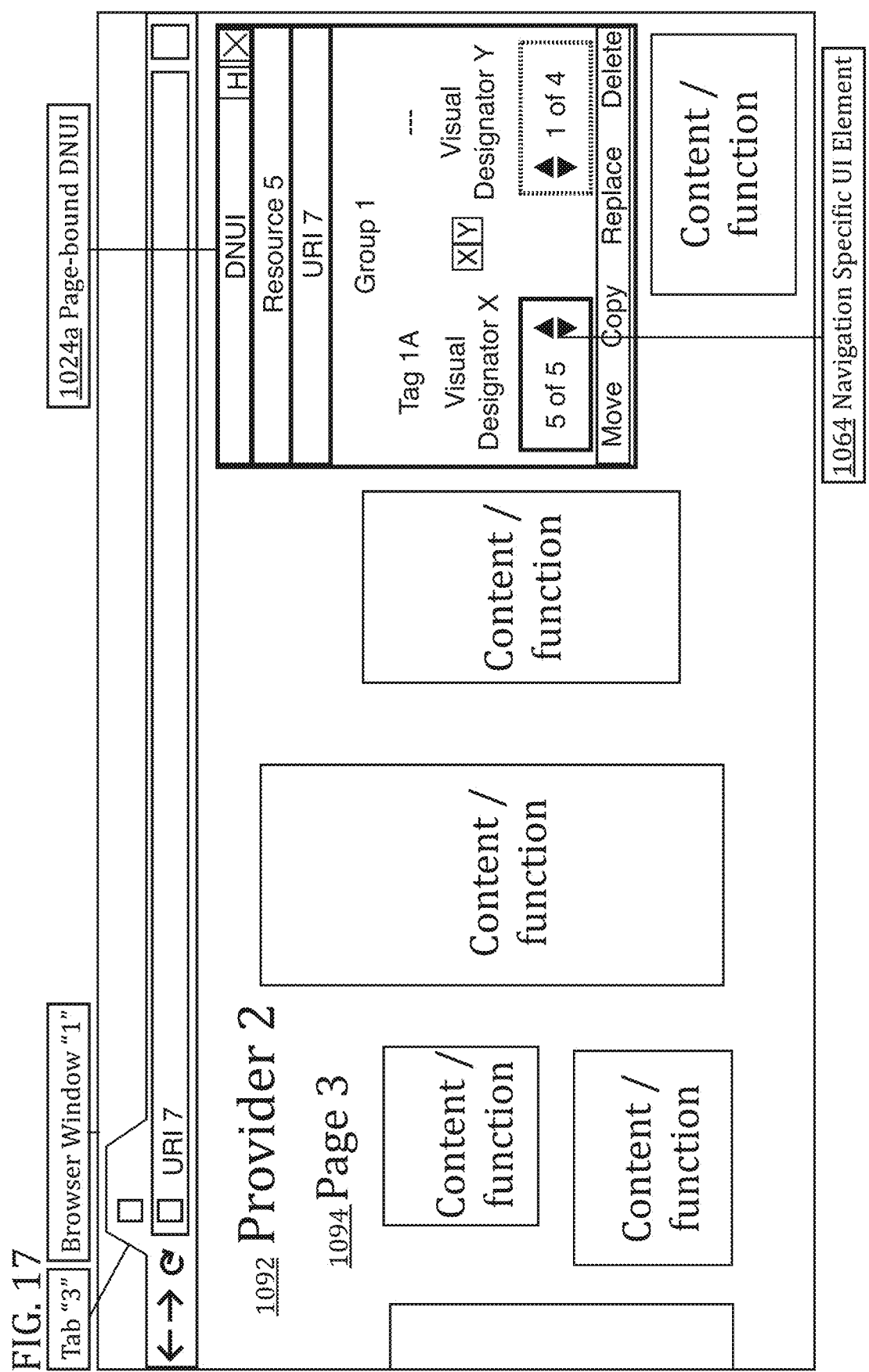
FIG. 17 is a block diagram illustrating a third example embodiment of user interface components and functional modules for implementing a smooth navigation process between digital resources using a page-bound dynamic navigation user interface according to a general example.

FIG. 17 shows the end result of the Smooth Navigation Process. The Target URI and view of FIGS. 15 and 16, is now the Current URI and view displayed in the Browser Window as the fifth Resource. The DNUI reflects the Resource Data of this fifth Resource.

FIG. 18-20 are a series of diagrams illustrating an "Education" example of a Smooth Navigation Process.

FIG. 18 shows a Page-bound DNUI 1024a which may serve as the starting and ending point of a Smooth Navigation Process. A map view zoomed to a specific elevation and centered on the Colosseum in Rome, is displayed with a DNUI as the fourth Resource of the Group "Education" and Sub-Group "Ancient Rome". In the DNUI a "down" arrow of a Navigation Specific UI Element 1064, has been selected, initiating a navigation process from the current map view, the fourth Resource, to a next target map view, the fifth Resource, a view of the Roman Forum geospatially adjacent to and from a higher elevation than the current view of the Colosseum. As a result, the Application UI Controller has published a Navigate Message, the Application Controller has published a Smooth Navigation Message which may contain the Current and Target URIs, and the Application UI Controller has begun to analyze the Current and Target URIs to determine whether the URIs meet criteria sufficient to accomplish a Smooth Navigation.

FIG. 19 shows a state in which the Application UI Controller has determined the Current and Target URIs have met the criteria sufficient to accomplish a Smooth Navigation. As a result, the URIs have been matched with a Smooth Navigation Object (SNO), the Smooth Navigation Timer has begun, the Target URI has been pushed to the history via the history API, and a pop-state event has been dispatched to the current tab's browser window. Reflecting the above, the address bar displays the Target URI for the map view of the Roman Forum. An arrow and minus sign (shown as "→, –") are also shown to symbolize that the Maps Provider has begun to redraw the displayed elements such as the Colosseum to the right of and from the perspective of a higher elevation than their initial representation producing the effect of the map panning left and zooming out. An in-process indication has also been displayed over the DNUI. It is important to note that all the elements loaded in order to display the view of the Colosseum are not cleared before rendering the adjacent view of Roman Forum.

FIG. 20 shows the end result of the Smooth Navigation Process. The Target URI and view of FIGS. 18 and 19, are now the Current URI and view displayed in the Browser Window as the fifth Resource. The DNUI reflects the Resource Data of this Resource.

Figure 21A:
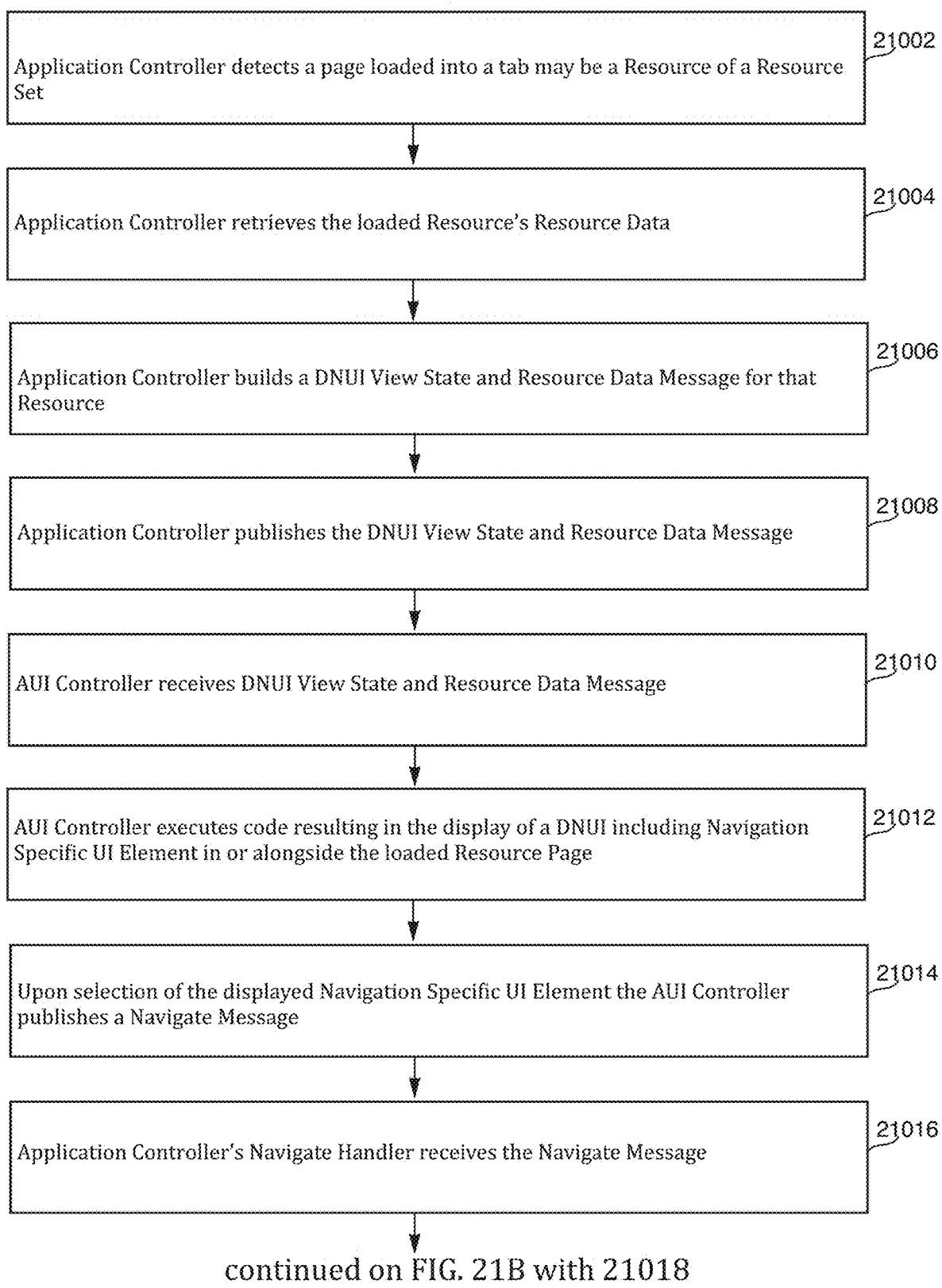
FIGS. 21A-21B are flowcharts illustrating an embodiment of a first process for navigating between digital resources using a dynamic navigation user interface using a browser-bound configuration.
Figure 21B:
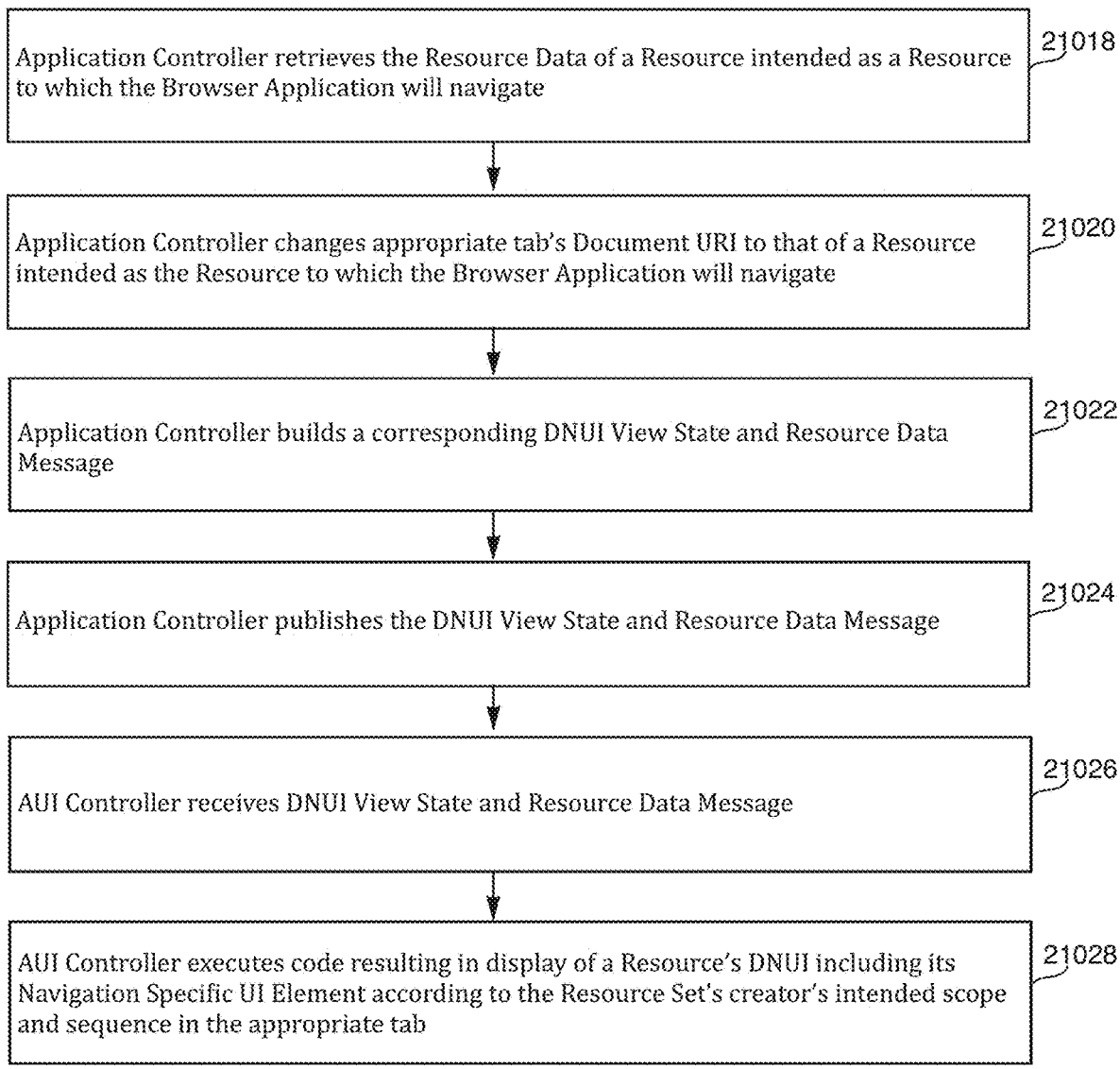
Figure 23A:
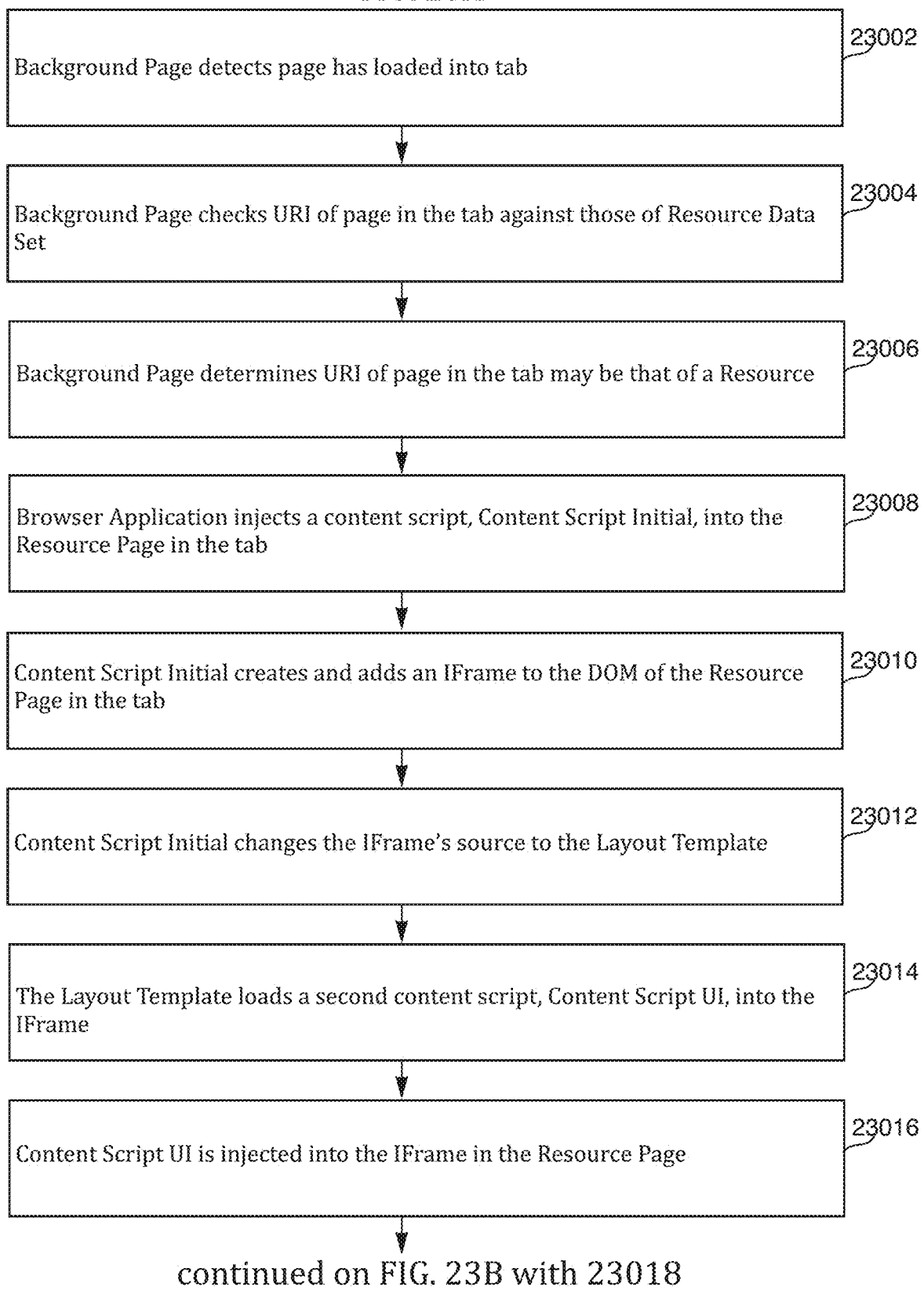
FIGS. 23A-23D are flowcharts illustrating an embodiment of a process for navigating between digital resources using a dynamic navigation user interface using a page-bound configuration.
Figure 23B:
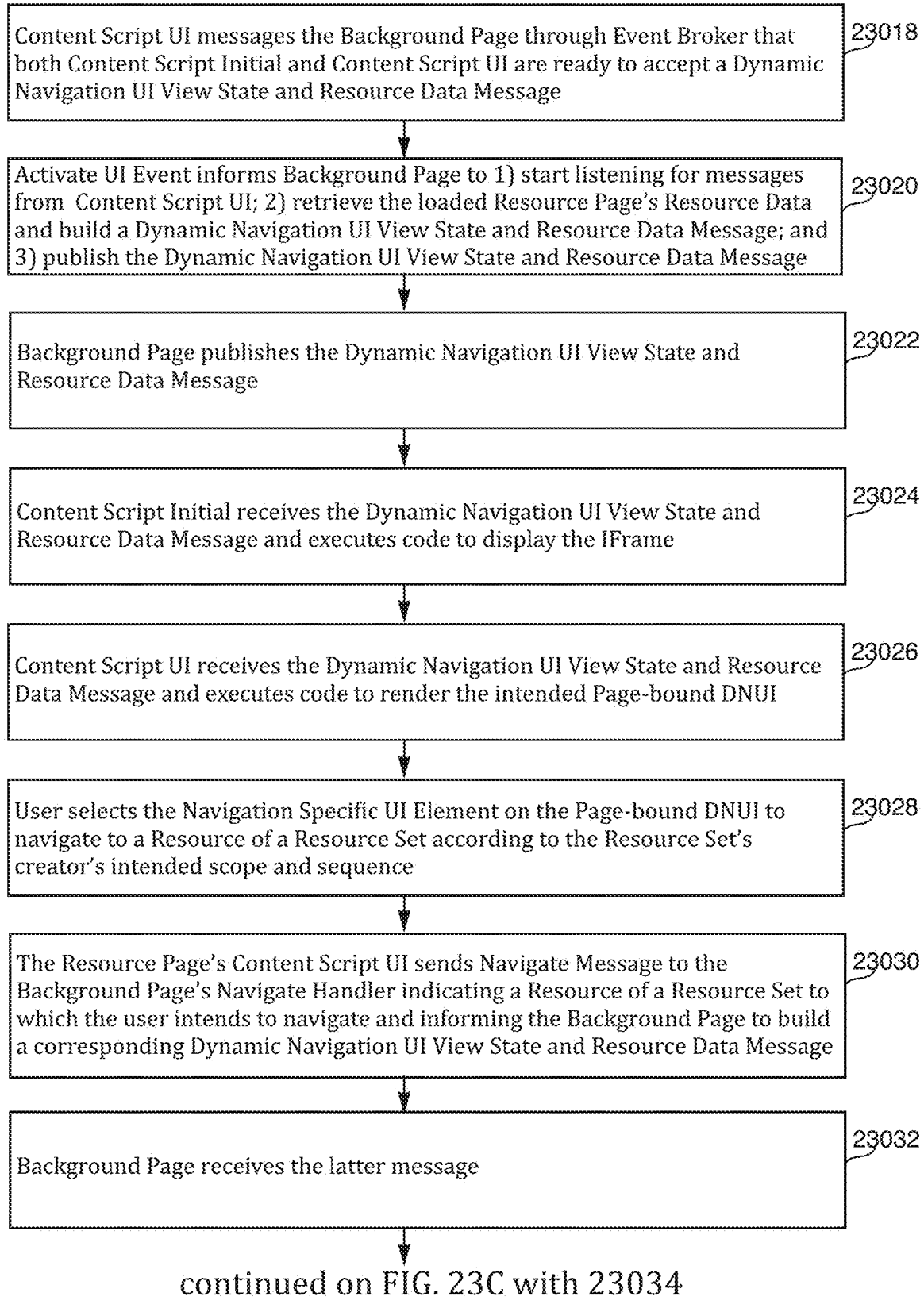
Figure 23C:
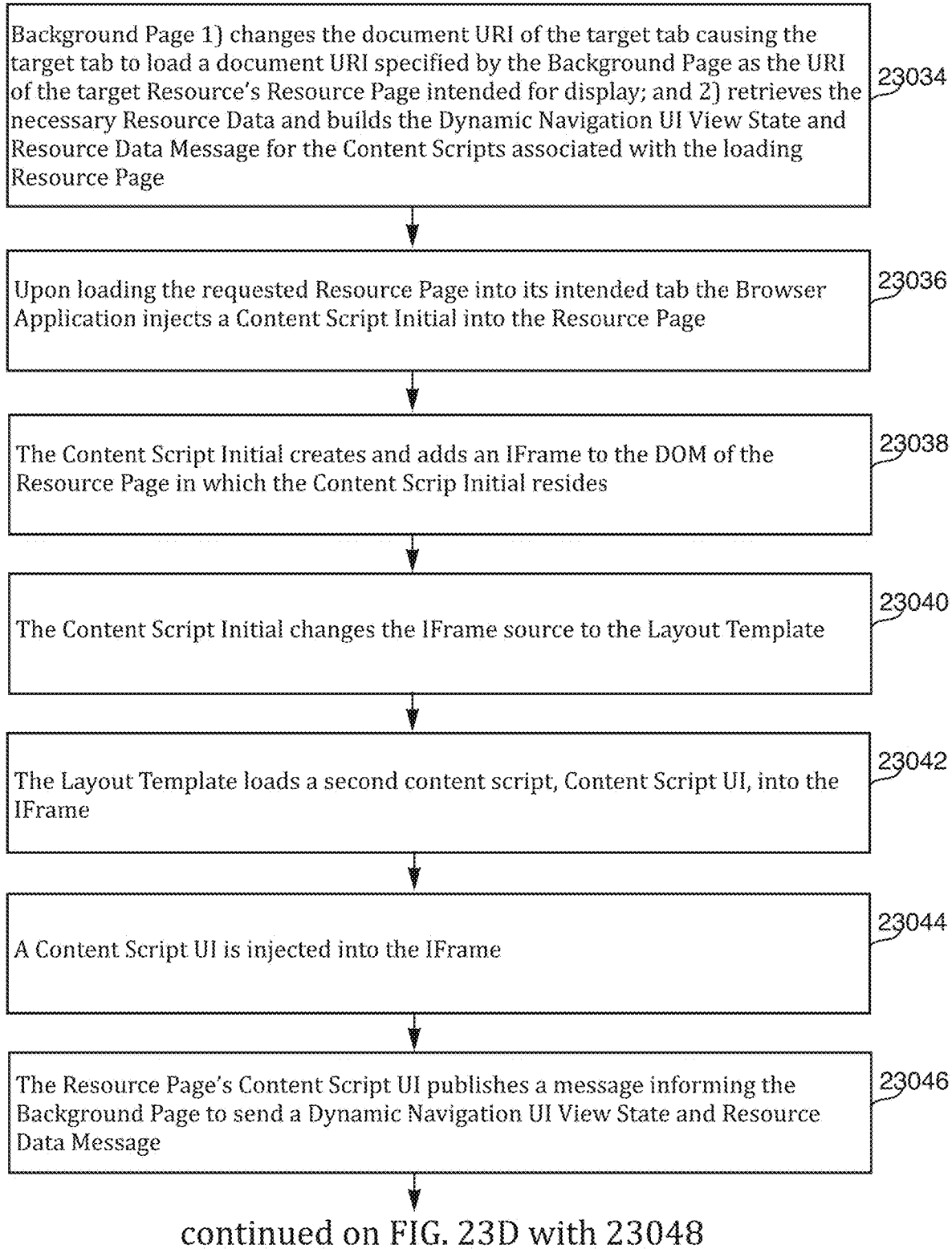
Figure 23D:
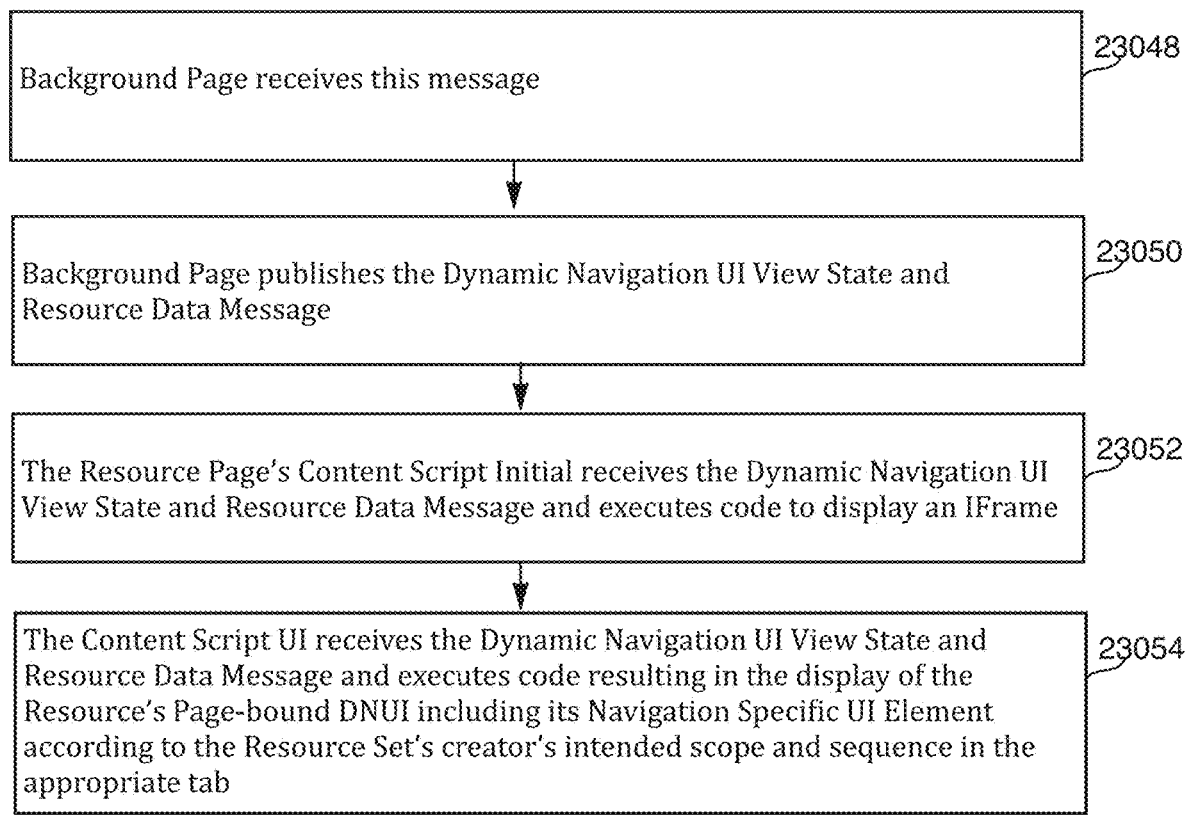

FIGS. 21A and 21B are flowcharts illustrating example operations of the system 1000 of FIG. 1 executing the Navigation Process, enablement of the repetitive selection of the same Navigation Specific UI Element in the Dynamic Navigation User Interface (DNUI) to result in the display of Resources in a Resource Set according to the Resource Set's creator's intended scope and sequence. In the example of FIGS. 21A and 21B operations (21002-21028) are illustrated as discrete operations occurring in a sequential manner. However, it may be appreciated that the operations (21002-21028) may execute in a partially or completely overlapping (e.g., parallel) manner. Further, the operations (21002-21028) may occur in an order different than that shown or may include additional or different operations not specifically illustrated with respect to 21A-21B. Further, it should be noted and as implied earlier in the description, several steps in these figures may be accomplished by a number of ways by varying the location of the data elements and degree of programmatic function of one or more steps. However, each step may be accomplished using the system 1000 components and data represented in the figures and description herein. In FIGS. 21A and 21B several basic operations are assumed to have taken place including but not limited to the initialization of the Browser Application 1032.

In the example of FIGS. 21A and 21B, in a first instance, the Application Controller detects a page loaded into a tab may be a Resource of a Resource Set (21002). The Application Controller retrieves the loaded Resource's Resource Data (21004). The Application Controller builds a DNUI View State and Resource Data Message for that Resource (21006). The Application Controller publishes the DNUI View State and Resource Data Message (21008). An AUI Controller receives the DNUI View State and Resource Data Message (21010). An AUI Controller executes code resulting in the display of a DNUI including Navigation Specific UI Element in or alongside the loaded Resource Page (21012). Upon selection of the displayed Navigation Specific UI Element the AUI Controller publishes a Navigate Message (21014). The Application Controller receives the Navigate Message (21016). The Application Controller retrieves the Resource Data of a Resource intended as a Resource to which the Browser Application will navigate (21018). The Application Controller changes appropriate tab's document URI to that of a Resource intended as the Resource to which the Browser Application will navigate (21020). The Application Controller builds a corresponding DNUI View State and Resource Data Message (21022). The Application Controller publishes the DNUI View State and Resource Data Message (21024). An AUI Controller receives the DNUI View State and Resource Data Message (21026). The AUI Controller executes code resulting in display of a Resource's DNUI including its Navigation Specific UI Element according to the Resource Set's creator's intended scope and sequence in the appropriate tab (21028).

FIGS. 22A and 22B are flowcharts illustrating example operations of the system 1001 of FIG. 2 executing the Navigation Process. In the example of FIGS. 22A and 22B operations (22002-22028) are illustrated as discrete operations occurring in a sequential manner. However, it may be appreciated that the operations (22002-22028) may execute in a partially or completely overlapping (e.g., parallel) manner. Further, the operations (22002-22028) may occur in an order different than that shown or may include additional or different operations not specifically illustrated with respect to 22A-22B. Further, it should be noted and as implied earlier in the description, several steps in these figures may be accomplished by a number of ways by varying the location of the data elements and degree of programmatic function of one or more steps. However, each step may be accomplished using the system 1001 components and data represented in the figures and description herein. In FIGS. 22A and 22B several basic operations are assumed to have taken place including but not limited to the initialization of the Browser Application 1033.

In the example of FIGS. 22A and 22B, in a first instance, the Application Controller detects a page loaded in Browser Application 1033 may be a Resource of a Resource Set (22002). The Application Controller 1041 retrieves the loaded Resource's Resource Data (22004). The Application Controller 1041 builds a DNUI View State and Resource Data Message for that Resource (22006). The Application Controller 1041 publishes the DNUI View State and Resource Data Message (22008). An AUI Controller 1043 receives the DNUI View State and Resource Data Message (22010). An AUI Controller 1043 executes code resulting in the display of a DNUI including Navigation Specific UI Element in or alongside the loaded Resource Page (22012). Upon selection of the displayed Navigation Specific UI Element 1064 the AUI Controller 1043 publishes a Navigate Message (22014). The Application Controller 1041 receives the Navigate Message (22016). The Application Controller retrieves the Resource Data of a Resource intended as a Resource to which the Browser Application will navigate (22018). The Application Controller 1041 changes appropriate Rendered View's URI to that of a Resource intended as the Resource to which the Browser Application 1033 will navigate (22020). The Application Controller 1041 builds a corresponding DNUI View State and Resource Data Message (22022). The Application Controller 1041 publishes the DNUI View State and Resource Data Message (22024). An AUI Controller 1043 receives the DNUI View State and Resource Data Message (22026). The AUI Controller 1043 executes code resulting in display of a Resource's DNUI including its Navigation Specific UI Element 1064 according to the Resource Set's creator's intended scope and sequence in the appropriate Rendered View (22028).

FIGS. 23A, 23B, 23C, and 23D are a series of flowcharts illustrating more detailed example operations of the system 1000 of FIG. 1 as implemented using a Page-bound configuration as described above and shown in FIG. 6. In an example implementation of FIGS. 23A-D, the Event Broker 1068 may broker messages between the Content Scripts and Background Page 1050b even if not explicitly described in the process below.

In the example of FIGS. 23A, 23B, 23C, and 23D, operations (23002-23054) are illustrated as discrete operations occurring in a sequential manner. However, it may be appreciated that the operations (23002-23054) may execute in a partially or completely overlapping (e.g., parallel) manner. Further, the operations (23002-23054) may occur in an order different than that shown or may include additional or different operations not specifically illustrated with respect to FIGS. 23A, 23B, 23C, and 23D. In FIGS. 23A, 23B, 23C, and 23D several basic operations are assumed to have taken place including but not limited to the initialization of the Browser Application 1032.

In the example of FIGS. 23A, 23B, 23C, and 23D, in a first instance, the Background Page 1050b detects that a page has been loaded into a tab (23002), checks the URI of the page against those of the available Resource Data Set 1026 (23004), and determines that the URI of the page in the tab is part of the Resource Data Set 1026 (23006). The latter determination provides the basis for the initial rendering of the Page-bound DNUI 1024a for this figure. However, such a determination may not occur if the URI does not match that of one of the URIs stored as Resource Data in the available Resource Data Set 1026 or if the URI does not match a URI that meets criteria for acceptability as a URI for a Resource. If that determination does not occur, a separate process may begin that may or may not lead to the Resource Set Navigation Process. Given the determination does occur, the page is understood to be a Resource Page of the Resource Data Set 1026.

The Browser Application 1032 injects a content script, Content Script Initial 1072, into the Resource Page in the tab (23008). The Content Script Initial 1072 creates and adds an IFrame 1076 to the DOM of the Resource Page in the tab (23010). The Content Script Initial 1072 changes the IFrame's 1076 source to the Layout Template, a .html file (23012). The Layout Template loads a second content script, Content Script UI 1074, into the IFrame 1076 (23014). Content Script UI 1074 is injected into the IFrame 1076 in the Resource Page (23016).

The Content Script UI 1074 messages the Background Page 1050*b* through the Event Broker 1068 that both the Content Script Initial 1072 and Content Script UI 1074 are ready to accept a Dynamic Navigation UI View State and Resource Data Message (23018).

The Background Page 1050*b* can be configured so that, initially, it does not listen for the Dynamic Navigation UI View State and Resource Data Message; the latter gives the user control over whether the Page-bound DNUI 1024*a* is displayed for a Resource Page of a Resource Set. As indicated in the figure, an Activate UI Event informs the Background Page 1050*b* to 1) start listening for messages from the Content Script UI 1074; 2) retrieve the loaded Resource Page's Resource Data and build a Dynamic Navigation UI View State and Resource Data Message, and 3) publish the Dynamic Navigation UI View State and Resource Data Message (23020). The Background Page 1050*b* publishes the Dynamic Navigation UI View State and Resource Data Message (23022). The Content Script Initial 1072 receives the Dynamic Navigation UI View State and Resource Data Message and executes code to display the IFrame 1076 (23024). The Content Script UI 1074 receives the Dynamic Navigation UI View State and Resource Data Message and executes code to render the intended Page-bound DNUI 1024*a* (23026).

User selects the Navigation Specific UI Element 1064 on the Page-bound DNUI 1024*a* to navigate to a Resource of a Resource Set according to the Resource Set's creator's intended scope and sequence (23028). The Resource Page's Content Script UI 1074 sends Navigate Message to the Background Page's Navigate Handler indicating a Resource of a Resource Set to which the user intends to navigate and informing the Background Page 1050*b* to build a corresponding Dynamic Navigation UI View State and Resource Data Message (23030). The Background Page 1050*b* can understand from which tab the latter message is received and to which tab the returning message should be sent.

The Background Page 1050*b* receives the latter message (23032). The Background Page 1050*b* 1) changes the document URI of the target tab causing the target tab to load a document URI specified by the Background Page as the URI of the target Resource's Resource Page intended for display; and 2) retrieves the Resource Data and builds the Dynamic Navigation UI View State and Resource Data Message for the Content Scripts associated with the loading Resource Page (23034).

Upon loading the requested Resource Page into its intended tab the Browser Application injects a Content Script Initial 1072 into the Resource Page (23036). The Content Script Initial 1072 creates and adds an IFrame 1076 to the DOM of the Resource Page in which the Content Script Initial 1072 resides (23038). The Content Script Initial 1072 changes the IFrame 1076 source to the Layout Template, a .html file (23040). The Layout Template loads a second content script, Content Script UI 1074, into the IFrame 1076 (23042). A Content Script UI 1074 is injected into the IFrame 1076 (23044).

The Resource Page's Content Script UI 1074 publishes a message informing the Background Page 1050*b* to send a Dynamic Navigation UI View State and Resource Data Message (23046). The Background Page 1050*b* receives this message from each Resource Page (23048). The Background Page 1050*b* publishes the Dynamic Navigation UI View State and Resource Data Message (23050). The Resource Page's Content Script Initial 1072 receives the Dynamic Navigation UI View State and Resource Data Message and executes code to display an IFrame 1076 (23052). The Content Script UI 1074 receives the Dynamic Navigation UI View State and Resource Data Message and executes code resulting in the display of the Resource's Page-bound DNUI including its Navigation Specific UI Element 1064 according to the Resource Set's creator's intended scope and sequence in the appropriate tab (23054).

Figure 24:
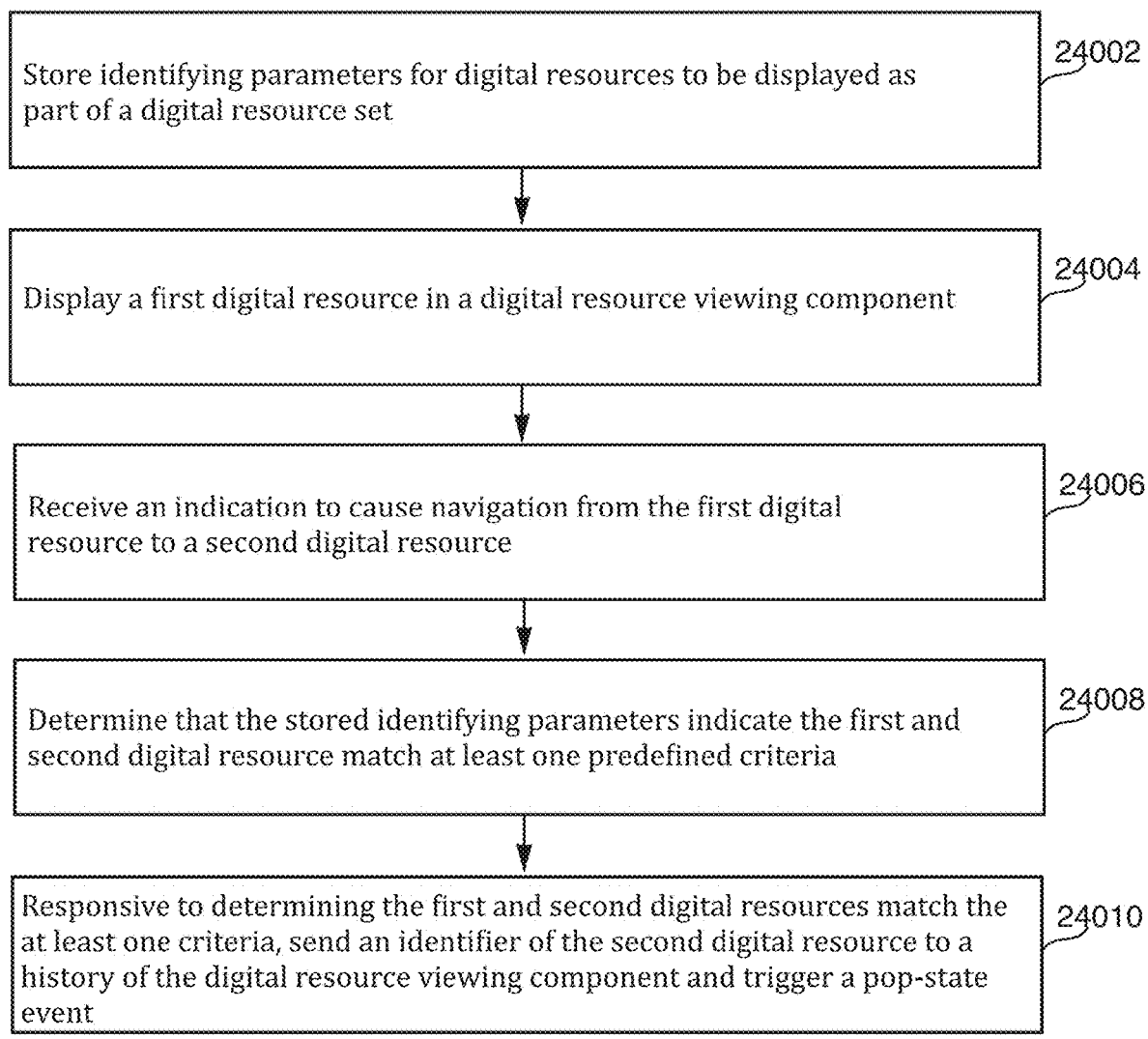
FIG. 24 is a flowchart illustrating an embodiment of a process for smoothly navigating between digital resources.
Figure 25A:
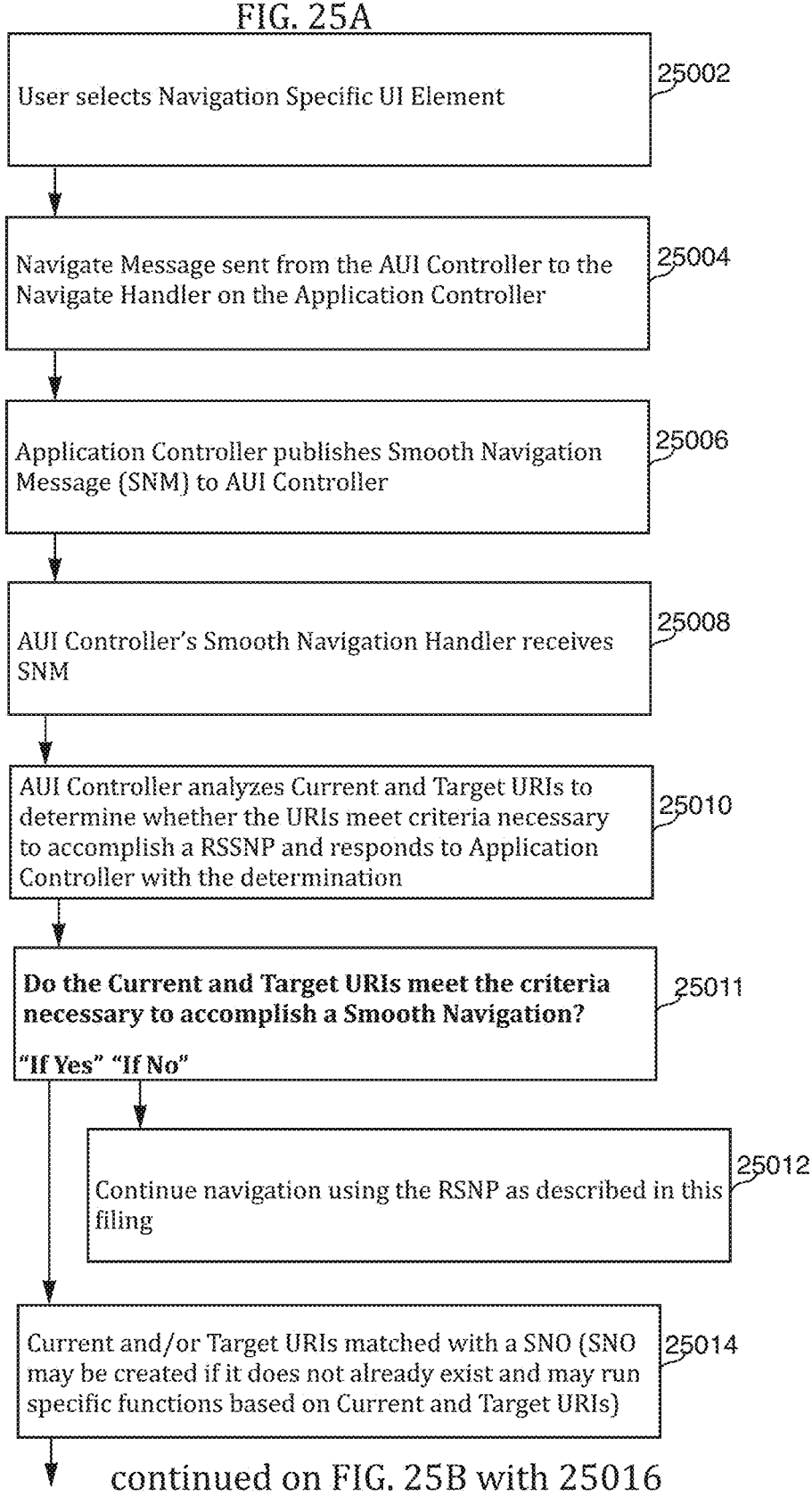
FIGS. 25A-25F is a flowchart illustrating an embodiment of a first process for smoothly navigating between digital resources using a dynamic navigation user interface using a browser-bound configuration.
Figure 25B:
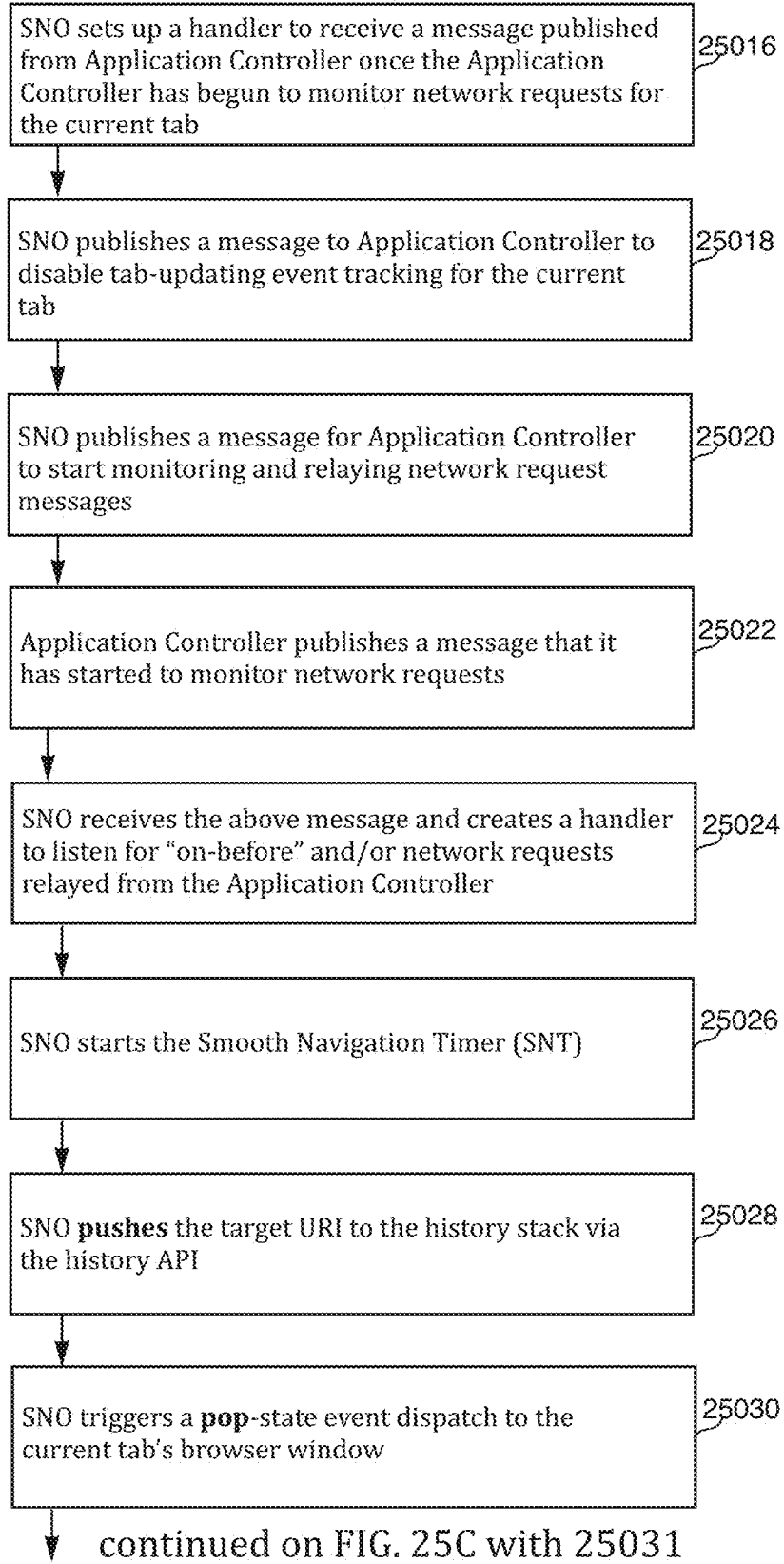
Figure 25C:
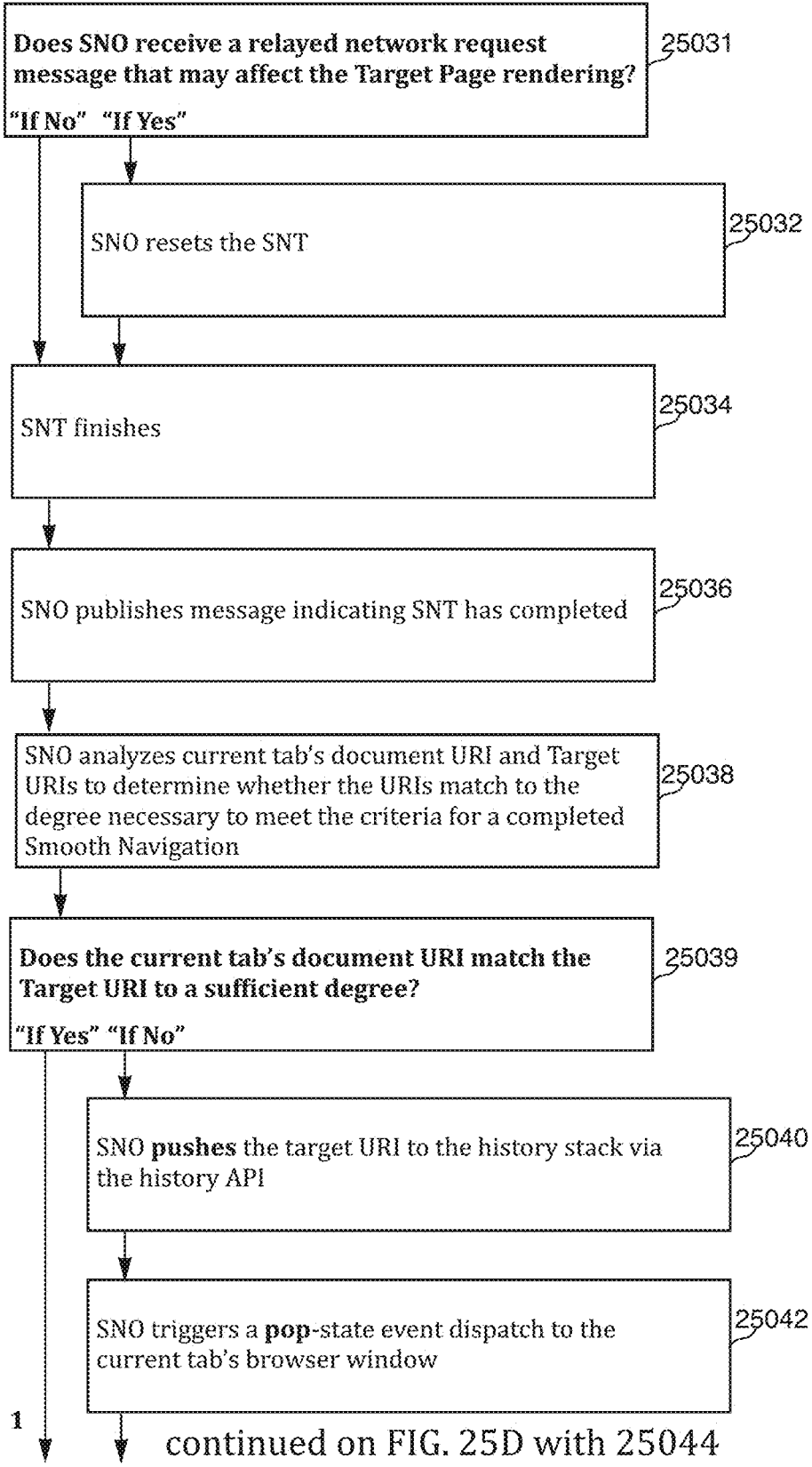
Figure 25D:
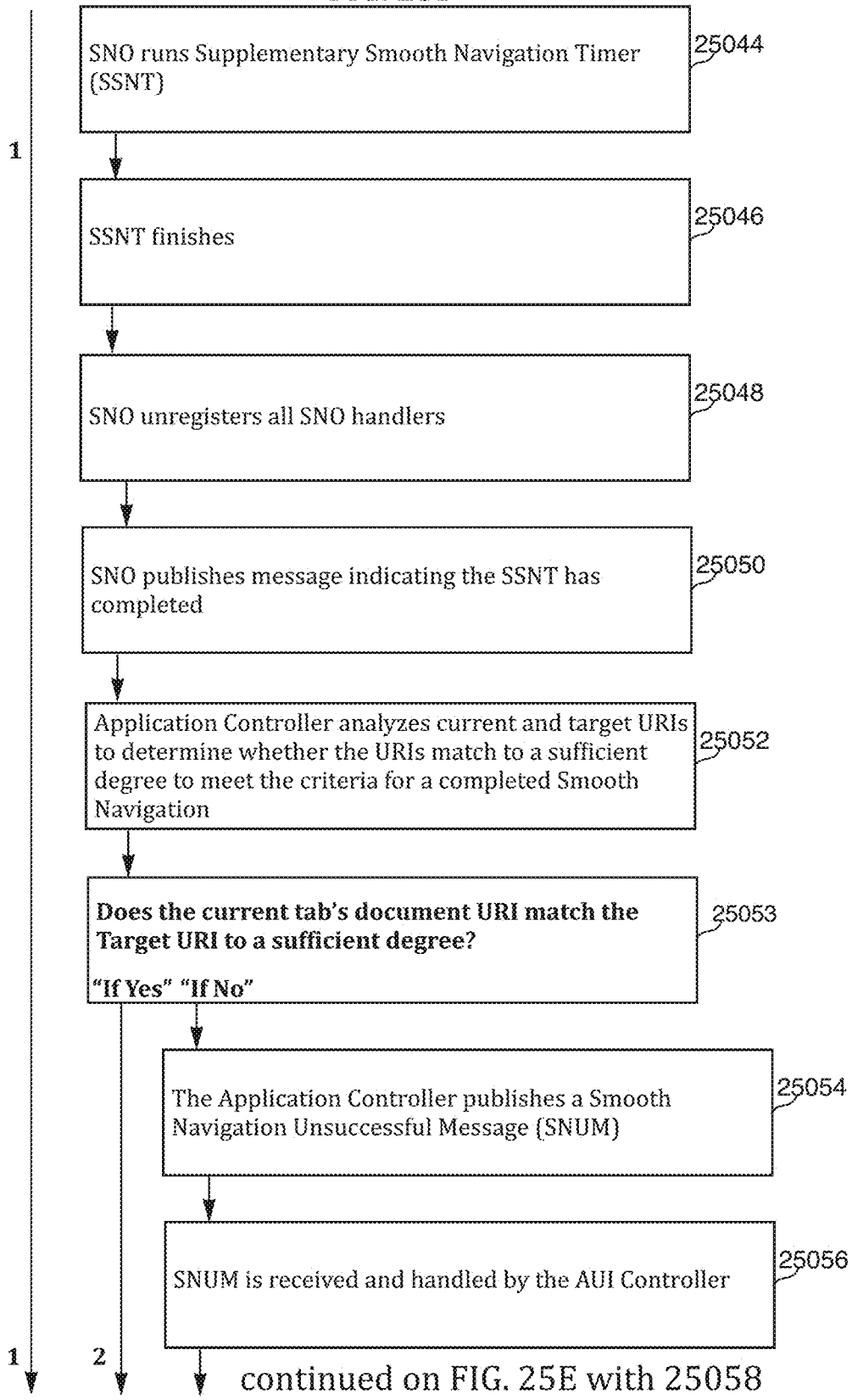
Figure 25E:
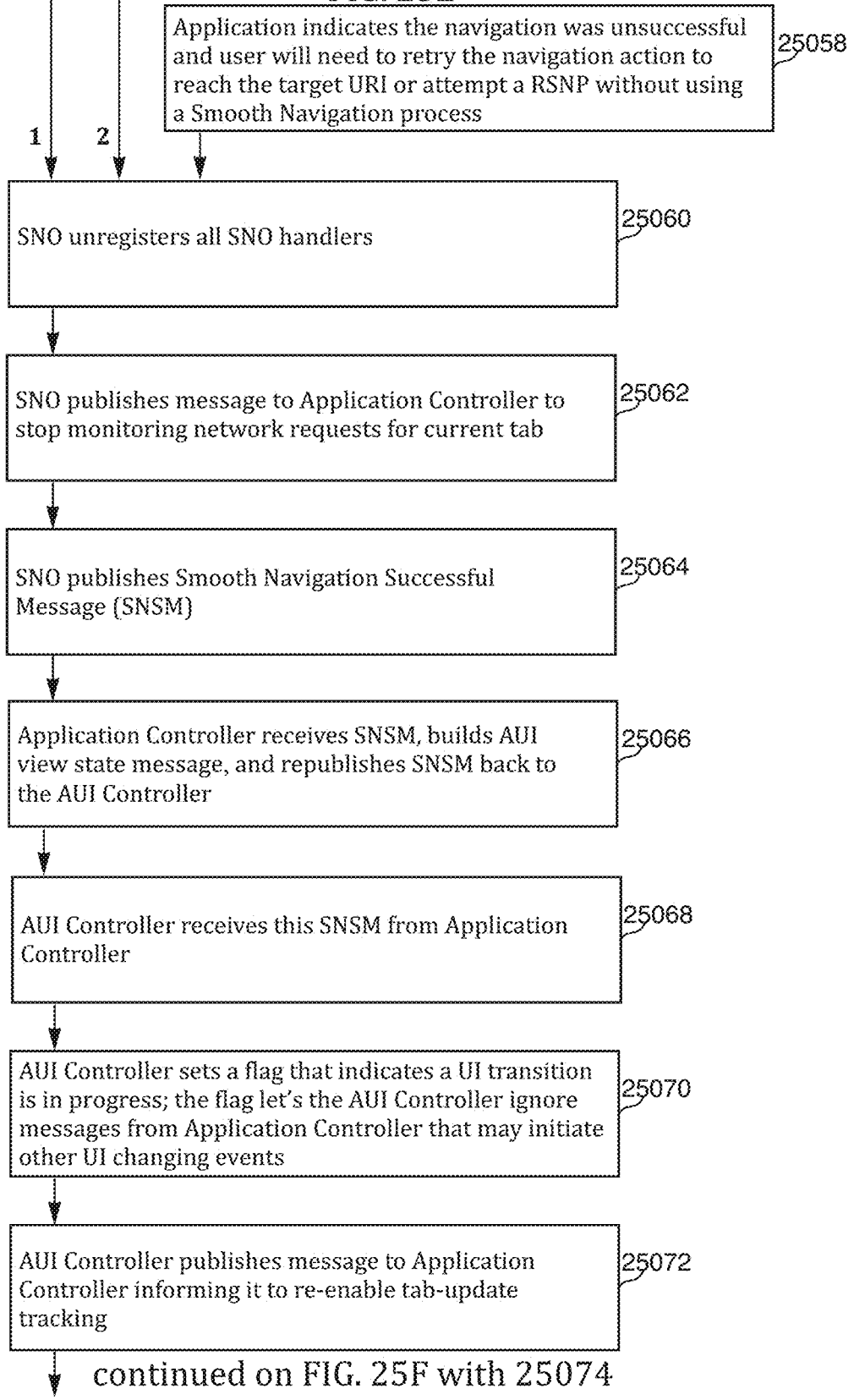
Figure 25F:
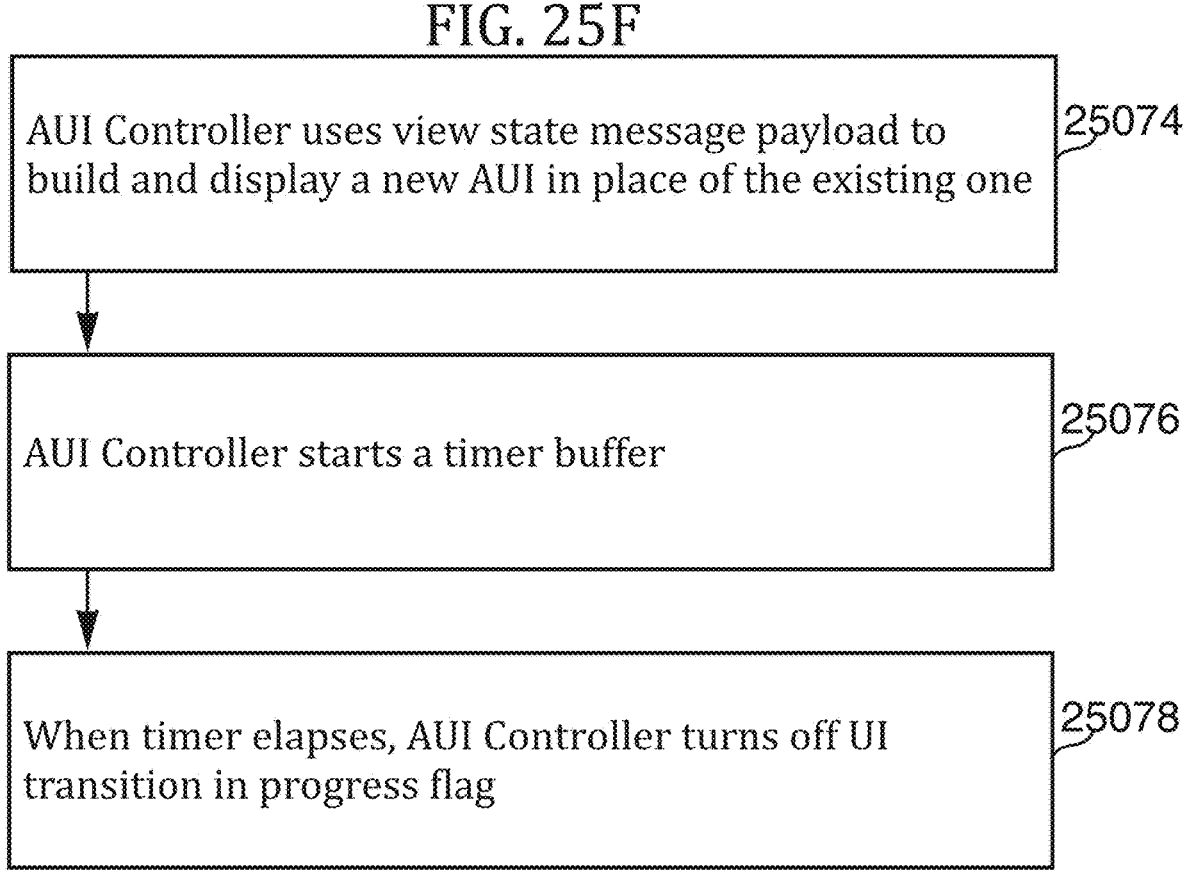
Figure 26A:
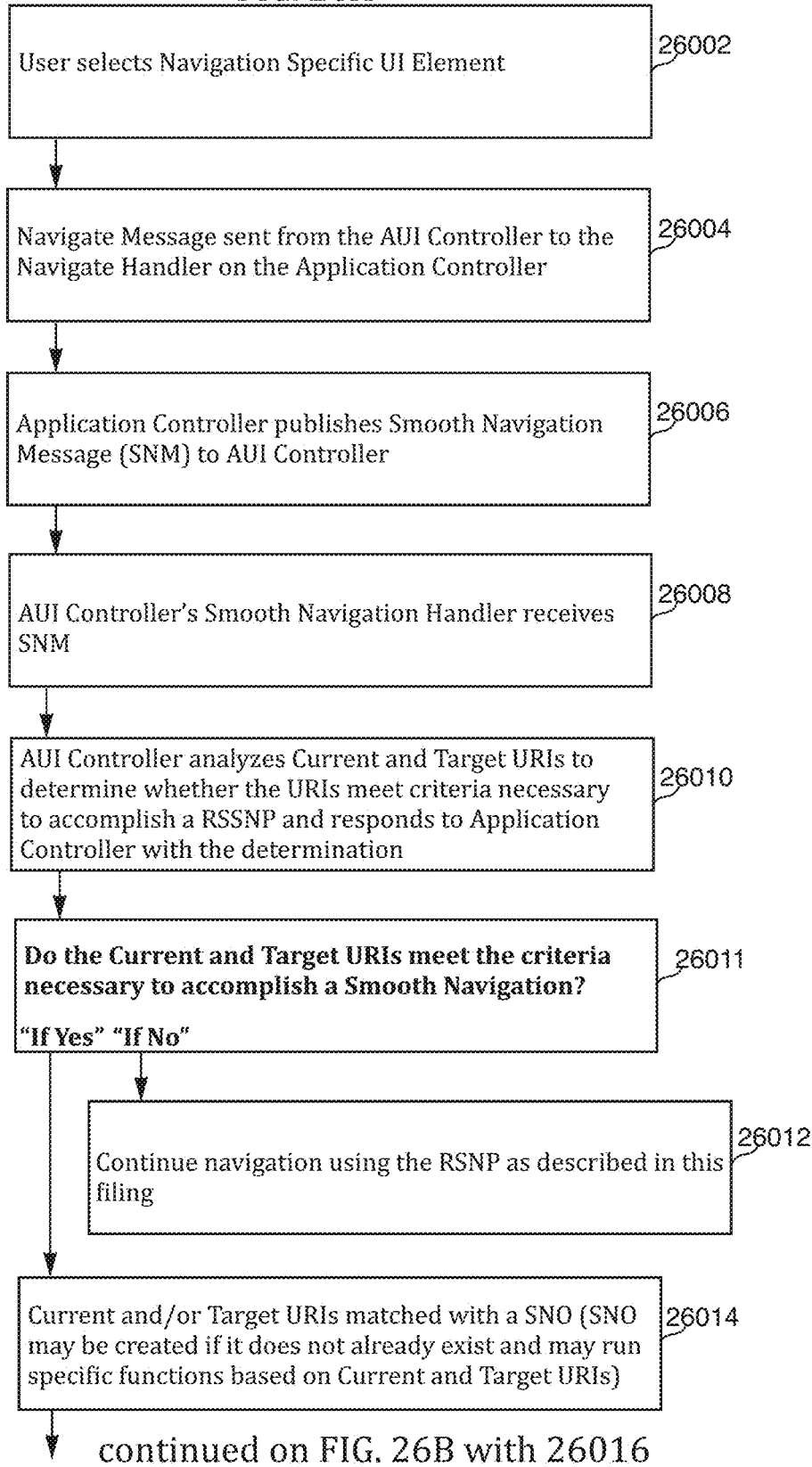
Figure 26B:
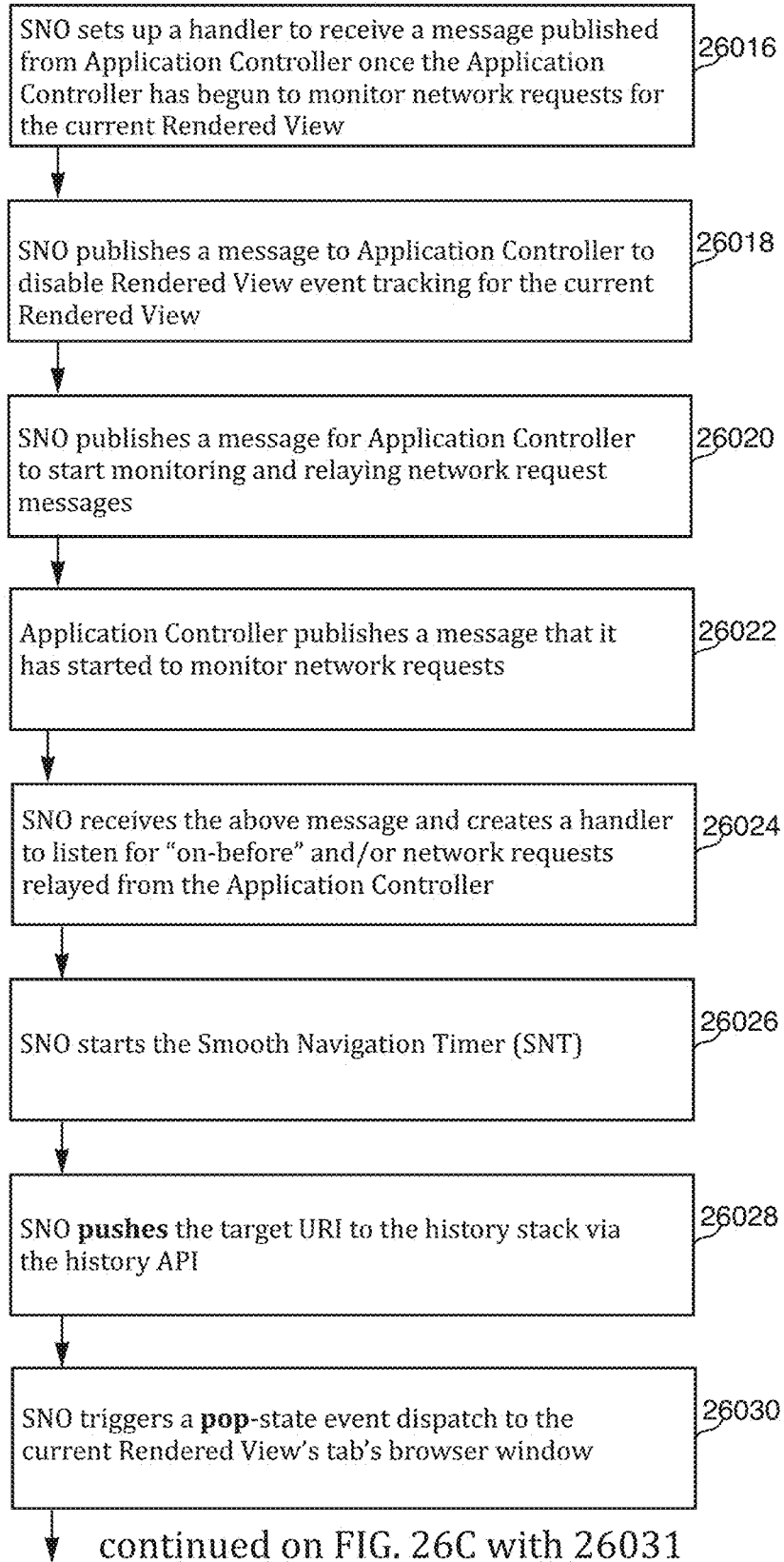
Figure 26C:
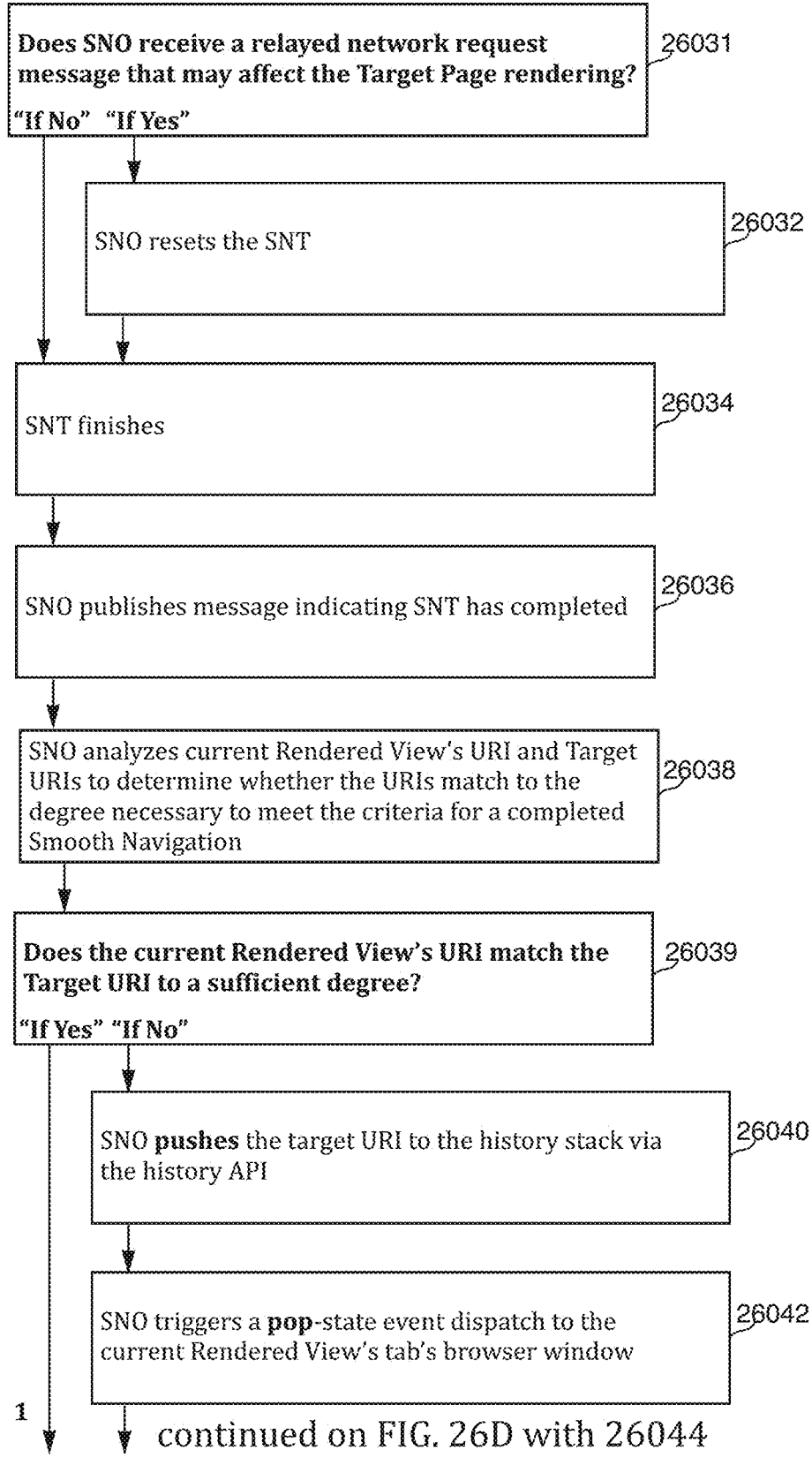
Figure 26D:
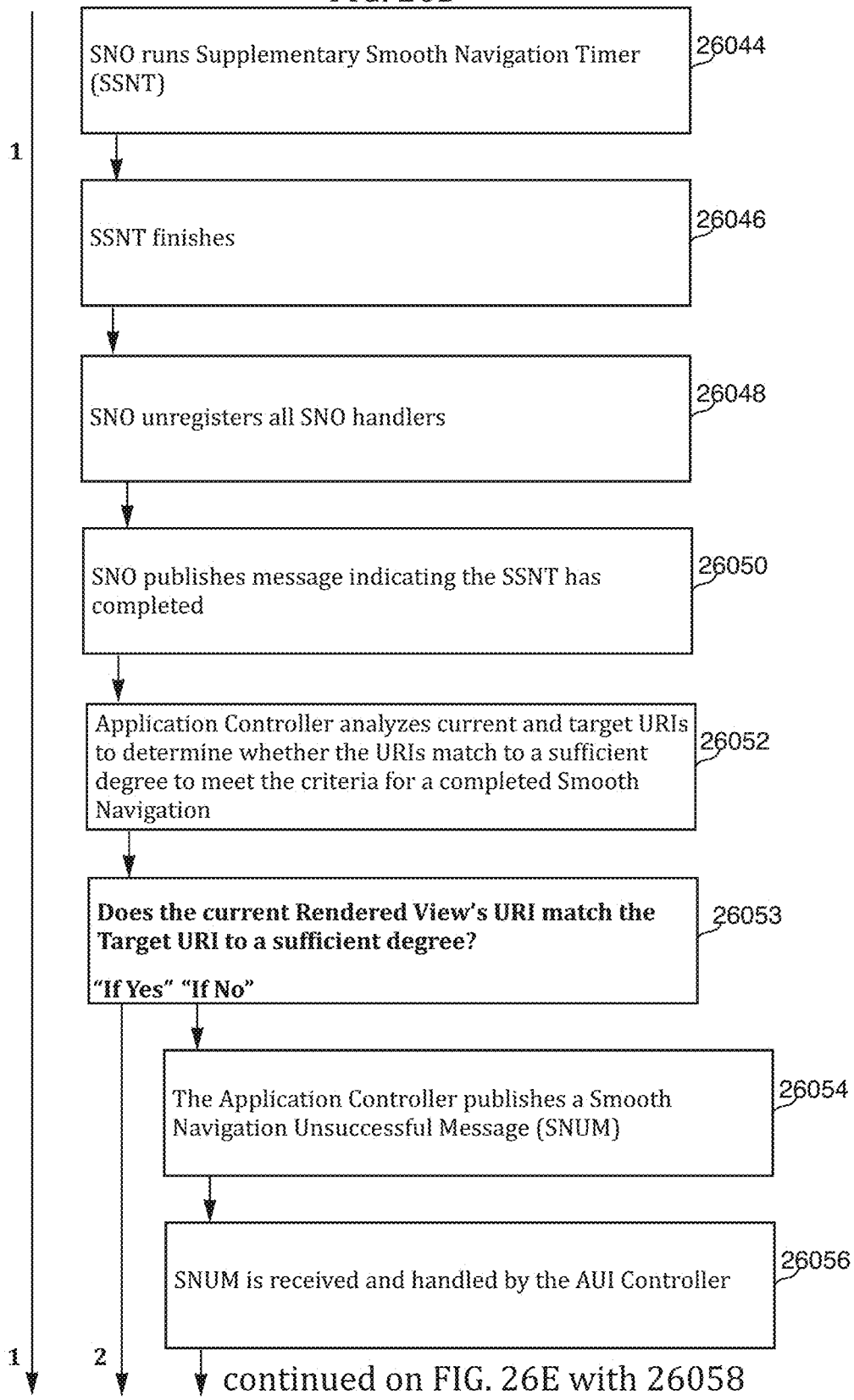
Figure 26F:
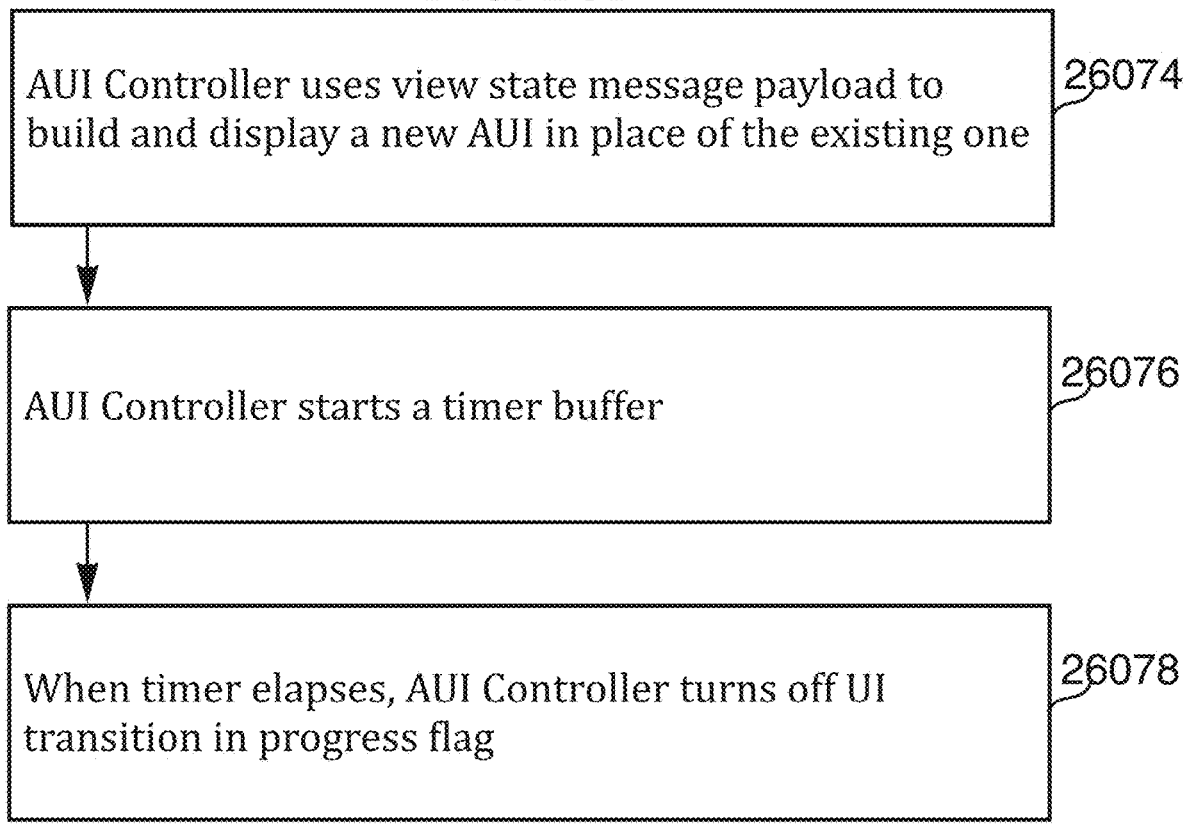
Figure 27B:
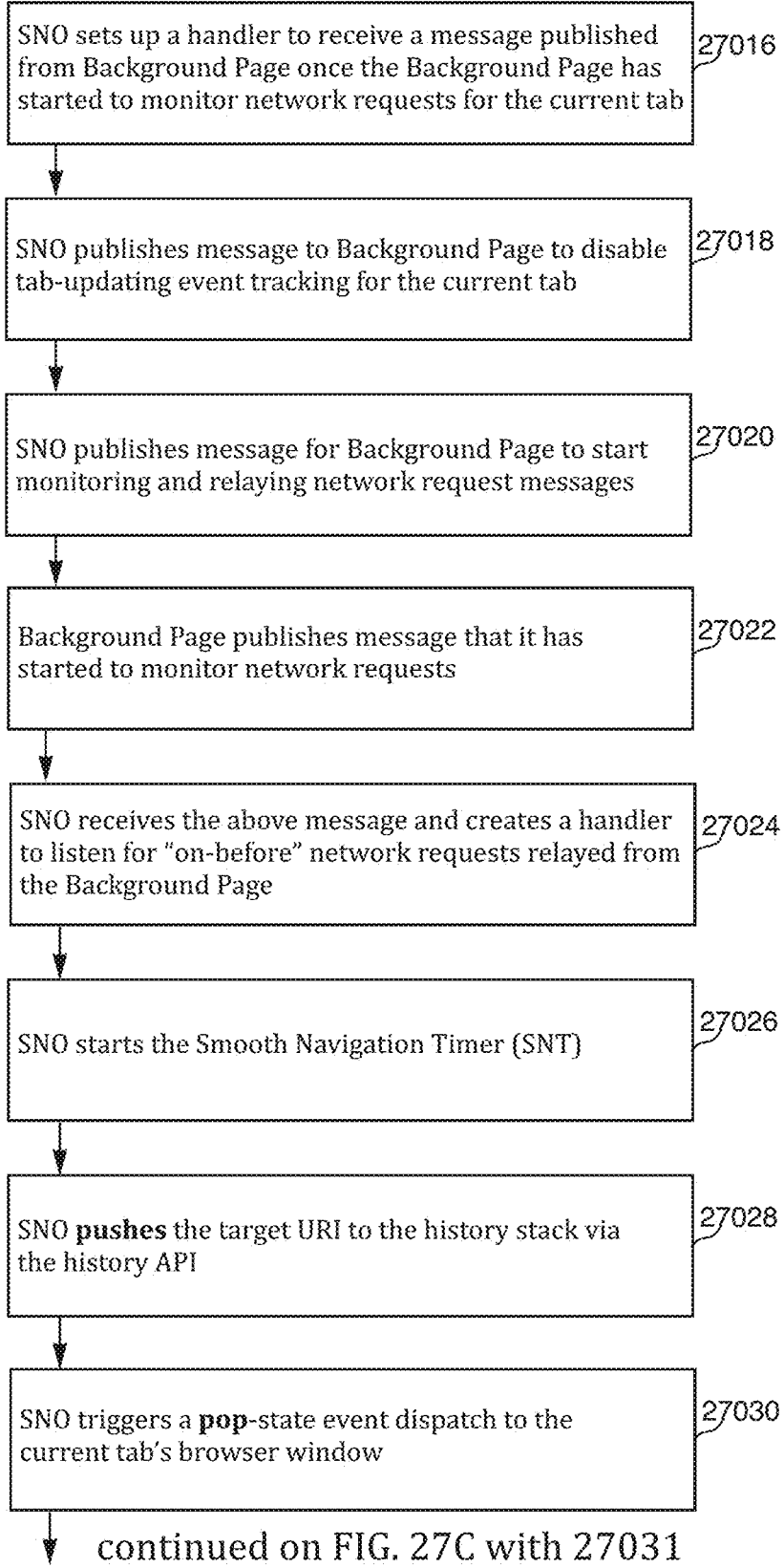
Figure 27F:
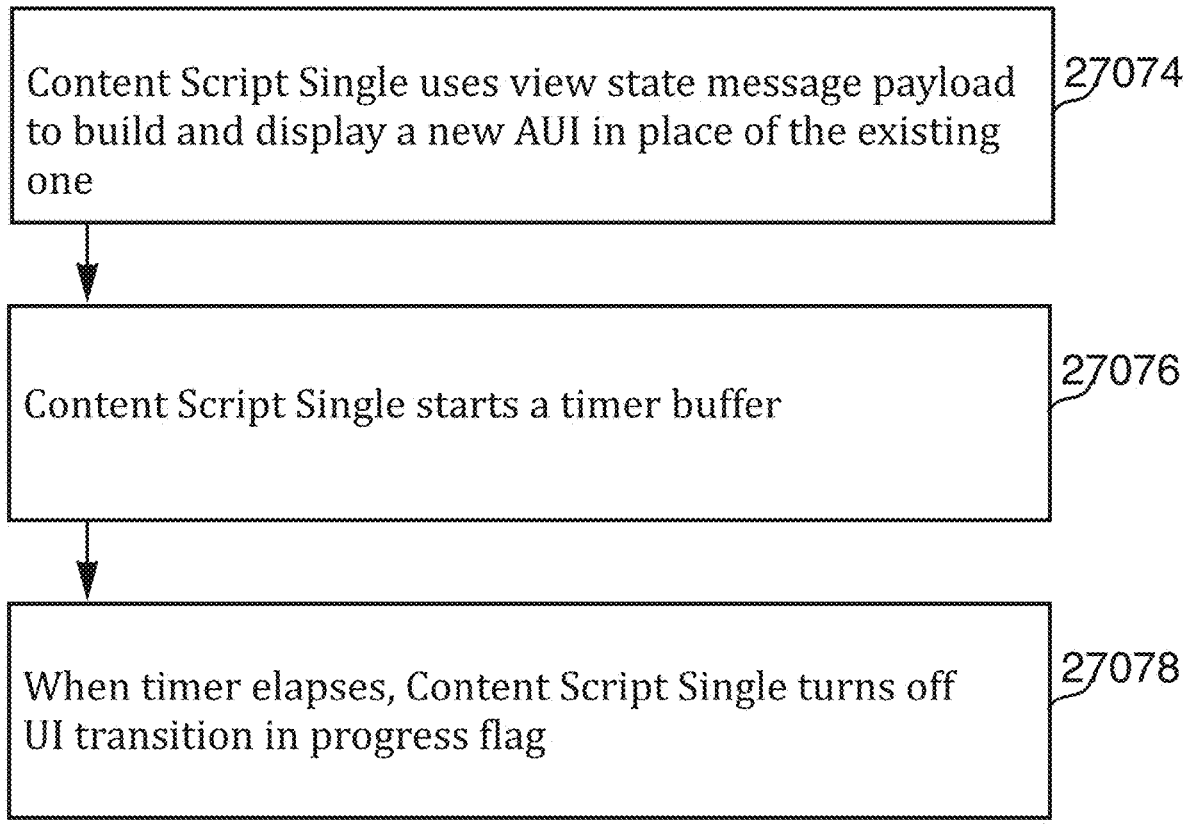
Figure 28A:
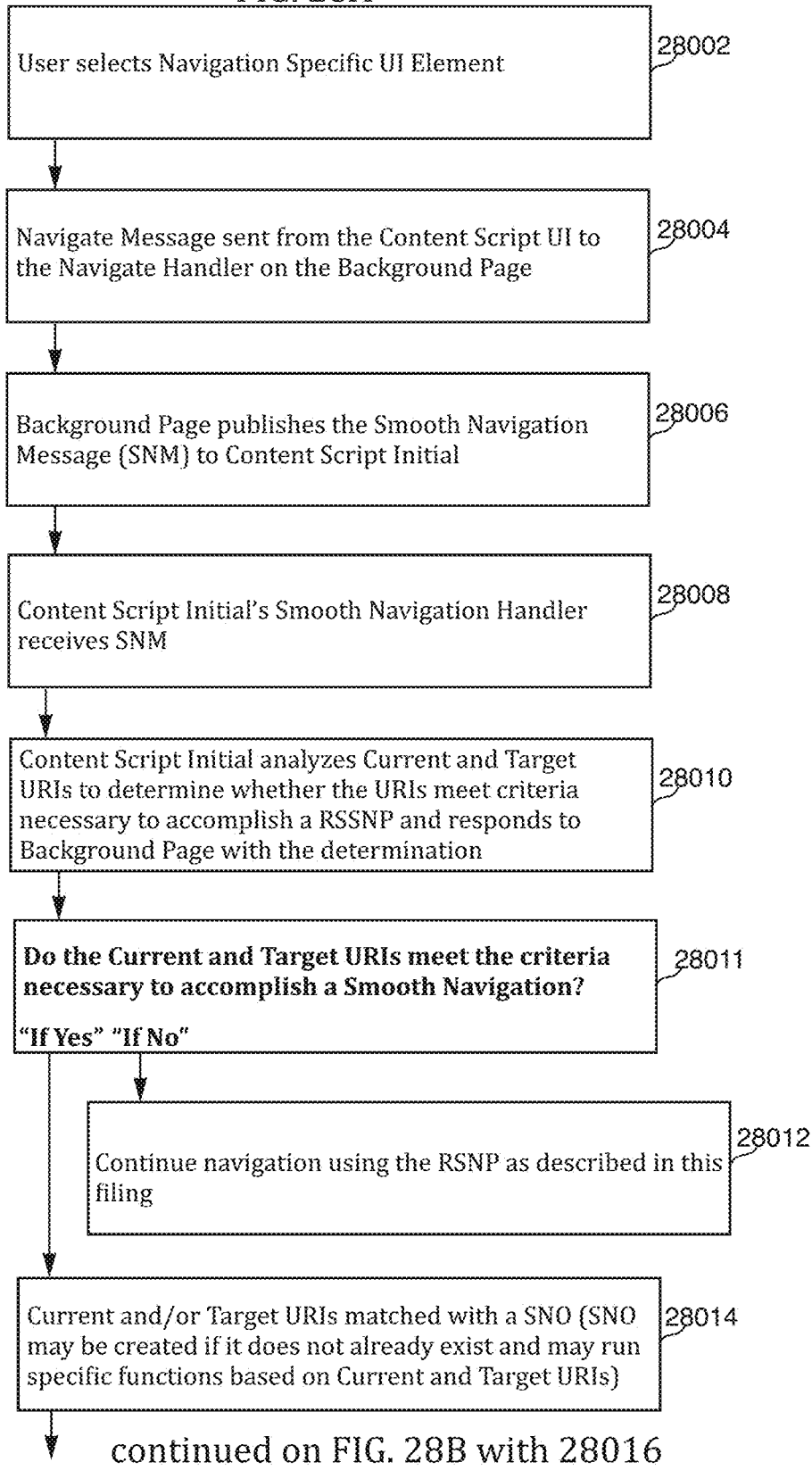
Figure 28D:
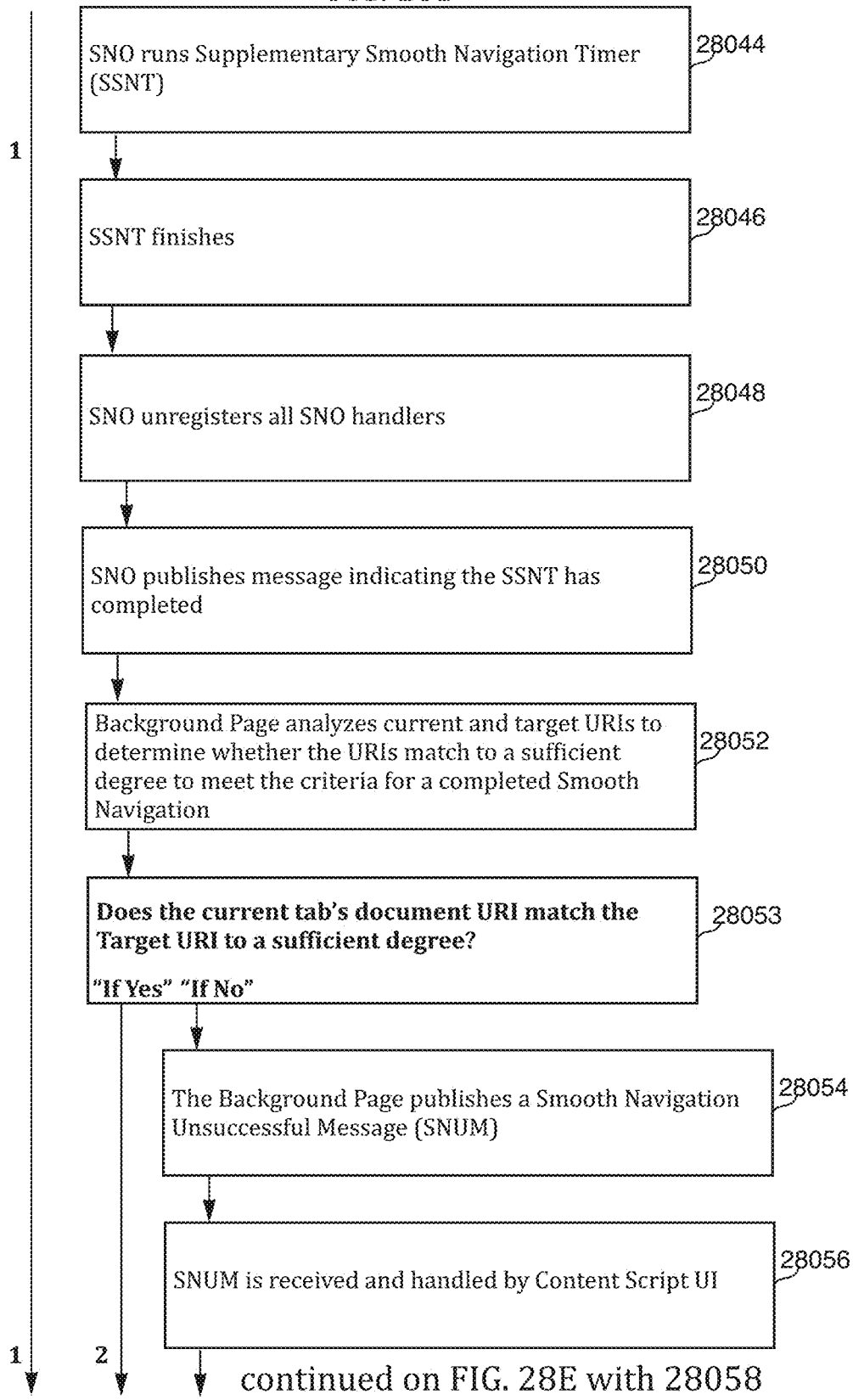
Figure 28E:
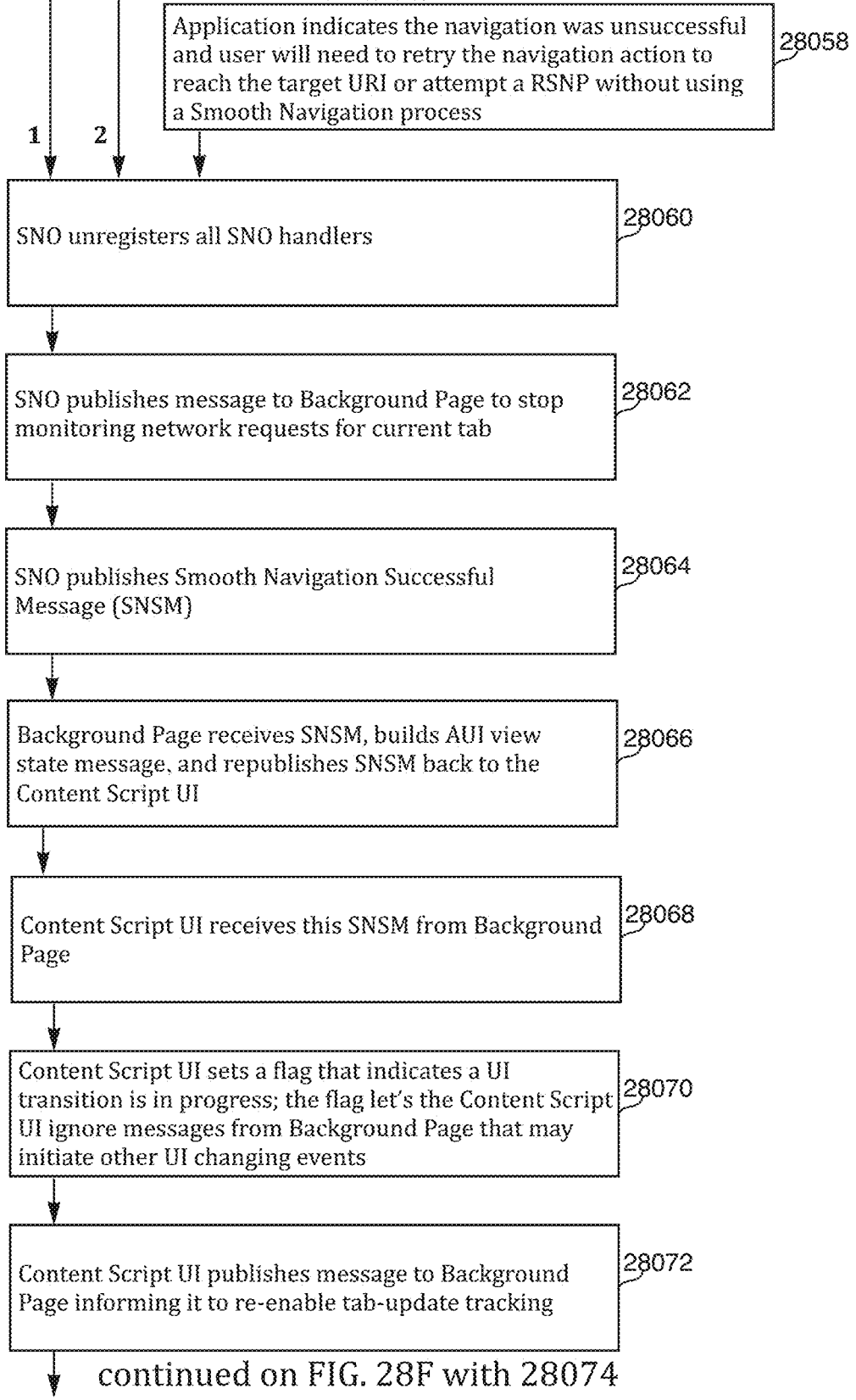
Figure 28F:
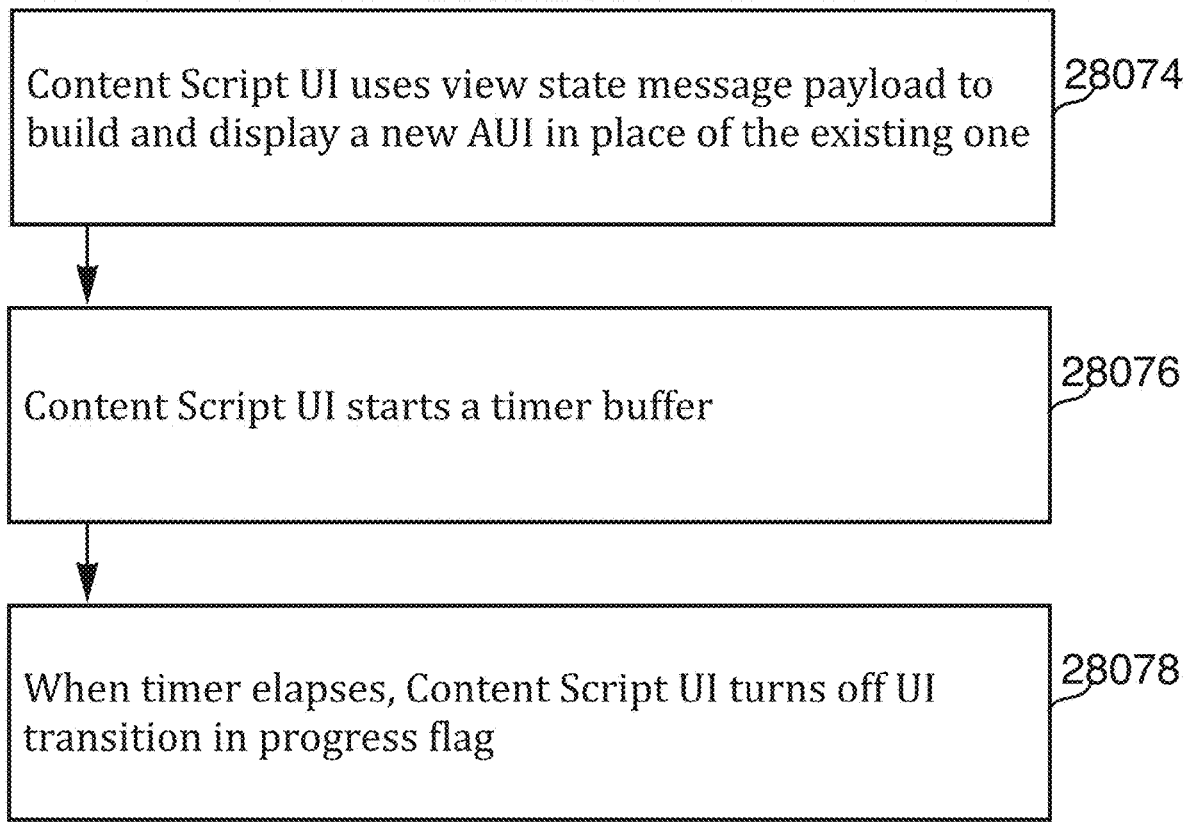

FIG. 24 illustrates an embodiment of a process for controlling smooth navigation between digital resources of a resource set (e.g., bookmarked or otherwise user-defined) in a digital resource viewing component (e.g., a browser window, tab, or view). The resources may be an ordered set of resources having a predefined order, or an unordered set of resources. As described above, for certain types of digital resources, smooth navigation can be completed in which a second digital resource may be navigated to from a first digital resource without completely clearing the first digital resource from the viewing component in which the first digital resource is displayed and the second digital resource is to be displayed. This is contrast to general navigation between resources in which the elements from the first resource are generally first completely cleared and then the elements of the second resource are loaded. The smooth navigation process of FIG. 24 enables the navigation from a first digital resource to a second digital resource to achieve greater visual continuity than traditional navigation methods permit because only certain elements are updated in the transition. In many cases, faster view loading times may also be achieved because elements that are common to both digital resources are not cleared and re-loaded.

Smooth navigation is typically possible between resources hosted by certain application service providers that provide this function in response to certain web browser events. For example, when navigating between previously loaded map views in Google Maps using a traditional web browser's forward or back buttons, the Google Maps server provides a transition between the map views smoothly without clearing and re-loading elements in common between the views. The process of FIG. 24 enables a similar effect to be achieved when navigating directly between such resources under control of a browser extension or other controlling element without using the forward or back buttons of the browser.

In the example process of FIG. 24, identifying parameters for a plurality of digital resources and associations between the digital resources are initially stored (24002). For example, identifying parameters may be stored for an ordered set of digital resources that may be navigated through according to the resource set creator's intended scope and sequence. A display device may initially display (24004) a first digital resource. For example, a first Google Map view centered on the Roman Colosseum initially may be displayed in a viewing component. An indication to cause navigation from the first digital resource to a second digital resource is received (24006). For example, a user may select a navigation button in the navigation user interface to navigate to a previous or subsequent resource in the ordered set of resources. The processor then determines (24008) whether the stored identifying parameters indicate the first and second digital resources match at least one predefined criteria that when satisfied, indicates that smooth navigation is possible between the resources. For example, the processor may determine whether the first and second digital resource views are provided by the same application service provider. Furthermore, the processor may determine whether the resources are part of a predefined set of resources that are known to enable the resource viewing component to achieve the smooth navigation. For example, if the first and second resources are both provided by a maps service provider (e.g., Google Maps), then it may be determined that the smooth navigation process can be executed to achieve smooth navigation. The first and second digital resource views may include, for example, a Google Map view centered on the Colosseum and a Google Map view centered on the geospatially adjacent Roman Forum. In response to determining that the one or more criteria have been sufficiently satisfied, an identifier (e.g., a uniform resource identifier) of the second digital resource is sent to the history of the digital resource viewing component and a pop-state event triggered (24010). Sending the second digital resource to the history simulates, from the perspective of the digital resource viewing component, the effect of having previously navigated to the digital resource even though this navigation may have never actually previously occurred. Furthermore, triggering the pop-state event simulates an effect of selecting a back or forward button of the digital resource viewing component without the user actually making this selection. The digital resource viewing component responds to the pop-state event by initiating navigation to the resource of the identifier sent to the history (the identifier of the second digital resource that was manually sent there) in a manner that causes the digital resource viewing component to display a second digital resource without completely clearing the elements loaded to display the first digital resource. Particularly, the digital resource viewing component may communicate with the application service provider (e.g., Google Maps) in the same way as if the back or forward button was selected, causing the application service provider (e.g., Google Maps) to provide the appropriate map views for smoothly transitioning between the resources as if a back or forward sequence was performed with traditional browser buttons. For example, the Google Map view centered on the Colosseum may begin to be redrawn to that of a view centered on the Roman Forum in order to provide a smooth visual transition from one digital resource to the next.

In some instances, the digital resource viewing component may display a digital resource other than one for which the navigation was directed because of the way in which the application service provider (e.g., Google Maps) handles such navigation requests. Thus, the digital resource viewing component may initially display a digital resource that does not necessarily match the resource of the identifier sent to the history. For example, the view of the Roman Forum initially displayed in the digital resource viewing component may be different to some degree than the view of the Roman Forum for which the navigation was directed. The processor may be configured to determine whether the view of the Roman Forum displayed by the digital resource viewing component falls within a range of views (e.g., meets a predefined matching criteria) of the Roman Forum necessary to consider the navigation process complete. If the processor determines the displayed digital resource falls within this range, the smooth navigation process may complete successfully. Here, the processor stores an indication that navigation to the second resource is completed and may update the dynamic navigation user interface and associated parameters in the same manner as if the exact resource of the identifier sent to the history was navigated to directly. If the processor determines the displayed digital resource does not fall within this range (e.g., the predefined matching criteria is not met), additional attempts may be made to cause the digital resource viewing component to display an acceptable view of the second digital resource.

In one embodiment, to determine whether or not navigation to the second resource is completed in the smooth navigation process, a timer may be initiated responsive to determining that smooth navigation is possible between two digital resources. The timer may expire after a set duration. The processor monitors for network request messages that occur between the digital resource viewing component and the application service provider while the transition between resources is executed. Detection of a network request message is an indication that the transition may still be in progress and may not yet complete. The timer may be reset by the detection of a network request message, thus delaying further steps until no network request messages are received for the duration of time of the timer. For example, a network request message may be detected before the view of the Roman Forum or a view sufficiently close to it has been drawn to an extent sufficient to determine whether the navigation may be considered complete. In response, the timer may be reset, and thus determination of whether the navigation may be considered complete may be delayed. Responsive to the timer expiring, an identifier (e.g., URI) of the digital resource presently displayed by the resource viewing component may be compared with the identifying parameters for the second digital resource to determine if they sufficiently match (e.g., meet a predefined matching criteria). If the matching criteria is not met, the same identifier for the second digital resource may be re-sent to the history or an alternative identifier of the second digital resource may be sent and the pop-state may be re-triggered to cause the above-described process to start over. Otherwise, if the matching criteria is met, the processor stores an indication that navigation to the second resource is completed and may update the dynamic navigation user interface and associated parameters in the same manner as if the second resource was navigated to directly.

A smooth navigation may be completed by other methods. For example, a browser and digital resource application service provider may be configured so that the browser may initiate a smooth navigation between digital resources of the application service provider using a process that does not include the specific steps of sending an identifier of a second digital resource to history and triggering a pop-state event; those steps are a means of communicating to an application service provider both the intention to smoothly navigate to a second digital resource and the identifying parameters of the second digital resource. A plurality of methods that allow the browser to communicate to an application service provider both the intention to smoothly navigate to a second digital resource and the identifying parameters of the second digital resource may be used. As long as the application service provider has a method for interpreting the intention to smoothly navigate signaled by the browser, it may update the page elements loaded by the browser to display a digital resource currently in view with elements necessary to display a second digital resource to which the navigation is intended.

FIGS. 25A, 25B, 25C, 25D, 25E, and 25F are a series of flowcharts illustrating more detailed example operations of the system 1000 of FIG. 1 as implemented using a Browser-bound configuration as described above (as noted earlier in this description, with slight modification the components in this figure may display a Page-bound DNUI or other DNUI instead of the Browser-bound DNUI). In the example of FIGS. 25A, 25B, 25C, 25D, 25E, and 25F, operations (25002-25078) are illustrated as discrete operations occurring in a sequential manner. However, it may be appreciated that the operations (25002-25078) may execute in a partially or completely overlapping (e.g., parallel) manner. Further, the operations (25002-25078) may occur in an order different than that shown or may include additional or different operations not specifically illustrated with respect to FIGS. 25A, 25B, 25C, 25D, 25E, and 25F. In FIGS. 25A, 25B, 25C, 25D, 25E, and 25F several basic operations are assumed to have taken place including initialization of the Browser Application 1032.

In the example of FIGS. 25A, 25B, 25C, 25D, 25E, and 25F, in a first instance, a user selects the Navigation Specific UI Element 1064 on the Browser-bound DNUI 1020 to navigate to a Resource of a Resource Set according to the Resource Set's creator's intended scope and sequence (25002). The Resource Page's AUI Controller 1042a sends Navigate Message to the Application Controller's Navigate Handler indicating a Resource of a Resource Set to which the user intends to navigate (25004). The Application Controller publishes a Smooth Navigation Message (SNM) (25006). The AUI Controller receives the SNM (25008). The AUI Controller analyzes the Current and Target URIs to determine whether the URIs meet criteria necessary to accomplish a Smooth Navigation Process and responds to Application Controller with the determination (25010). If the criteria are not met in step (25011) and a Smooth Navigation Process is not possible, the application may continue the navigation from the Current URI to the Target URI using the Navigation Process as described in this disclosure (25012). If the criteria are met in step (25011), the Current and Target URIs are matched with a Smooth Navigation Object (SNO) 1078 that may run functions specific to the Current and Target URIs (for example, if the Current and Target URIs are Google Map views the SNO 1078 may run different functions than if the Current and Target URIs are Khan Academy videos) (25014). The SNO sets up a handler to receive a message published from the Application Controller once the Application Controller has begun to monitor network requests for the current tab (25016). The SNO publishes a message to the Application Controller to disable tab-updating event tracking for the current tab (this step can help keep a consistent display of the AUI during the transition) (25018). SNO publishes a message for the Application Controller to start monitoring and relaying network request messages (25020). The Application Controller publishes a message that it has started to monitor network requests (25022). The SNO receives the above message and creates a handler to listen for "on-before" and/or network requests relayed from the Application Controller (25024). The SNO 1078 then initiates the Smooth Navigation Timer (SNT) (the SNT may be part of the SNO) (25026), pushes the Target URI to the history via the history API (25028), and triggers a pop-state event dispatch to the current tab's browser window (25030). While the SNT is running, the SNO 1078 may receive a relayed network request message that could affect the target page's rendering. If this occurs in step (25031), the SNO 1078 resets and re-runs the SNT (25032). The SNT finishes (25034). When the SNT has finished, the SNO 1078 publishes a message indicating the SNT has completed (25036) and analyzes the current tab's document URI and Target URI to determine whether the URIs match to the degree sufficient to meet the criteria for a completed Smooth Navigation (the criteria in this case might be the similarity between the current tab's URI and the Target URI) (25038). If the URIs do not match to a sufficient degree in step (25039), the SNO 1078 may push the Target URI to the history via the history API (24040), trigger a pop-state event dispatch to the current tab's window (25042), and run a Supplementary Smooth Navigation Timer (SSNT) (the SSNT may be part of the SNO) (25044). The SSNT finishes (25046), unregisters all SNO handlers (25048), and publishes a message indicating the SSNT has completed (25050). The Application Controller 1040a analyzes the current tab's document URI and Target URI to determine whether the URIs match to the degree sufficient to meet the criteria for a completed Smooth Navigation (25052). If the URIs do not match to a sufficient degree in step (25053), the Application Controller 1040a may publish a Smooth Navigation Unsuccessful Message (SNUM) (25054). The AUI Controller 1042a receives the SNUM (25056) and may display a message indicating the Smooth Navigation Process was unsuccessful and an option to attempt the navigation again or proceed to another resource (25058).

If the URIs do match to a sufficient degree in step (25053), the SNO 1078 may unregister all SNO handlers (25060), publish a message to the Application Controller 1040a to stop monitoring network requests for current tab (25062), and publish a Smooth Navigation Successful Message (SNSM) (25064). The Application Controller 1040a receives the SNSM, builds an AUI view state, and republishes SNSM back to the AUI Controller 1042a sending the view state and Target Resource Data to the AUI Controller 1042a (25066). The AUI Controller 1042a receives the SNSM (25068). AUI Controller 1042a sets a flag indicating a UI transition is in progress (the flag let's the AUI Controller 1042a ignore messages from Application Controller 1040a that may initiate other UI changing events) (25070). The AUI Controller 1042a publishes message to Application Controller 1040a informing it to re-enable tab-update tracking (25072). The AUI Controller 1042a uses the view state message payload to build and display a new AUI in place of the existing one (25074). AUI Controller 1042a starts a timer buffer (25076). When timer elapses, AUI Controller 1042a turns off UI transition in progress flag (25078).

FIGS. 26A, 26B, 26C, 26D, 26E, and 26F are a series of flowcharts illustrating more detailed example operations of the system 1001 of FIG. 2. In the example of FIGS. 26A, 26B, 26C, 26D, 26E, and 26F, operations (26002-26078) are illustrated as discrete operations occurring in a sequential manner. However, it may be appreciated that the operations (26002-26078) may execute in a partially or completely overlapping (e.g., parallel) manner. Further, the operations (26002-26078) may occur in an order different than that shown or may include additional or different operations not specifically illustrated with respect to FIGS. 26A, 26B, 26C, 26D, 26E, and 26F. In FIGS. 26A, 26B, 26C, 26D, 26E, and 26F several basic operations are assumed to have taken place including but not limited to the initialization of the Browser Application 1033.

In the example of FIGS. 26A, 26B, 26C, 26D, 26E, and 26F, in a first instance, a user selects the Navigation Specific UI Element 1064 on the DNUI to navigate to a Resource of a Resource Set according to the Resource Set's creator's intended scope and sequence (26002). The Resource Page's AUI Controller 1043a sends Navigate Message to the Application Controller's 1041a Navigate Handler indicating a Resource of a Resource Set to which the user intends to navigate (26004). The Application Controller publishes a Smooth Navigation Message (SNM) (26006). The AUI Controller 1043a receives the SNM (26008). The AUI Controller 1043*a* analyzes the Current and Target URIs to determine whether the URIs meet criteria sufficient to accomplish a Smooth Navigation Process and responds to Application Controller 1041*a* with the determination (26010). If the criteria are not met in step (26011) and a Smooth Navigation Process is not possible, the application may continue the navigation from the Current URI to the Target URI using the Navigation Process as described in this disclosure (26012). If the criteria are met in step (26011), the Current and Target URIs are matched with a Smooth Navigation Object (SNO) 1079 that may run functions specific to the Current and Target URIs (for example, if the Current and Target URIs are Google Map views the SNO 1079 may run different functions than if the Current and Target URIs are Khan Academy videos) (26014). The SNO sets up a handler to receive a message published from Application Controller 1041*a* once the Application Controller 1041*a* has begun to monitor network requests for the current Rendered View (26016). The SNO publishes a message to Application Controller 1041*a* to disable Rendered View event tracking for the current Rendered View (this step can help keep a consistent display of the AUI during the transition) (26018). SNO publishes a message for the Application Controller 1041*a* to start monitoring and relaying network request messages (26020). The Application Controller 1041*a* publishes a message that it has started to monitor network requests (26022). The SNO receives the above message and creates a handler to listen for "on-before" and/or network requests relayed from the Application Controller (26024). The SNO 1079 then initiates the Smooth Navigation Timer (SNT) (the SNT may be part of the SNO) (26026), pushes the Target URI to the history via the history API (26028), and triggers a pop-state event dispatch to the current Rendered View's tab's browser window (26030). While the SNT is running, the SNO 1079 may receive a relayed network request message that could affect the target page's rendering. If this occurs in step (26031), the SNO 1079 resets and re-runs the SNT (26032). The SNT finishes (26034). When the SNT has finished, the SNO 1079 publishes a message indicating the SNT has completed (26036) and analyzes the current Rendered View's URI and Target URI to determine whether the URIs match to the degree sufficient to meet the criteria for a completed Smooth Navigation (the criteria in this case might be the similarity between the current Rendered View's URI and the Target URI) (26038). If the URIs do not match to a sufficient degree in step (26039), the SNO 1079 may push the Target URI to the history via the history API (26040), trigger a pop-state event dispatch to the current Rendered View's tab's browser window (26042), and run a Supplementary Smooth Navigation Timer (SSNT) (the SSNT may be part of the SNO) (26044). The SSNT finishes (26046), unregisters all SNO handlers (26048), and publishes a message indicating the SSNT has completed (26050). The Application Controller 1041*a* analyzes the current Rendered View's URI and Target URI to determine whether the URIs match to the degree sufficient to meet the criteria for a completed Smooth Navigation (26052). If the URIs do not match to a sufficient degree in step (26053), the Application Controller 1041*a* may publish a Smooth Navigation Unsuccessful Message (SNUM) (26054). The AUI Controller 1043*a* receives the SNUM (26056) and may display a message indicating the Smooth Navigation Process was unsuccessful and an option to attempt the navigation again or proceed to another resource (26058).

If the URIs do match to a sufficient degree in step (26053), the SNO 1079 may unregister all SNO handlers (26060), publish a message to the Application Controller 1041*a* to stop monitoring network requests for the current Rendered View (26062), and publish a Smooth Navigation Successful Message (SNSM) (26064). The Application Controller 1041*a* receives the SNSM, builds an AUI view state, and republishes SNSM back to the AUI Controller 1043*a* sending the view state and Target Resource Data to the AUI Controller 1043*a* (26066). The AUI Controller 1043*a* receives the SNSM (26068). AUI Controller 1043*a* sets a flag indicating a UI transition is in progress (the flag let's the AUI Controller 1043*a* ignore messages from Application Controller 1041*a* that may initiate other UI changing events) (26070). The AUI Controller 1043*a* publishes message to Application Controller 1041*a* informing it to re-enable Rendered View-update tracking (26072). The AUI Controller 1043*a* uses the view state message payload to build and display a new AUI in place of the existing one (26074). AUI Controller 1043*a* starts a timer buffer (26076). When timer elapses, AUI Controller 1043*a* turns off UI transition in progress flag (26078).

FIGS. 27A, 27B, 27C, 27D, 27E, and 27F are a series of flowcharts illustrating more detailed example operations of the system 1000 of FIG. 1 as implemented using a Page-bound configuration as described above. In the example of FIGS. 27A, 27B, 27C, 27D, 27E, and 27F, operations (27002-27078) are illustrated as discrete operations occurring in a sequential manner. However, it may be appreciated that the operations (27002-27078) may execute in a partially or completely overlapping (e.g., parallel) manner. Further, the operations (27002-27078) may occur in an order different than that shown or may include additional or different operations not specifically illustrated with respect to FIGS. 27A, 27B, 27C, 27D, 27E, and 27F. In FIGS. 27A, 27B, 27C, 27D, 27E, and 27F several basic operations are assumed to have taken place including but not limited to the initialization of the Browser Application 1032.

In the example of FIGS. 27A, 27B, 27C, 27D, 27E, and 27F in a first instance, a user selects the Navigation Specific UI Element 1064 on the Page-bound DNUI 1022*a* to navigate to a Resource of a Resource Set according to the Resource Set's creator's intended scope and sequence (27002). The Resource Page's Content Script Single 1070 sends Navigate Message to the Background Page's 1050*a* Navigate Handler indicating a Resource of a Resource Set to which the user intends to navigate (27004). The Background Page 1050*a* publishes a Smooth Navigation Message (SNM) (27006). The Content Script Initial receives the SNM (27008). The Content Script Single 1070 analyzes the Current and Target URIs to determine whether the URIs meet criteria sufficient to accomplish a Smooth Navigation Process and responds to Background Page 1050*a* with the determination (27010). If the criteria are not met in step (27011) and a Smooth Navigation Process is not possible, the application may continue the navigation from the Current URI to the Target URI using the Navigation Process as described in this disclosure (27012). If the criteria are met in step (27011), the Current and Target URIs are matched with a Smooth Navigation Object (SNO) 1078 that may run functions specific to the Current and Target URIs (for example, if the Current and Target URIs are Google Map views the SNO 1078 may run different functions than if the Current and Target URIs are Khan Academy videos) (27014). The SNO sets up a handler to receive a message published from Background Page 1050*a* once the Background Page has begun to monitor network requests for the current tab (27016). The SNO publishes a message to Background Page to disable tab-updating event tracking for the current tab (this step can help keep a consistent display of the AUI during the transition) (27018). SNO publishes a message for the Background Page 1050a to start monitoring and relaying network request messages (27020). The Background Page 1050a publishes a message that it has started to monitor network requests (27022). The SNO receives the above message and creates a handler to listen for "on-before" and/or network requests relayed from the Background Page 1050a (27024). The SNO 1078 then initiates the Smooth Navigation Timer (SNT) (the SNT can be part of the SNO) (27026), pushes the Target URI to the history via the history API (27028), and triggers a pop-state event dispatch to the current tab's browser window (27030). While the SNT is running, the SNO 1078 may receive a relayed network request message that could affect the target page's rendering. If this occurs in step (27031), the SNO 1078 resets and re-runs the SNT (27032). The SNT finishes (27034). When the SNT has finished, the SNO 1078 publishes a message indicating the SNT has completed (27036) and analyzes the current tab's document URI and Target URI to determine whether the URIs match to the degree sufficient to meet the criteria for a completed Smooth Navigation (the criteria in this case might be the similarity between the current tab's URI and the Target URI) (27038). If the URIs do not match to a sufficient degree in step (27039), the SNO 1078 may push the Target URI to the history via the history API (27040), trigger a pop-state event dispatch to the current tab's window (27042), and run a Supplementary Smooth Navigation Timer (SSNT) (the SSNT can be part of the SNO) (27044). The SSNT finishes (27046), unregisters all SNO handlers (27048), and publishes a message indicating the SSNT has completed (27050). The Background Page 1050a analyzes the current tab's document URI and Target URI to determine whether the URIs match to the degree sufficient to meet the criteria for a completed Smooth Navigation (27052). If the URIs do not match to a sufficient degree in step (27053), the Background Page 1050a may publish a Smooth Navigation Unsuccessful Message (SNUM) (27054). The Content Script Single 1070 receives the SNUM (27056) and may display a message indicating the Smooth Navigation Process was unsuccessful and an option to attempt the navigation again or proceed to another resource (27058). If the URIs do match to a sufficient degree in step (27053), the SNO 1078 may unregister all SNO handlers (27060), publish a message to the Background Page 1050a to stop monitoring network requests for current tab (27062), and publish a Smooth Navigation Successful Message (SNSM) (27064). The Background Page 1050a receives the SNSM, builds an AUI view state, and republishes SNSM back to the Content Script Single 1070 sending the view state and Target Resource Data to the Content Script Single 1070 (27066). The Content Script Single 1070 receives the SNSM (27068). Content Script Single 1070 sets a flag indicating a UI transition is in progress (the flag lets the Content Script Single 1070 ignore messages from Background Page 1050a that may initiate other UI changing events) (27070). The Content Script Single 1070 publishes message to Background Page 1050a informing it to re-enable tab-update tracking (27072). The Content Script Single 1070 uses the view state message payload to build and display a new AUI in place of the existing one (27074). Content Script Single 1070 starts a timer buffer (27076). When timer elapses, Content Script Single 1070 turns off UI transition in progress flag (27078).

FIGS. 28A, 28B, 28C, 28D, 28E, and 28F are a series of flowcharts illustrating more detailed example operations of the system 1000 of FIG. 1 as implemented using a Page-bound configuration as described above. In the example of FIGS. 28A, 28B, 28C, 28D, 28E, and 28F, operations (28002-28078) are illustrated as discrete operations occurring in a sequential manner. However, it may be appreciated that the operations (28002-28078) may execute in a partially or completely overlapping (e.g., parallel) manner. Further, the operations (28002-28078) may occur in an order different than that shown or may include additional or different operations not specifically illustrated with respect to FIGS. 28A, 28B, 28C, 28D, 28E, and 28F. In FIGS. 28A, 28B, 28C, 28D, 28E, and 28F several basic operations are assumed to have taken place including but not limited to the initialization of the Browser Application 1032.

In the example of FIGS. 28A, 28B, 28C, 28D, 28E, and 28F, in a first instance, a user selects the Navigation Specific UI Element 1064 on the Page-bound DNUI 1024a to navigate to a Resource of a Resource Set according to the Resource Set's creator's intended scope and sequence (28002). The Resource Page's Content Script UI 1074 sends Navigate Message to the Background Page's Navigate Handler indicating a Resource of a Resource Set to which the user intends to navigate (28004). The Background Page publishes a Smooth Navigation Message (SNM) (28006). The Content Script Initial receives the SNM (28008). The Content Script Initial analyzes the Current and Target URIs to determine whether the URIs meet criteria sufficient to accomplish a Smooth Navigation Process and responds to Background Page with the determination (28010). If the criteria are not met in step (28011) and a Smooth Navigation Process is not possible, the application may continue the navigation from the Current URI to the Target URI using the Navigation Process as described in this disclosure (28012). If the criteria are met in step (28011), the Current and Target URIs are matched with a Smooth Navigation Object (SNO) 1078 that may run functions specific to the Current and Target URIs (for example, if the Current and Target URIs are Google Map views the SNO 1078 may run different functions than if the Current and Target URIs are Khan Academy videos) (28014). The SNO sets up a handler to receive a message published from Background Page once the Background Page has begun to monitor network requests for the current tab (28016). The SNO publishes a message to Background Page to disable tab-updating event tracking for the current tab (this step can help keep a consistent display of the AUI during the transition) (28018). SNO publishes a message for the Background Page to start monitoring and relaying network request messages (28020). The Background Page publishes a message that it has started to monitor network requests (28022). The SNO receives the above message and creates a handler to listen for "on-before" and/or network requests relayed from the Background Page (28024). The SNO 1078 then initiates the Smooth Navigation Timer (SNT) (the SNT can be part of the SNO) (28026), pushes the Target URI to the history via the history API (28028), and triggers a pop-state event dispatch to the current tab's browser window (28030). While the SNT is running, the SNO 1078 may receive a relayed network request message that could affect the target page's rendering. If this occurs in step (28031), the SNO 1078 resets and re-runs the SNT (28032). The SNT finishes (28034). When the SNT has finished, the SNO 1078 publishes a message indicating the SNT has completed (28036) and analyzes the current tab's document URI and Target URI to determine whether the URIs match to the degree sufficient to meet the criteria for a completed Smooth Navigation (the criteria in this case might be the similarity between the current tab's URI and the Target URI) (28038). If the URIs do not match to a sufficient degree in step (28039), the SNO 1078 may push the Target URI to the history via the history API (28040), trigger a pop-state event dispatch to the current tab's window (28042), and run a Supplementary Smooth Navigation Timer (SSNT) (the SSNT can be part of the SNO) (28044). The SSNT finishes (28046), unregisters all SNO handlers (28048), and publishes a message indicating the SSNT has completed (28050). The Background Page 1050b analyzes the current tab's document URI and Target URI to determine whether the URIs match to the degree sufficient to meet the criteria for a completed Smooth Navigation (28052). If the URIs do not match to a sufficient degree in step (28053), the Background Page 1050b may publish a Smooth Navigation Unsuccessful Message (SNUM) (28054). The Content Script UI 1074 receives the SNUM (28056) and may display a message indicating the Smooth Navigation Process was unsuccessful and an option to attempt the navigation again or proceed to another resource (28058). If the URIs do match to a sufficient degree in step (28053), the SNO 1078 may unregister all SNO handlers (28060), publish a message to the Background Page 1050b to stop monitoring network requests for current tab (28062), and publish a Smooth Navigation Successful Message (SNSM) (28064). The Background Page 1050b receives the SNSM, builds an AUI view state, and republishes SNSM back to the Content Script UI 1074 sending the view state and Target Resource Data to the Content Script UI 1074 (28066). The Content Script UI 1074 receives the SNSM (28068). Content Script UI 1074 sets a flag indicating a UI transition is in progress (the flag lets the Content Script UI 1074 ignore messages from Background Page 1050b that may initiate other UI changing events) (28070). The Content Script UI 1074 publishes message to Background Page 1050b informing it to re-enable tab-update tracking (28072). The Content Script UI 1074 uses the view state message payload to build and display a new AUI in place of the existing one (28074). Content Script UI 1074 starts a timer buffer (28076). When timer elapses, Content Script UI 1074 turns off UI transition in progress flag (28078).

As a result of the above-described process, individuals may be enabled to build and share presentations utilizing Hosted Information Resources more quickly and effectively than they could without the Smooth Navigation Process. The Smooth Navigation Process is a process of the larger RSPP which spans the breadth of the information cycle, including information collection, organization, enrichment, and presentation.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a non-transitory computer-readable storage medium containing computer-executable instructions which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A method for controlling navigation between web pages in a web browser executing on a client device in a networked computer environment, the method comprising:
   storing in a memory of the client device by a web browser plug-in, identifying parameters for an ordered set of web pages including a first identifier for a first web page and a second identifier for a second web page ordered in immediate sequence with the first identifier for the first web page in the ordered set;
   causing, by the web browser plug-in, the web browser to display the first web page in the ordered set of web pages in the web browser;
   receiving a selection of a navigation element of a user interface of the web browser plug-in for navigating from the first web page to the second web page in the ordered set;
   executing instructions of the web browser plug-in to determine by a processor, that the stored identifying parameters indicate the first and second web pages match at least one predefined criteria including that the first and second web pages are provided by a same application service provider;
   responsive to determining that the first and second web pages match the at least one predefined criteria, executing instructions of the web browser plug-in to automatically send via an application programming interface of the web browser, an identifier of the second web page to a browser history of the web browser independently of the web browser loading the second web page; and following sending the second web page to the browser history of the web browser, automatically triggering, by the web browser plug-in, a pop-state event in the web browser to cause the web browser to navigate to the second web page based on the second web page being a last web page in the browser history when the pop-state event is triggered, wherein upon navigating to the second web page, the web browser renders the second web page without completely clearing elements of the first web page loaded in the web browser.

2. The method of claim 1, further comprising:
initiating a timer that expires after a set duration;
monitoring for a network request message;
resetting the timer upon detection of the network request message;
responsive to the timer expiring, comparing an identifier of a displayed web page loaded by the web browser and the second identifier of the second web page; and
responsive to determining that the identifier of the displayed web page and the second identifier of the second web page do not meet a predefined matching criteria, re-sending, by the processor, the second identifier of the second web page to the browser history of the web browser and re-triggering the pop state event.

3. The method of claim 1, further comprising:
initiating a timer that expires after a set duration;
monitoring for a network request message;
resetting the timer upon detection of the network request message;
responsive to the timer expiring, comparing an identifier of a displayed web page loaded by the web browser and the second identifier of the second web page; and
responsive to determining that the identifier of the displayed web page and the second identifier of the second web page do not meet a predefined matching criteria, sending, by the processor, an alternative identifier of the second web page to the browser history of the web browser and re-triggering the pop state event.

4. The method of claim 1, further comprising:
initiating a timer that expires after a set duration;
monitoring for a network request message;
resetting the timer upon detection of the network request message;
responsive to the timer expiring, comparing an identifier of a displayed web page loaded by the web browser and the second identifier of the second web page; and
responsive to determining that the identifier of the displayed web page and the second identifier of the second web page meet a predefined matching criteria, storing an indication that navigation to the second web page is complete.

5. The method of claim 1, wherein the web browser displays the first web page in a browser window or tab.

6. The method of claim 1, wherein determining that the stored identifying parameters indicate the first and second web pages match the at least one predefined criteria further comprises:
determining that the first web page and the second web page each include at least a selection of a page provided by a map service provider.

7. The method of claim 1, wherein the web browser plug-in automatically triggers the pop-state event independently of user selection of a back or forward button in the web browser.

8. A non-transitory computer-readable storage medium storing instructions for controlling navigation between digital resources in an application executing on a client device in a networked computer environment, the instructions when executed by a processor causing the processor to perform steps including:
storing in a memory of the client device by a web browser plug-in, identifying parameters for an ordered set of web pages including a first identifier for a first web page and a second identifier for a second web page ordered in immediate sequence with the first identifier for the first web page in the ordered set;
causing, by the web browser plug-in, the web browser to display the first web page in the ordered set of web pages in the web browser;
receiving a selection of a navigation element of a user interface of the web browser plug-in for navigating from the first web page to the second web page in the ordered set;
executing instructions of the web browser plug-in to determine by a processor, that the stored identifying parameters indicate the first and second web pages match at least one predefined criteria including that the first and second web pages are provided by a same application service provider;
responsive to determining that the first and second web pages match the at least one predefined criteria, executing instructions of the web browser plug-in to automatically send via an application programming interface of the web browser, an identifier of the second web page to a browser history of the web browser independently of the web browser loading the second web page; and
following sending the second web page to the browser history of the web browser, automatically triggering, by the web browser plug-in, a pop-state event in the web browser to cause the web browser to navigate to the second web page based on the second web page being a last web page in the browser history when the pop-state event is triggered, wherein upon navigating to the second web page, the web browser renders the second web page without completely clearing elements of the first web page loaded in the web browser.

9. The non-transitory computer-readable storage medium of claim 8, the instructions when executed further causing the processor to perform steps including:
initiating a timer that expires after a set duration;
monitoring for a network request message;
resetting the timer upon detection of the network request message;
responsive to the timer expiring, comparing an identifier of a displayed web page loaded by the web browser and the second identifier of the second web page; and
responsive to determining that the identifier of the displayed web page and the second identifier of the second web page do not meet a predefined matching criteria, re-sending, by the processor, the second identifier of the second web page to the browser history of the web browser and re-triggering the pop state event.

10. The non-transitory computer-readable storage medium of claim 8, the instructions when executed further causing the processor to perform steps including:
initiating a timer that expires after a set duration;

monitoring for a network request message;
resetting the timer upon detection of the network request message;
responsive to the timer expiring, comparing an identifier of a displayed web page loaded by the web browser and the second identifier of the second web page; and
responsive to determining that the identifier of the displayed web page and the second identifier of the second web page do not meet a predefined matching criteria, sending, by the processor, an alternative identifier of the second web page to the browser history of the web browser and re-triggering the pop state event.

11. The non-transitory computer-readable storage medium of claim 8, the instructions when executed further causing the processor to perform steps including:
initiating a timer that expires after a set duration;
monitoring for a network request message;
resetting the timer upon detection of the network request message;
responsive to the timer expiring, comparing an identifier of a displayed web page loaded by the web browser and the second identifier of the second web page; and
responsive to determining that the identifier of the displayed web page and the second identifier of the second web page meet a predefined matching criteria, storing an indication that navigation to the second web page is complete.

12. The non-transitory computer-readable storage medium of claim 8, wherein the web browser displays the first web page in a browser window or tab.

13. The non-transitory computer-readable storage medium of claim 8, wherein determining that the stored identifying parameters indicate the first and second web pages match the at least one predefined criteria further comprises:
determining that the first web page and the second web page each include at least a selection of a page provided by a map service provider.

14. The non-transitory computer-readable storage medium of claim 8, wherein the web browser plug-in automatically triggers the pop-state event independently of user selection of a back or forward button in the web browser.

15. A computer device, comprising:
a processor; and
a non-transitory computer-readable storage medium storing instructions for controlling navigation between digital resources in an application executing on a client device in a networked computer environment, the instructions when executed by the processor causing the processor to perform steps including:
storing in a memory of the client device by a web browser plug-in, identifying parameters for an ordered set of web pages including a first identifier for a first web page and a second identifier for a second web page ordered in immediate sequence with the first identifier for the first web page in the ordered set;
causing, by the web browser plug-in, the web browser to display the first web page in the ordered set of web pages in the web browser;
receiving a selection of a navigation element of a user interface of the web browser plug-in for navigating from the first web page to the second web page in the ordered set;
executing instructions of the web browser plug-in to determine by a processor, that the stored identifying parameters indicate the first and second web pages match at least one predefined criteria including that the first and second web pages are provided by a same application service provider;
responsive to determining that the first and second web pages match the at least one predefined criteria, executing instructions of the web browser plug-in to automatically send via an application programming interface of the web browser, an identifier of the second web page to a browser history of the web browser independently of the web browser loading the second web page; and
following sending the second web page to the browser history of the web browser, automatically triggering, by the web browser plug-in, a pop-state event in the web browser to cause the web browser to navigate to the second web page based on the second web page being a last web page in the browser history when the pop-state event is triggered, wherein upon navigating to the second web page, the web browser renders the second web page without completely clearing elements of the first web page loaded in the web browser.

16. The computer device of claim 15, the instructions when executed further causing the processor to perform steps including:
initiating a timer that expires after a set duration;
monitoring for a network request message;
resetting the timer upon detection of the network request message;
responsive to the timer expiring, comparing an identifier of a displayed web page loaded by the web browser and the second identifier of the second web page; and
responsive to determining that the identifier of the displayed web page and the second identifier of the second web page do not meet a predefined matching criteria, re-sending, by the processor, the second identifier of the second web page to the browser history of the web browser and re-triggering the pop state event.

17. The computer device of claim 15, the instructions when executed further causing the processor to perform steps including:
initiating a timer that expires after a set duration;
monitoring for a network request message;
resetting the timer upon detection of the network request message;
responsive to the timer expiring, comparing an identifier of a displayed web page loaded by the web browser and the second identifier of the second web page; and
responsive to determining that the identifier of the displayed web page and the second identifier of the second web page do not meet a predefined matching criteria, sending, by the processor, an alternative identifier of the second web page to the browser history of the web browser and re-triggering the pop state event.

18. The computer device of claim 15, the instructions when executed further causing the processor to perform steps including:
initiating a timer that expires after a set duration;
monitoring for a network request message;
resetting the timer upon detection of the network request message;
responsive to the timer expiring, comparing an identifier of a displayed web page loaded by the web browser and the second identifier of the second web page; and
responsive to determining that the identifier of the displayed web page and the second identifier of the second web page meet a predefined matching criteria, storing an indication that navigation to the second web page is complete.

19. The computer device of claim 15, wherein the web browser displays the first web page in a browser window or tab.

20. The computer device of claim 15, wherein determining that the stored identifying parameters indicate the first and second web pages match the at least one predefined criteria further comprises:
   determining that the first web page and the second web page each include at least a selection of a page provided by a map service provider.

21. The computer device of claim 15, wherein the web browser plug-in automatically triggers the pop-state event independently of user selection of a back or forward button in the web browser.

* * * * *